US012096087B2

(12) United States Patent
Fishman et al.

(10) Patent No.: US 12,096,087 B2
(45) Date of Patent: Sep. 17, 2024

(54) TECHNIQUES FOR CONFIGURING AND MANAGING USER INTERFACES OF A CONTENT GUIDE FOR MULTIPLE DEVICE TYPES

(71) Applicant: OpenTV, Inc., San Francisco, CA (US)

(72) Inventors: Alex Fishman, San Francisco, CA (US); Gareth Lewis, Wales (GB); Will Owen, Wales (GB); Lee Thomas, Wales (GB); Crx Chai, Oakland, CA (US); Laurent Demesmaeker, San Francisco, CA (US); Ben Gidley, Wales (GB); Jain Ruchira, Sunnyvale, CA (US)

(73) Assignee: OPENTV, INC., San Francisco, CA (US)

( * ) Notice: Subject to any disclaimer, the term of this patent is extended or adjusted under 35 U.S.C. 154(b) by 0 days.

(21) Appl. No.: 17/273,921

(22) PCT Filed: Sep. 10, 2019

(86) PCT No.: PCT/US2019/050334
§ 371 (c)(1),
(2) Date: Mar. 5, 2021

(87) PCT Pub. No.: WO2020/055814
PCT Pub. Date: Mar. 19, 2020

(65) Prior Publication Data
US 2021/0352375 A1 Nov. 11, 2021

Related U.S. Application Data

(60) Provisional application No. 62/729,903, filed on Sep. 11, 2018.

(30) Foreign Application Priority Data

Sep. 12, 2018 (IN) .............................. 201841034327

(51) Int. Cl.
H04N 21/482 (2011.01)
H04N 21/431 (2011.01)
H04N 21/485 (2011.01)

(52) U.S. Cl.
CPC ....... *H04N 21/482* (2013.01); *H04N 21/4314* (2013.01); *H04N 21/4858* (2013.01)

(58) Field of Classification Search
CPC ...... H04N 21/00; H04N 21/472; H04N 7/147; H04N 21/2343; H04N 21/25; H04N 21/475; H04N 21/4858; H04N 21/431
See application file for complete search history.

(56) References Cited

U.S. PATENT DOCUMENTS 11,048,532 B1 * 6/2021 McNally .......... H04N 21/23439
2004/0003400 A1 1/2004 Carney
(Continued)

FOREIGN PATENT DOCUMENTS

CA 2 213 029 A1 2/1999

OTHER PUBLICATIONS

International Search Report and Written Opinion of Jan. 27, 2020 for International Patent Application No. PCT/US2019/050334; 17 pages.

Primary Examiner — Jason Salce
(74) Attorney, Agent, or Firm — POLSINELLI LLP

(57) ABSTRACT

Systems, methods, and computer readable media are described for modifying or updating a user interface. In some examples, systems, methods, and computer readable media include receiving, via an operator console on an operator system, one or more inputs for a template for a user interface, generating, based on the one or more inputs, the template for the user interface, and generating, based on the (Continued)

template, a plurality of designs for the user interface, wherein each design in the plurality of designs is associated with an interface profile.

19 Claims, 65 Drawing Sheets

(56) References Cited

U.S. PATENT DOCUMENTS

| | | | |
|---|---|---|---|
| 2007/0033612 A1* | 2/2007 | Lerman | H04N 21/4782 |
| | | | 348/E7.071 |
| 2012/0079512 A1 | 3/2012 | Nambakkam et al. | |
| 2012/0117471 A1* | 5/2012 | Amidon | H04N 21/4334 |
| | | | 715/716 |
| 2012/0159392 A1* | 6/2012 | Kauerauf | G06F 16/252 |
| | | | 715/826 |
| 2012/0323788 A1* | 12/2012 | Keresman, III | G07F 7/10 |
| | | | 705/44 |
| 2014/0325374 A1* | 10/2014 | Dabrowski | G06F 9/451 |
| | | | 715/744 |
| 2015/0212658 A1* | 7/2015 | Cudak | G06F 9/453 |
| | | | 715/727 |
| 2017/0371404 A1* | 12/2017 | Meenakshisundaram | |
| | | | G06F 3/0481 |
| 2021/0103379 A1* | 4/2021 | Adachi | G06F 40/106 |

* cited by examiner

3600

```
┌─────────────────────────────────────────┐
│ RECEIVE VIA AN OPERATOR CONSOLE ON AN   │
│ OPERATOR SYSTEM, ONE OR MORE INPUTS FOR │
│ A TEMPLATE FOR A USER INTERFACE         │
│ 3602                                    │
└─────────────────────────────────────────┘
```

```
┌─────────────────────────────────────────┐
│ GENERATE, BASED ON THE ONE OR MORE      │
│ INPUTS, THE TEMPLATE FOR THE USER       │
│ INTERFACE                               │
│ 3604                                    │
└─────────────────────────────────────────┘
```

```
┌─────────────────────────────────────────┐
│ GENERATE, BASED ON THE TEMPLATE, A SET  │
│ OF DESIGNS FOR THE USER INTERFACE,      │
│ WHEREIN EACH DESIGN IN THE SET OF       │
│ DESIGNS IS ASSOCIATED WITH AN INTERFACE │
│ PROFILE                                 │
│ 3606                                    │
└─────────────────────────────────────────┘
```

OBTAIN, BY A SERVER COMPUTER, INPUT DEFINING ONE OR MORE PARAMETERS OF A VIEW OF A CONTENT GUIDE, THE VIEW DISPLAYING CONTENT ACCESSIBLE USING THE CONTENT GUIDE
3702

↓

OBTAIN FIRST INFORMATION DEFINING ONE OR MORE ATTRIBUTES OF A FIRST TYPE OF DEVICE
3704

↓

OBTAIN SECOND INFORMATION DEFINING ONE OR MORE ATTRIBUTES OF A SECOND TYPE OF DEVICE, THE SECOND TYPE OF DEVICE BEING DIFFERENT THAN THE FIRST TYPE OF DEVICE
3706

↓

GENERATE, BASED ON THE ONE OR MORE PARAMETERS AND THE FIRST INFORMATION, A FIRST LAYOUT OF THE VIEW OF THE CONTENT GUIDE FOR THE FIRST TYPE OF DEVICE
3708

↓

GENERATE, BASED ON THE ONE OR MORE PARAMETERS AND THE SECOND INFORMATION, A SECOND LAYOUT OF THE VIEW OF THE CONTENT GUIDE FOR THE SECOND TYPE OF DEVICE, THE SECOND LAYOUT OF THE VIEW BEING DIFFERENT THAN THE FIRST LAYOUT OF THE VIEW
3710

↓

PROVIDE, BY THE SERVER COMPUTER, THE FIRST LAYOUT OF THE VIEW OF THE CONTENT GUIDE TO A FIRST DEVICE OF THE FIRST TYPE, THE FIRST LAYOUT BEING CONFIGURED TO MODIFY THE CONTENT GUIDE FOR THE FIRST DEVICE
3710

↓

PROVIDE, BY THE SERVER COMPUTER, THE SECOND LAYOUT OF THE VIEW OF THE CONTENT GUIDE TO A SECOND DEVICE OF THE SECOND TYPE, THE SECOND LAYOUT BEING CONFIGURED TO MODIFY THE CONTENT GUIDE FOR THE SECOND DEVICE
3708

FIG. 37

LIVE ON DEMAND CONTENT SUBSCRIBER PLATFORM ADMIN

4500

Filters

Content Name
[         ]

Content Type
[ Select Content Type ▼ ]

Product Type
[ All ▼ ]

Studio
[ Select Studio ▼ ]

Sort By
[ Target Value | DESC ▼ ]

[ CLEAR ] [ APPLY ]

Content Performance 4502

| | | | | |
|---|---|---|---|---|
| Content A 56% | Revenue $2.01m / $3.60m -$1.59m | Plays (Unique) 1.53m (1.32m) | Pricing (From) $19.99 / Season  $1.99 / Episode ⓢ Priced 6% lower than the competition | ⋯ |
| Content B 25% | Revenue $780k / $1.20m -$420k | Plays (Unique) 1.2m (1.2m) | Pricing (From) $4.99 ⓢ Priced 10% higher than the competition | ⋯ |
| Content C 41% | Revenue $780k / $1.20m -$420k | Plays (Unique) 1.2m (1.2m) | Pricing (From) $19.99 / Season  $1.99 / Episode ⓢ Priced 6% lower than the competition | ⋯ |
| Content D 56% | Revenue $780k / $1.20m -$420k | Plays (Unique) 1.2m (1.2m) | Pricing (From) $4.99 ⓢ Priced 6% lower than the competition | ⋯ |
| Content E 61% | Revenue $780k / $1.20m -$420k | Plays (Unique) 1.2m (1.2m) | Pricing (From) $4.99 ⓢ Priced 6% lower than the competition | ⋯ |
| Content F 15% | Revenue $780k / $1.20m -$420k | Plays (Unique) 1.2m (1.2m) | Pricing (From) $4.99 ⓢ Priced 6% lower than the competition | ⋯ |
| Content G 73% | Revenue $780k / $1.20m -$420k | Plays (Unique) 1.2m (1.2m) | Pricing (From) $4.99 ⓢ Priced 6% lower than the competition | ⋯ |
| Content H 25% | Revenue $780k / $1.20m -$420k | Plays (Unique) 1.2m (1.2m) | Pricing (From) $19.99 / Season  $1.99 / Episode ⓢ Priced 6% lower than the competition | ⋯ |

FIG. 45

TECHNIQUES FOR CONFIGURING AND MANAGING USER INTERFACES OF A CONTENT GUIDE FOR MULTIPLE DEVICE TYPES

CROSS-REFERENCES TO RELATED APPLICATIONS

This application is a U.S. National Stage of PCT Application No. PCT/US19/50334, filed Sep. 10, 2019, which claims the priority benefit of U.S. Provisional Patent Application No. 62/729,903, filed on Sep. 11, 2018 and Indian Patent Application No. 201841034327, filed on Sep. 12, 2018, all of which are incorporated herein by reference in their entirety for all purposes.

FIELD

This application is related to configuring and managing user interfaces for one or more content guides. This application is also related to improving content provider systems for controlling provisioning of content.

BACKGROUND

Content management systems can provide user interfaces for end users to access the content provided by the content management systems. Content management systems may include, for example, digital media streaming services (e.g., for video media, audio media, text media, games, or a combination of media) that provide end users with media content over a network. Operators of these services may configure a user interface for end users to include a specific design that may include one or more layouts, content items, or other design elements. The user interface that includes the design specified by an operator may be loaded on a user device and used by the user to navigate through and access the content items provided by the content management system.

Different types of content provider systems have been developed to provide content to client devices (also referred to as user devices) through various mediums. Advances in networking and computing technologies have allowed for delivery of content over alternative mediums (e.g., the Internet). For example, advances in network and computing technologies has led to the creation of over-the-top media service providers that provide streaming content directly to consumers. Such over-the-top media service providers provision content directly to consumers over the Internet, subsequently bypassing telecommunications, multichannel television, broadcast television platforms, and other applicable content platforms and applicable communications channels that were traditionally used to provide content to users.

SUMMARY

In some examples, systems and techniques are described herein that provide an operator console system for content management systems such as digital media streaming services. In some cases, the operator console system can be part of a content management system and/or a content provider system. As noted above, different types of content provider systems provide content to user devices. For example, digital media streaming services can provide digital media (e.g., digital video, digital audio, among other media) to client devices over a communications network, such as the Internet. In another example, media broadcast services can broadcast media, such as television or radio content. Various other content provider systems are also available. Different content provider systems can provide different techniques and user interfaces access the content provided by the content provider systems. Further, various types of user devices (e.g., mobile devices, tablet computers, desktop computers, televisions, set-top boxes, among others) are available for accessing the content provided by content provider systems. Configuring, maintaining, and adapting user interfaces for various types of content and for various types of devices to enable efficient navigation and access to the content creates a challenge for content provider systems.

The operator console system can provide an operator console interface that allows operators (e.g., interface designers) of a content management system to efficiently configure (e.g., design and generate) and manage user interfaces. As noted above, in some cases, the content management system can include the operator console system. Once a user interface is configured by an operator using the operator console interface, the user interface can be sent to one or more end user devices. The user interface allows an end user (using a user device) to navigate and access content provided by the content management system.

One or more devices (e.g., server computers or other computing devices) associated with the operator console system can quickly and efficiently configure a design template that can be used for different views (e.g., pages) of a user interface (e.g., a content guide). The design template can be configured using input information defining parameters for each view. The input information can be provided (e.g., by an operator or interface designer) using the operator console interface. Using the input information and also using information defining attributes of different types of devices, the operator console system can automatically generate different layout designs for a view of the user interface. By using a common set of input information and the different device attributes, user interfaces with different layouts, content, and/or other features can be built for multiple devices in an efficient manner. The different design layouts can then be provided to the client devices by the one or more devices associated with the operator console system. For example, a first design layout of a view generated for a first type of device can be provided to one or more devices of the first type, and a second design layout of a view generated for a second type of device can be provided to one or more devices of the second type.

In some implementations, the operator console may also enable dynamic editing and/or control of aspects of a layout design of a user interface (e.g., by editing and/or controlling the content, the layout, and/or other elements of a layout design). In some cases, the operator console can also provide an option for an operator to preview one or more of the views of a user interface, which can be used to simulate how the user interface designs will be displayed (or rendered) on specific user devices. In some cases, the operator console can enable schedule changes in the designs and user experience over time. For example, certain layouts can be automatically generated based on a triggering event associated with a schedule.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 36 illustrates an example process for generating one or more user interface designs (or layouts), in accordance with various examples of the application;

FIG. 37 illustrates another example process for generating one or more user interface designs (or layouts), in accordance with various examples of the application;

FIG. 45 illustrates another screenshot of an example graphical user interface for managing provisioning of content through a content provider system;

DETAILED DESCRIPTION

Figure 1:
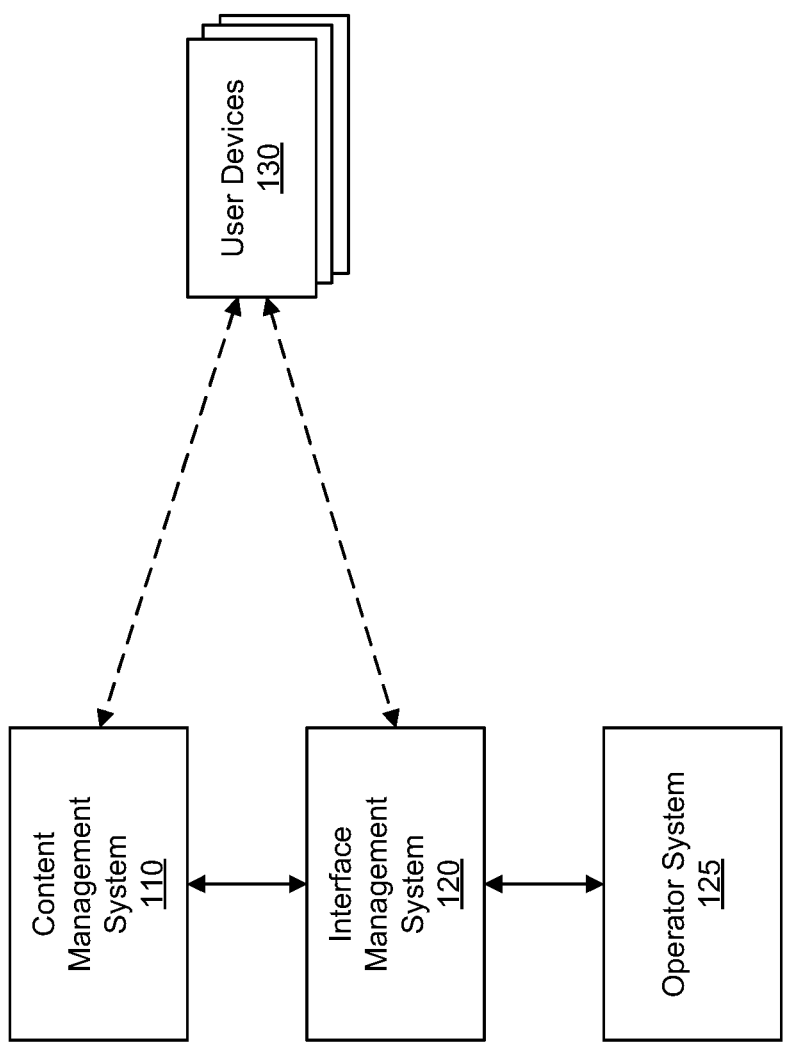
FIG. 1 illustrates an example network environment, in accordance with various examples of the application.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Content management systems can provide user interfaces that allow end users to access the content provided by the content management systems. Content management systems may include, for example, digital media streaming services (e.g., for video media, audio media, text media, dynamic media, games, or a combination of media) that provide end users with media content over a network. Operators of these services can configure a user interface to include a specific design that may include one or more layouts, content items, or other design elements. The user interface that includes the design specified by an operator may be loaded on a user device (also referred to as a client device or computing device) and used by the user to navigate through and access the content items provided by the content management system. In many cases, a user interface configured by an operator may need to be designed and updated for a large number of devices.

The user devices used to access the user interfaces and content associated with a content management system may be of varied types. For example, different types of user devices may include desktop computers with displays (e.g., a monitor or projectors), laptop computers, set top boxes, streaming devices, mobile devices (e.g., smart phones, tablets, or other mobile device), televisions (e.g., a network-connected, or smart, television), gaming devices, among others. The different types of user devices may have different display sizes, designs, capabilities, and/or specifications that cause a user interface to appear differently on one user device as compared to another user device. Furthermore, even user devices of the same type may have different display sizes, resolutions, aspect ratios, and/or other characteristics that may affect the consumption of content. For instance, a mobile telephone (e.g., a smart phone) manufactured by a particular company can have different sizes (e.g., one version can have a 4.7-inch screen and another version can have a 5.5 inch screen, with the length measured diagonally). As a result, a design for a user interface for one device may not be optimal for another device. As a result, operators are required to painstakingly build multiple designs for their user interfaces where each design may be specified for use on a particular user device. Further, user interfaces need to be updated over time as new content becomes available and as new designs are created. Large amounts of time and computing resources are needed to make changes to each individual page of a user interface. The burden on computing resources and time needed to generate modifications or updates to a user interface becomes even more problematic when generating modifications to a user interface across multiple types of devices. Further, in a system where there are large amounts (e.g., thousands or more) of client devices, the communication of new interfaces and associated data becomes a burden due to network limitations and processing delays that impact user experience. In one illustrative example, the large amount of updates needed in systems with numerous amounts of client devices can causes delays in updating client devices and/or in taking some other action to enact the change in user interface design, which in some cases can require that the application associated with the user interface to be restarted and/or reloaded.

Ensuring that the various designs of a content management user interface (e.g., a content guide providing video content, or other user interface providing content) provide a positive and consistent user experience across multiple devices is extremely difficult and time consuming. The process typically involves configuring a user interface design for a device, loading the design on the device, and checking to see if the design is as desired and consistent with other designs for the user interface on other devices. Furthermore, updating these designs over time or in response to particular events or schedules is even more difficult.

Systems, methods (also referred to as processes), and computer-readable media are described herein that allow efficient generation and updating of user interfaces across device types. For example, an operator console system is provided for content management systems, such as digital media streaming services (e.g., video content streaming services) or other content management systems. The operator console system provides an operator console interface for operators of a content management system to efficiently design, generate, and manage user interfaces that an end user may use (e.g., via a client device) to navigate and access content provided by the content management system. The operator console interface can include a user interface or a graphical user interface (GUI). The operator console system and interface allows an operator to quickly and efficiently build a design template for a user interface using a common set of input information, and to automatically generate designs for different device types based on the design template. In some cases, the operator console can automatically generate designs for other specific use cases (e.g., user profiles, schedules, etc.).

For example, one or more computer systems (or devices) associated with the operator console can configure a design template for different views (e.g., pages) of a user interface using input information defining parameters for each view. In some examples, the one or more computer systems can include one or more server computers. The input information can be provided (e.g., by an interface designer) using a client device of the operator console, such as a personal computer that is in communication with the server of the operator console. Using the input information and also using information defining attributes of different types of devices, the operator console can automatically generate different layout designs for one or more views of the user interface. The different layout designs can then be deployed by the server to the devices for which the layout designs were designed (e.g., a first layout design generated for a first type of device, a second layout design generated for a second type of device, and so on). By using a common set of input information and the different device attributes, the operator console can generate user interfaces with different layouts, content, and/or other features for different devices in an efficient manner.

In some implementations, the operator console may also enable dynamic editing and/or control of aspects of a layout design of a user interface (e.g., by editing and/or controlling the content, the layout, and/or other elements of a layout design). In some cases, the operator console can provide a preview option for an operator to preview one or more of the views of a user interface. The preview option can be used to simulate how the user interface designs will be displayed (or rendered) on specific user devices. In some examples, the operator console may also enable dynamic control of the content, layout, and other elements of the design. In some cases, the operator console can enable changes in the designs of a user interface based on scheduled events or triggers, providing a change in the user interface (and thus the user experience) over time. In some cases, the operator console can enable the operator to simulate the designs on one or more devices in accordance with a schedule or future moment in time.

FIG. 1 illustrates an example network environment, in accordance with various embodiments of the subject technology. The network environment 100 of FIG. 1 includes a content management system 110, an interface management system 120, an operator system 125, and one or more user devices 130. In some examples, the content management system 110 and the interface management system 120 can be part of a same system. For example, a service provider system can include the content management system 110 and the interface management system 120. In some examples, the content management system 110, the interface management system 120, and the operator system 125 can be part of a same system, such as a service provider system.

The content management system 110 may be configured to enable the user devices 130 to stream or access content over a network (e.g., the Internet). For example, the content management system 110 may be a digital media streaming platform that allows end users to access digital media content or services on their user devices 130. An example digital media streaming platform may be an interactive digital content platform that allows user devices 130 to stream media content (e.g., video content, audio content, or other media content) over cable, satellite, the Internet, any combination thereof, and/or other communication means. The media content may include, for example, video-on-demand (VOD) content, audio-on-demand (e.g., a music service, an audio book service, a podcast service, and/or other audio content service), broadcasted content, over-the-top (OTT) content, any combination thereof, and/or content from any other sources or combination of sources. VOD or other on-demand content may include content that users may select for viewing, listening, or the like at a particular time. Broadcasted content may include content dispersed to an audience (often a large audience) via any electronic mass communications medium (e.g., using an electromagnetic spectrum) in a one-to-many model. OTT content may include content provided by content providers that distribute streaming media as a standalone product (e.g., over the Internet), bypassing telecommunications, multichannel content (e.g., television), and broadcast media (e.g., television) platforms. In some implementations, a digital media streaming platform can include other types of content in combination with video as a stand-alone content offering, which can include audio content (e.g., music, audio books, podcasts, among others), news content, games, other content, or any combination thereof.

Users, by operating the user devices 130, can navigate, select, and/or view the content provided by the content management system 110 through a user interface on the user devices 130. The user interface can include a graphical user interface (GUI) that allows a user to navigate, select, and/or view the content. One example of a user interface includes a content guide providing content accessible using the content guide. Examples of content guides include electronic programming guides (EPGs), web interfaces (e.g., a web page) that provide access to content, applications (e.g., desktop computer applications, mobile applications or other applications) that provide access to content, among others. The content accessible through a user interface can be provided from various content sources (e.g., a sports content provider, VOD content provider, a movie content provider, a network television content provider, among others).

The user devices 130 can be different types of devices, referred to as device types (e.g., tablet, laptop computer, mobile phone, set-top box, television, among others). The different device types have different attributes or characteristics, such as resolution (e.g., corresponding to screen size), screen type, aspect ratio, memory, bandwidth, compute power, portrait or landscape screen orientation, and/or other attributes. In some case, the users and user profiles associated with the users may also be of different user types (e.g., adult, under 18 years of age, visually impaired, etc.) and/or may have different user profile information (e.g., settings, preferences, viewing history, recommendations, etc.).

Attributes or characteristics of the different types of user devices 130 (and in some cases other types of user devices that are not in communication with the interface management system at a particular point in time) can also be provided to the interface management system 120. For example, different types of user devices (e.g., tablet, laptop computer, mobile phone, set-top box, television, among others) can be registered with the interface management system 120. During registration of the different types of devices, information defining the attributes or characteristics of the types of devices can be provided to the interface management system 120. As noted above, the attributes or characteristics can include resolution (e.g., corresponding to screen size), screen type, aspect ratio, memory, bandwidth, compute power, portrait or landscape screen orientation, and/or other attributes.

The interface management system 120 is configured to provide an operator console interface that is accessible by an operator through the operator system 125. For example, the operator console interface can include a user interface or a GUI. The interface management system 120 can include one or more servers and the operator system 125 can include an operator console client device. The operator console client device can be in communication with a server of the interface management system 120. The server can make changes to a user interface (e.g., a content guide or other user interface) based on input provided through the operator console interface. Operators can use the operator console interface (e.g., implemented as a GUI) to design, build, and manage the user interfaces that end users may use on their user devices 130 to navigate and access content provided by the content management system 110. For example, the interface management system 120 may provide the operator console to the operator system 125, where an operator may build a design template for the user interface. In some cases, the operator console interface can allow an operator to design each view of a user interface. As used herein, a view refers to each page or layer of a user interface.

Based on the design template generated for the user interface, the interface management system 120 can automatically generate a number of designs for different user devices 130, for specific users, for specific organizations and/or companies, and/or for other use cases. For example, using a common set of input information provided through the operator console interface and using the information defining the attributes of the different types of user devices 130, the operator console can generate different layouts for one or more views of the user interface for the different types of user devices 130. By generating the different designs based on the design template, the interface management system 120 enables operators to generate multiple designs of a user interface for multiple devices more quickly and with fewer steps. Furthermore, the designs generated based on the common design template may share common characteristics and may provide the user with a more consistent user experience.

In some examples, the operator system 125 can provide a preview function to allow an operator to preview the various designs. The preview simulates how the designs will look on different devices, how the designs will look for different users, and/or provide a simulation for any other suitable use case. The operator, using the operator console interface, may also make changes to the design template or the individual designs generated based on the design template, may implement (e.g., activate) the designs for use and dissemination to the user devices 130, and/or may schedule the implementation of the designs at a later scheduled time. The operator console interface may also enable the operator to view the various designs that have previously been generated, implemented, and/or scheduled. In some cases, additional content information (e.g., cover art, descriptions, or other content metadata) may be needed to generate a simulated rendering of how each design or design template will appear on a specific device and/or to a specific user. Accordingly, to preview or view a design or design template, the interface management system 120 may request the additional content information from the content management system 110, and can render the design or design template in accordance with the additional content information. If the rendering is associated with a future point in time, the interface management system 120 may specify the time period in the request to the content management system 110 so that the appropriate content information for the specified time period may be retrieved.

According to some embodiments, once the design template is generated based on input from the operator using the operator system 125 and/or based on the information defining the attributes of the different types of device 130, the interface management system 120 can generate the various layouts or designs. The interface management system 120 may then provide the layouts to the content management system 110 for use and dissemination to the user devices 130. In some cases, the layouts can be used to update the user interface on the user devices 130. In other embodiments, the interface management system 120 can transmit the design template to the content management system 110, and the content management system 110 can generate the layouts or designs for use in the user interface. In still another embodiment, the design template may be transmitted to the end user devices 130, and the end user device 130 can generate an appropriate design or layout for the user interface based on the design template.

The network environment of FIG. 1 is provided for illustrative purpose and may be in various other configurations and may include additional, fewer, or alternative components in different configurations. For example, in some embodiments, the content management system and the interface management system may be a part of the same system or platform. Alternatively or additionally, the interface management system and the operator system may be a part of the same system or platform. In some embodiments, the content management system may be a digital content provider system as will be illustrated in further detail with respect to FIG. 2.

Figure 2:
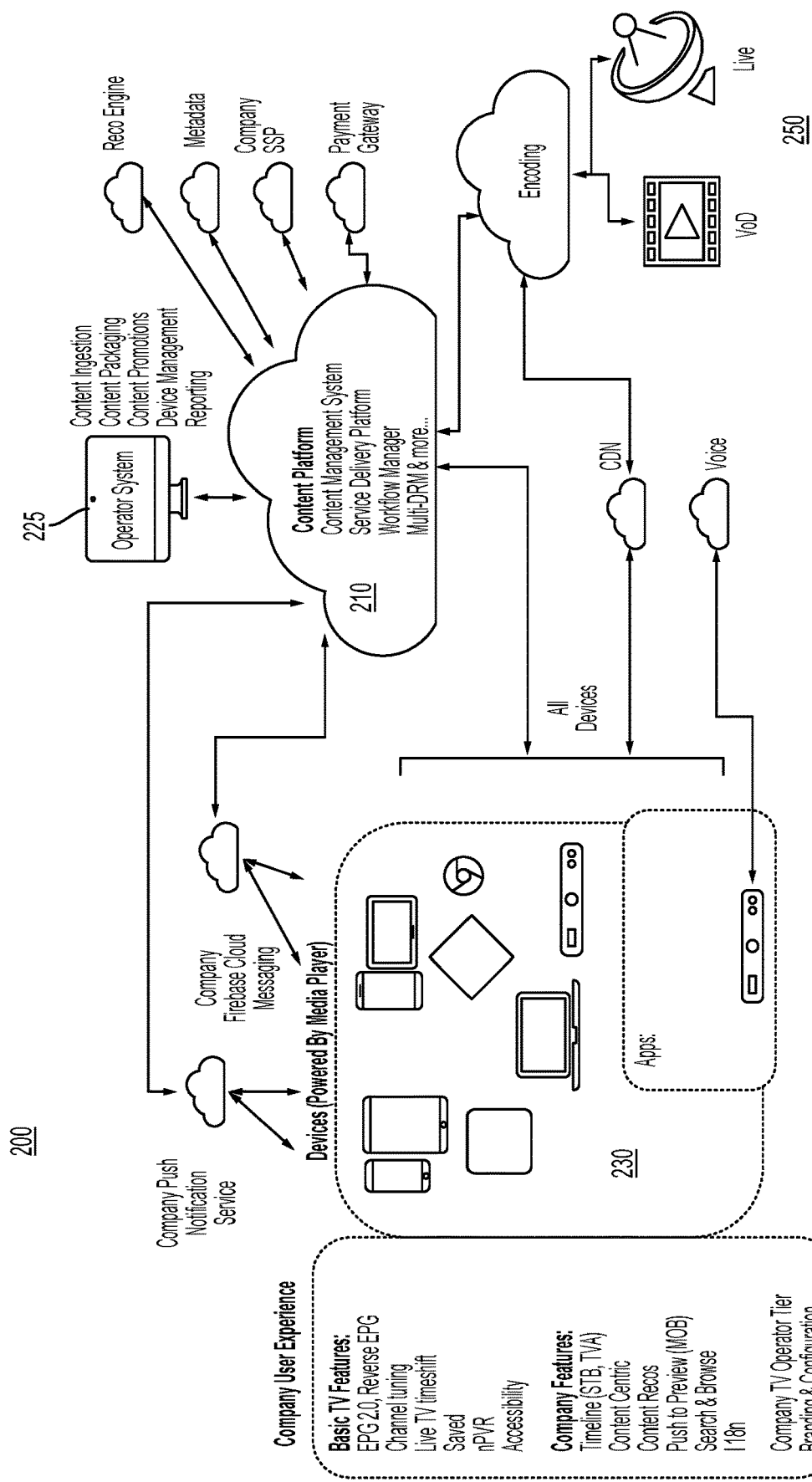
FIG. 2 illustrates an example digital content provider environment, in accordance with various examples of the application.

FIG. 2 illustrates an example digital content provider environment 200, in accordance with various embodiments of the subject technology. The digital content provider environment 200 includes a digital content provider system 210, an operator system 225, various end user devices 230, and various content sources 250. The digital content provider system 210 (e.g., the OpenTV platform) may include components corresponding to the interface management system 120 and the content management system 110 of FIG. 1. The digital content provider system 210 is configured to transmit digital media content (e.g., video content, audio content, a combination of video and audio content, and/or other media content) to the various user devices 230. In one illustrative example, the digital content provider system 210 enables a user to navigate, select, and stream digital video content via a user interface (e.g., a GUI) on a user device. In some cases, the user interface can include a content guide with different views (or pages) providing content accessible using the content guide. As used herein, a view corresponds to each page of a user interface that can be used to access content. While examples of the content provided by the digital content provider environment 200 are described as including video content, one of ordinary skill will appreciate that the content can also include audio content, metadata content, and/or any other suitable type of content that can be provided with video content.

The content can be transmitted to the various user devices 230 using one or more communication means (e.g., over cable, satellite, internet, any combination thereof, and/or other communication means). The digital video content may be from various content sources 250 including, for example, video-on-demand (VOD) content, broadcasted content, over-the-top (OTT) content, any combination thereof, and/or content from any other sources or combination of sources. The content sources 250 can include content from specific content providers, such as a sport content provider, a VOD content provider, a network television content provider, a movie content provider, among others. In some cases, the content may be retrieved over a network and preprocessed (e.g., encoded) before being received by the digital content provider system 210. The digital content provider system 210 may provide additional services through the user interface. In some cases, these services may be provided by third-parties.

The digital content provider system 210 may also be configured to provide an operator console interface (e.g., a user interface, a GUI, or the like) where operators may design, build, and manage the user interfaces that that will be used on the various end user devices 230. For example, the digital content provider system 210 may communicate with an operator system 225, and may enable an operator console to be loaded on the operator system 225 (e.g., using a web browser, a native application, and/or other suitable program). The operator may user the operator console interface to build a design template for the user interface. Based on the design template, the digital content provider system 210 can automatically generate a number of designs or layouts for different types of user devices 230, for specific users, and/or other use cases. By generating the different designs based on the design template, the digital content provider system 210 enables operators to generate multiple designs more quickly and with fewer steps. Furthermore, the designs generated based on the common design template may share common characteristics and provide the user with a more consistent user experience.

Figure 3:
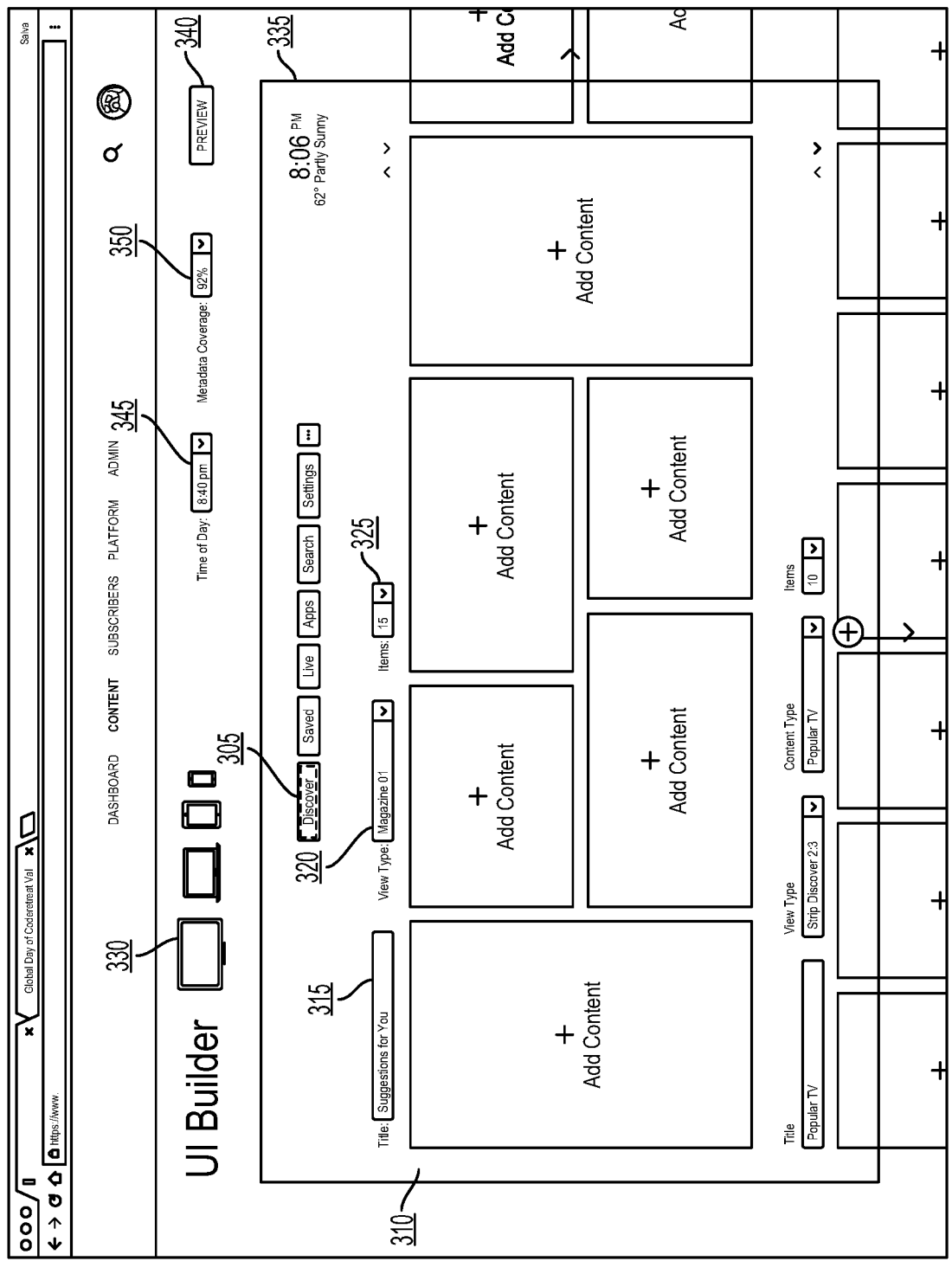
FIG. 3 illustrates an example operator console interface, in accordance with various examples of the application.

FIG. 3 illustrates an example operator console interface 300, in accordance with various embodiments of the subject technology. The operator console interface 300 can include a user interface or graphical user interface (GUI). The operator console interface 300 may be provided by, for example, the interface management system 120 of FIG. 1 or the digital content provider system 210 of FIG. 2, and may be displayed on an operator system (e.g., operator system 125 and/or operator system 225). The operator console interface 300 may be displayed on a client device of the operator system via an application (e.g., a web browser or native application) configured to communicate with the interface management system 120 of FIG. 1 and/or the digital content provider system 210 of FIG. 2.

An operator may use the operator console interface 300 to configure (e.g., design and generate) and manage designs and design templates for user interfaces that that will be used on various end user devices. In FIG. 3, the operator console interface 300 shows the configuration of a design template for a digital video content interface, although other types of interfaces (e.g., audio content interface that can provide access to music content, audio book content, podcast content, any combination thereof, and/or other content, an interface for a food service, an interface for a car service, or other type of interface) may be similarly configured using the techniques described herein. The design template may include a number of views or pages (e.g., a "discover" page, a "saved" page, a "live TV" page, an applications page, a search page, a settings page, etc.), each with different content, designs, and/or functionality. Each page may include interface elements such as content tiles, rows of content tiles, columns of content tiles, panels, and/or other interface elements that may be used to build a layout of the design template. Each content tile may further include requirements, preferences, conditions, and/or other information that may be used to select particular content items to display in the content tile.

As seen in FIG. 3, a "discover" page option 305 in the design template has been selected, causing a "discover" page (or view) to be shown in the operator console interface 300. Using the operator console interface 300, an operator may configure, change, and/or manage the look and functionality of each page (including the "discover" page) in the design template using various interface elements. For example, the operator can add a new section of content tiles 310, specify a title for the section of content tiles 310 using interface element 315, specify a layout type for the section of content tiles 310 using interface element 320, and specify how many content items or tiles are to be included in the section of content tiles 310 of the "discover" page using interface element 325. The operator may also delete, modify, or add other design template elements on any of the other pages in the design template.

As noted above, a number of design layouts for different user devices, specific users, and/or other use cases may be generated on the design template and implemented. The operator console interface 300 also allows an operator to view how each design template might look on different types of devices. For example, using interface element 330, the operator may select different types of devices (e.g., a TV, a laptop or computer, a tablet, a smart phone, etc.). Based on the selection of interface element 330, the operator console interface 300 may display a border 335 that illustrates how the design template might look on that device. For example, if a TV device type is selected, a border corresponding to a TV device may be selected and displayed. On the other hand, if a tablet device type is selected, a border corresponding to a tablet device may be selected and displayed. The borders for each of the device types may be different based on the different characteristics (e.g., screen size, resolution, orientation, aspect ratio, etc.) of the respective device types.

In some embodiments, the design template may not include specific content items, but instead may specify requirements, preferences, conditions, and/or other information that may be used to select particular content items to display in the content tile. For example, the design template may specify that a content tile is to include a "recommended" content item. The recommended content item may be specified by, for example, content management system 110 or interface management system 120. The recommended content items may also vary based upon the current time and/or based on other information (e.g., usage information, as described below regarding to the content optimization systems and techniques described with respect to FIG. 38 FIG. 48).

In some cases, the operator may wish to generate a live view or preview of the design template to simulate what an end user may see on a particular type of device. For example, the operator may select the preview interface element 340 to generate the live preview. In some cases, the content included in the user interface and/or the layout of the user interface may change over time. Accordingly, the operator console interface 300 also includes an interface element 345 that allows the operator to simulate the view of the design template for a particular time and/or date. For example, the operator can select a time and/or date using interface element 345, and the operator console interface 300 can generate a view of the design template as would be shown for the selected time and/or date. The operator console interface 300 also includes an interface element 350 that allows the operator to specify one or more attributes related to use or display of metadata for the design template. Metadata for a content item may include, without limitation, cover art, descriptions, summary, details, etc. for the content item. In one example, interface element 350 may enable an operator to configure metadata coverage for a design template. Metadata coverage may be configured for an amount of use, one or more types of metadata, a location of metadata, or other attributes related to metadata. In the example shown in FIG. 3, the metadata coverage is configurable for metadata coverage, which indicates how much metadata will be displayed.

Figure 4:
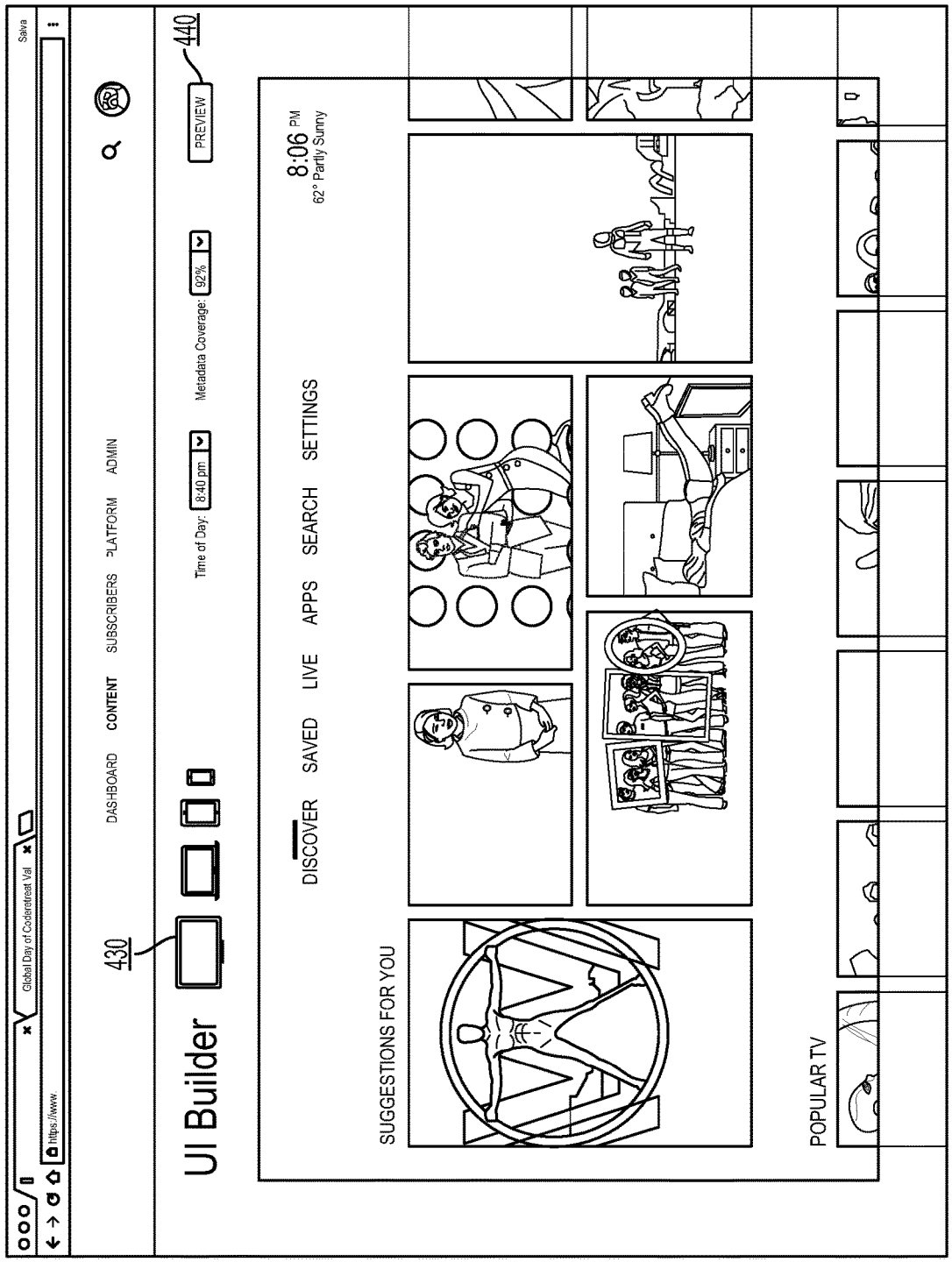
FIG. 4 illustrates an example operator console interface showing a live view of a design template, in accordance with various examples of the application.

FIG. 4 illustrates an example operator console interface 400 showing a live view of a design template, in accordance with various embodiments of the subject technology. The operator console interface 400 can include a user interface or a graphical user interface (GUI). The live view shown in FIG. 4 may be displayed as a result of an operator selecting the preview interface element 340 of FIG. 3. In FIG. 4, the metadata (e.g., cover art, descriptions, summary, details, etc. for a content item, etc.) for the content items are retrieved and rendered in the content tiles of the design template in accordance with the time and date specified in FIG. 3. As a result, an operator may quickly and efficiently determine how the various designs generated based on the design template may appear to an end user using various user devices. The operator may toggle between different device live views using interface element 430. If additional changes are desired, the operator may select interface element 440 to go back to the template editing view illustrated in FIG. 3.

Figure 5A:
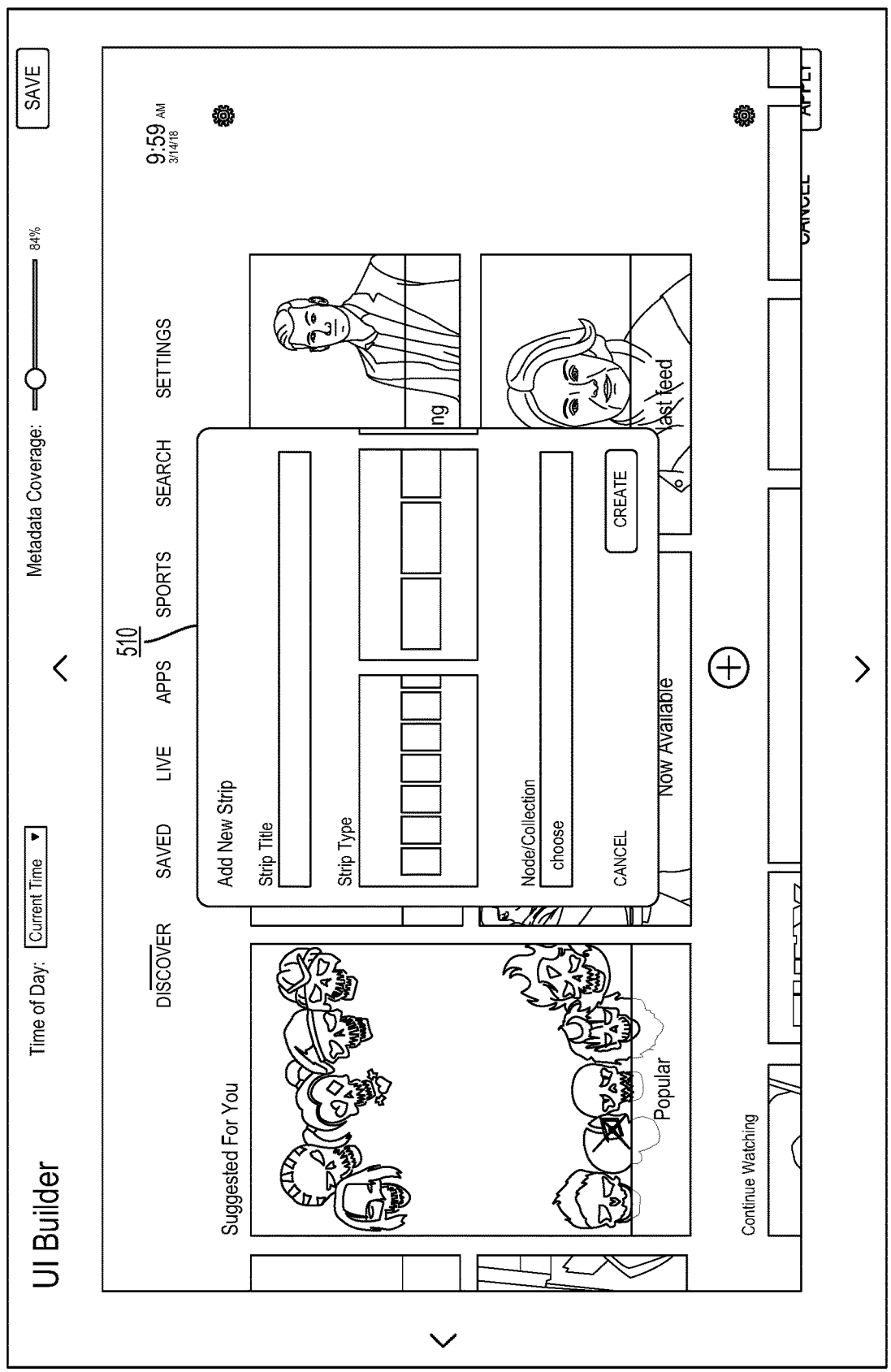
FIGS. 5A and 5B illustrate example operator console interfaces showing editing features in a live view of a design template, in accordance with various examples of the application.
Figure 5B:
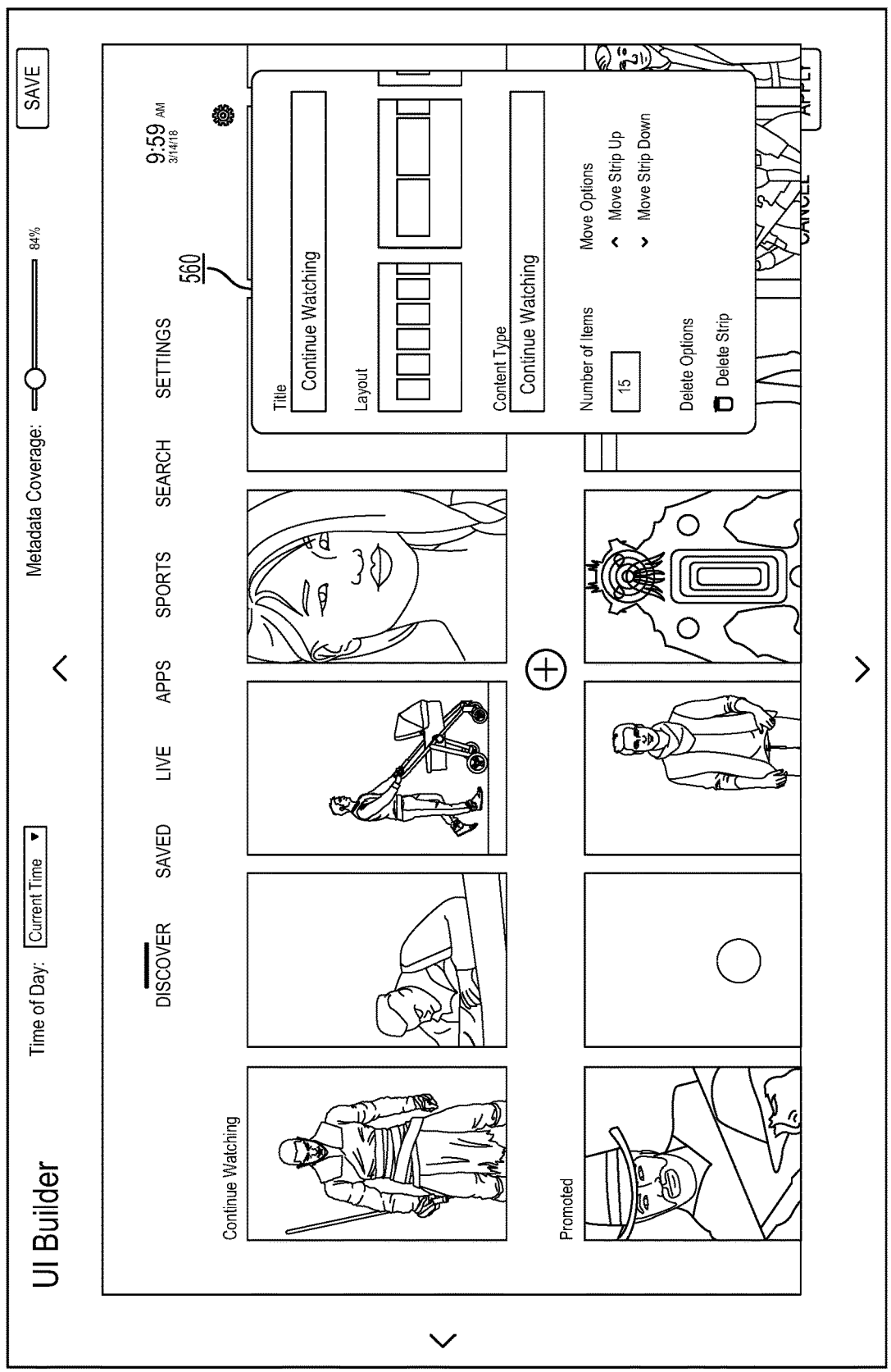

According to some embodiments, the operator console interface enables the operator to make changes to a design template and/or to a design of a specific view (or page) directly in the live view interface of the operator console interface. For example, FIGS. 5A and 5B illustrate example pages (page 500 and page 550) of an operator console interface showing editing features in a live view of a design template, in accordance with various embodiments of the subject technology. The page 500 includes an interface element 510 that allows for operators to add a new content strip and/or otherwise make changes to the design of the discover page (or view) of the user interface. The page 550 of FIG. 5B includes an interface element 560 that allows for operators to move, delete, and/or otherwise edit (e.g., rename, assign content types, specify a number of content items, etc.) elements of the user interface design.

The operator console system (via the operator console interface) also enables an operator to make specific changes to a content tile of the user interface that includes one or more items of content. For example, the operator may select a specific content tile and assign or reassign a content item to the content tile as well as make changes to other data associated with the content tile. In some embodiments, a content tile may be assigned a primary content definition as well as one or more secondary content definitions that serve as a backup. The primary content definition specifies content to be assigned to the content tile. The primary content definitions may specify a particular content item, and/or may specify conditions and criteria for selecting content for dynamic content tiles. Examples of dynamic content tiles may include, for example, a "view next" content tile that includes the next unviewed content item in a series of content items (e.g., the next episode in a season). The secondary content definitions may serve as a backup if no content items are identified based on the primary content definition. For example, if there are no more unviewed content items in the series of content items, a secondary content item may be assigned to the content tile. In some embodiments, the operator console system enables an operator to configure different aspects of the user interface, including the source of content, attributes of the content (name, title, promotion, and/or other suitable content attributes), metadata about the content (e.g., image, size, position, and/or other suitable metadata), and/or layout of the content (e.g., view type, number of items, number of rows of items, and/or other suitable layout characteristics), by providing input fields in the operator interface through which an operator can provide information defining the different aspects of the user interface. The operator console system enables the operator to view metadata coverage for a particular item(s) of content, for example by providing the interface element 350 shown in FIG. 3. Examples of an operator console interface are described below with respect to FIG. 6A-FIG. 9, FIG. 11-FIG. 35, and FIG. 49-FIG. 61.

Figure 6A:
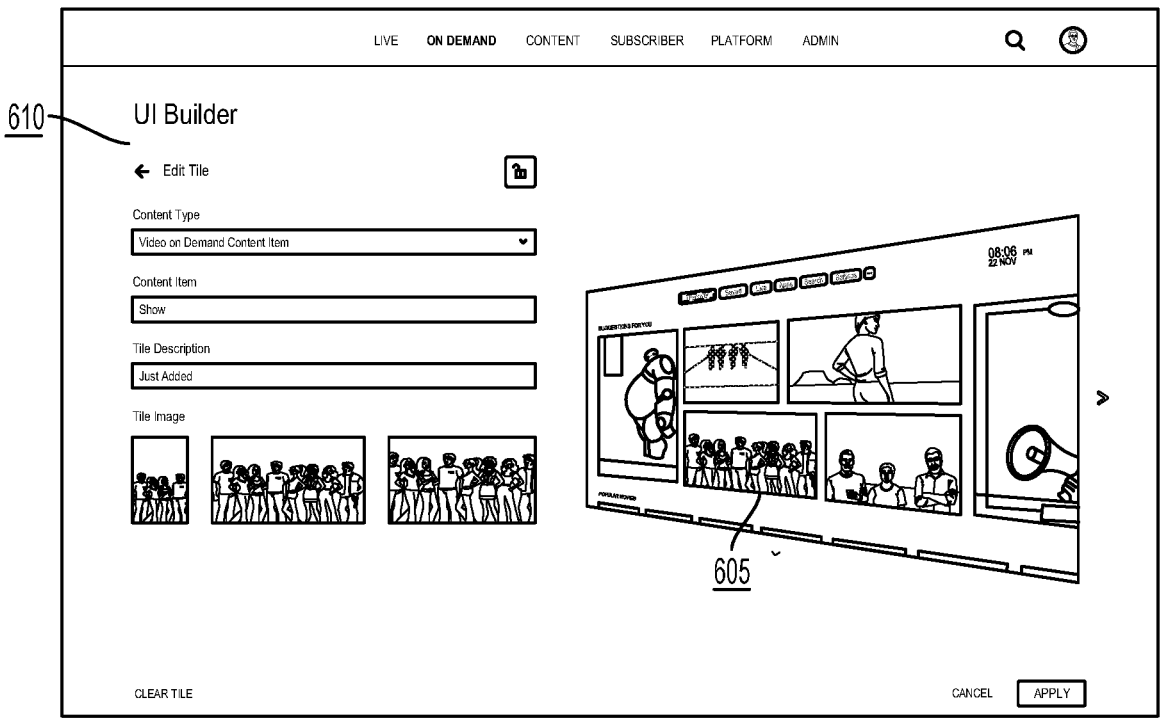
FIGS. 6A and 6B illustrate an example operator console interface configured to make changes to a content tile, in accordance with various examples of the application.
Figure 6B:
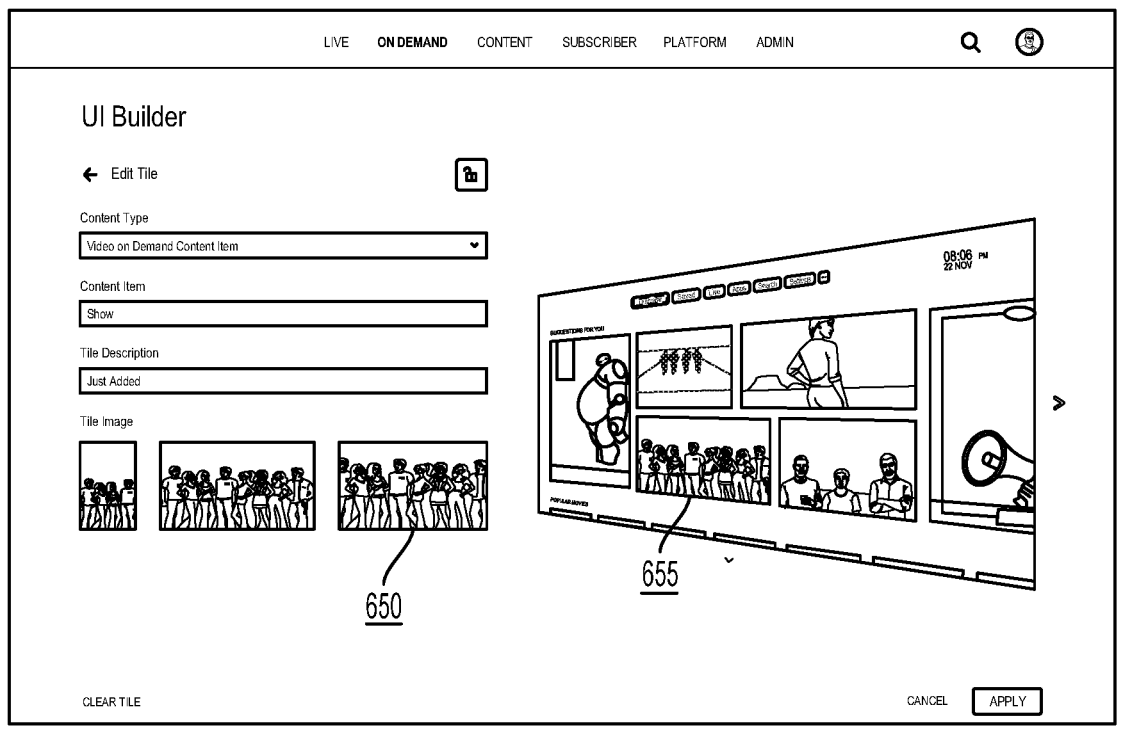

FIGS. 6A and 6B illustrate example pages of an operator console interface (e.g., implemented as a user interface or graphical user interface (GUI)) configured to make changes to a content tile, in accordance with various embodiments of the subject technology. In FIG. 6A, a particular content tile 605 may be selected. Based on the selection, the operator console interface may display an "edit tile" page 610 that allows the operator to specify and/or edit content for the content tile 605. For example, the operator may select a content item from various sources, specify or change the content type, the tile description, or metadata associated with the tile (e.g., a tile image or artwork). Accordingly, the operator can promote and specify particular content items in selected content tiles. For example, in FIG. 6B, the tile image 650 is selected and, as a result, the content tile 655 in the design is updated to reflect the selection.

Using the interface elements in the operator console interface, an operator may promote an item and choose a specific location for the promotion within a design template or design of the user interface. Additionally the operator may select one or more collections of content items to promote, allocate a recommendation to one or more content tiles or content strips or other arrangement of content tiles, and/or select a preferred content image for display.

Although having a preview of how a design template is rendered into designs for a user interface is important for operators configuring and managing the design template, additional views may also be beneficial. According to some embodiments, the operator console interface may enable various views of the user interface design template or individual designs for the operator. For example, the operator console interface may provide a simulation mode, a page view mode, and a global view mode. In other embodiments, however, there may be additional modes, fewer modes, or alternative modes. The simulate mode may provide a preview of how a design template may be rendered on a device. For example, the operator console interface 400 of FIG. 4 is shown in a simulate mode and provides a preview of how a design template may look on a television device. However, configuring a design template or making changes to the design template or specific designs (that are based on the design template) may be difficult to do in the simulate mode, because the simulated screen space is small and it may be difficult to see how certain design elements fit in with the overall page. Accordingly, the operator console system provides a page view mode, which can be selected by an operator to render a page view that displays all contents of a currently selected or active page (e.g., the "discover" page, the "live" page, the "on demand" page, etc.).

Figure 7:
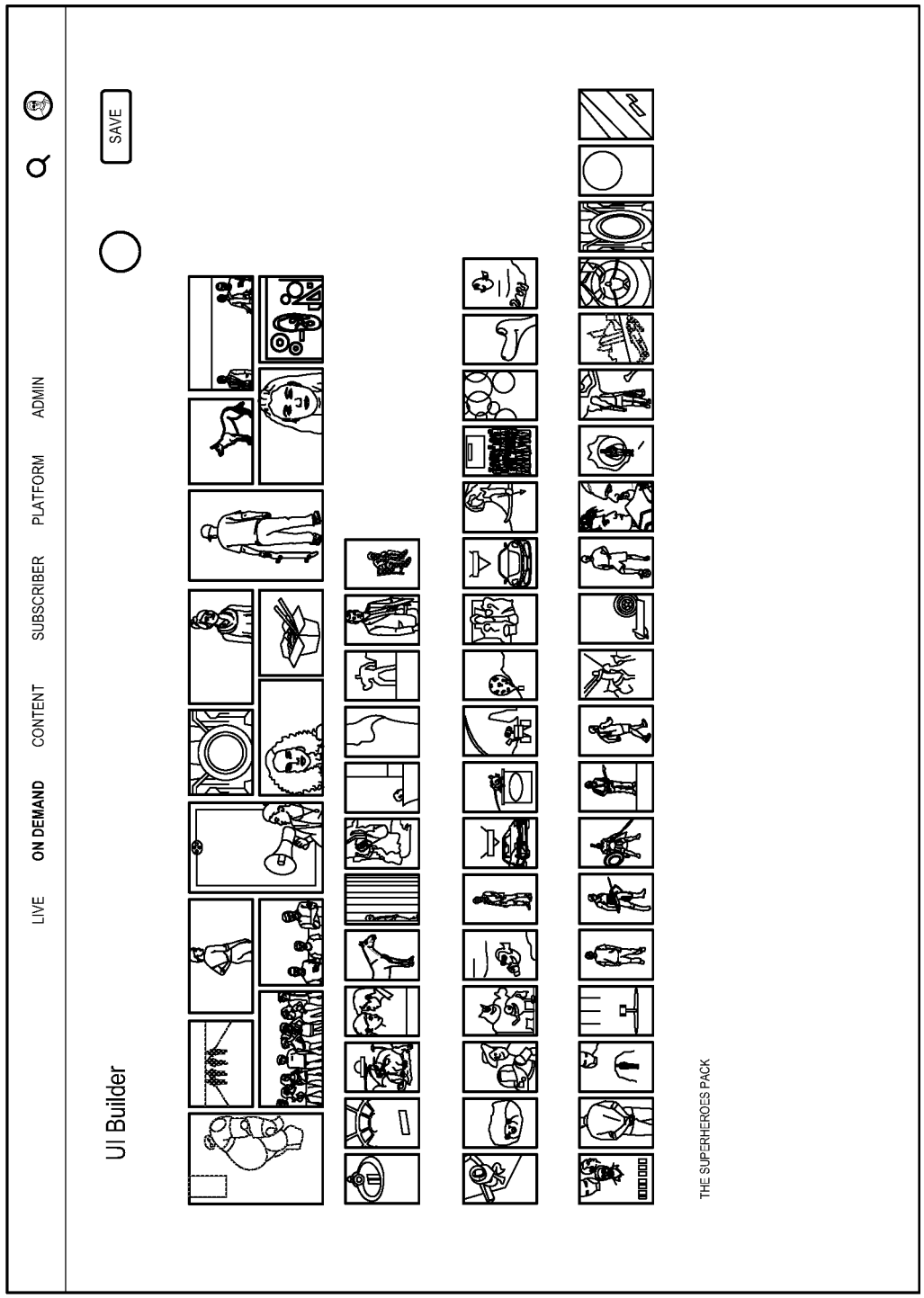
FIG. 7 illustrates an example operator console interface in a page view mode, in accordance with various examples of the application.

FIG. 7 illustrates an example of a page view mode of the operator console interface, in accordance with various embodiments of the subject technology. Instead of simulating a view screen of a user device, the page view mode displays all contents of a page of the design template. The page view mode allows the operator to view certain design elements (e.g., content strips, content tiles, content list, content magazine arrangement, etc.) in context. Furthermore, the page view mode may allow the operator to more easily make changes and configure the layout of the page in the design template. For example, the operator may select a context strip at the bottom of the page (that might not be visible in the simulate mode when the screen is focused on the top of the page) and move the context strip up or otherwise reorder the layout of the page.

The operator may also toggle a global view mode that displays all pages of the design template in one place. For example, the global view mode may display the "discover" page, the "live" page, the "on demand" page, and all other pages (or a subset of all the pages) of the design template in a single view so that the operator may view the entire design template (or a large portion of the design template) without the need to navigate to other portions of the operator console interface. Such a global view allows an operator to compare pages across the design template. This is useful for determining consistency, changing logos, changing backgrounds, selecting primary focus colors or themes, and/or any other global changes that may affect multiple pages in the design template. An operator can also go back to the page view to edit a particular page.

Figure 8:
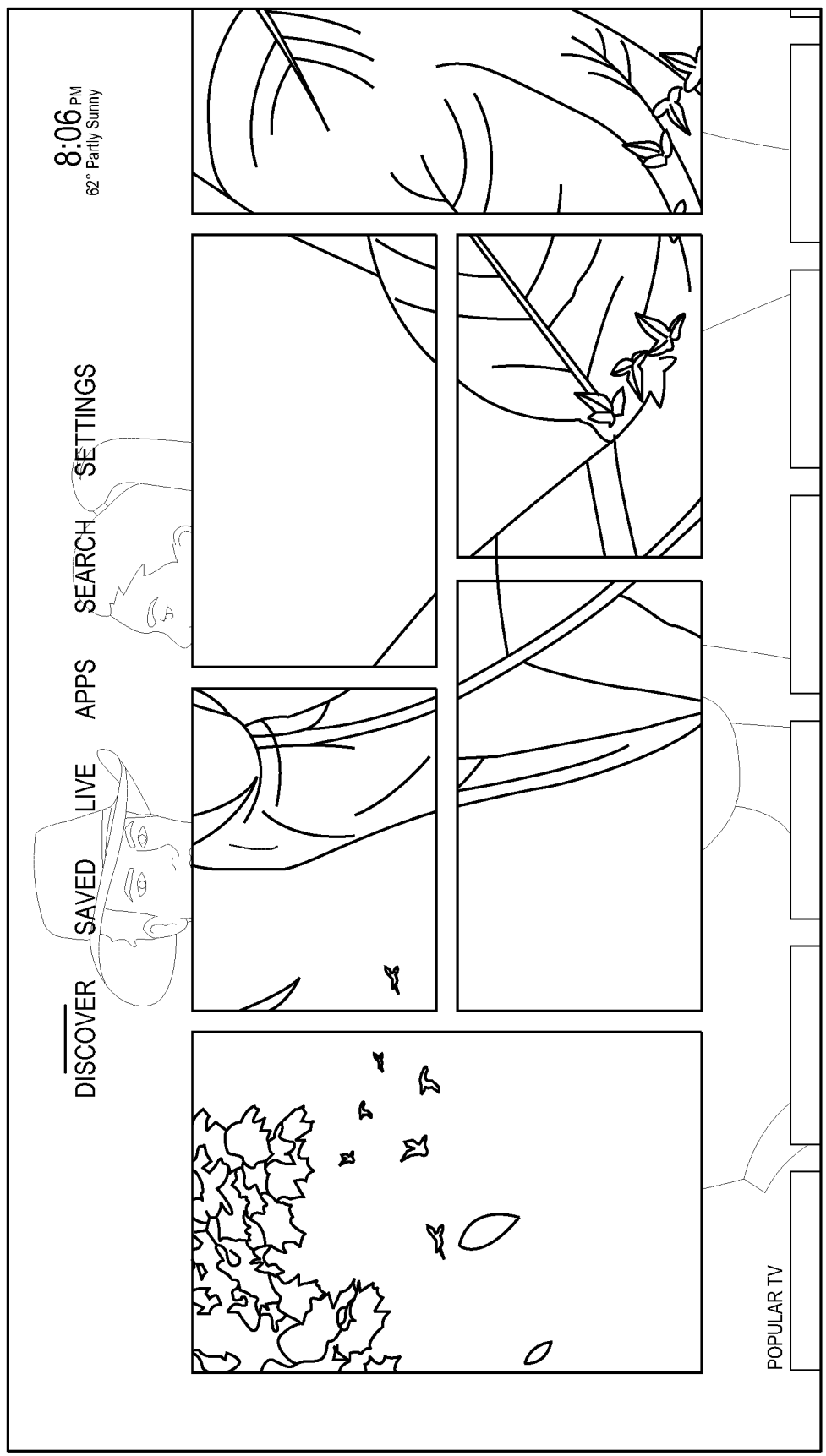
FIG. 8 illustrates an example user interface design that includes a mosaic design, in accordance with various examples of the application.

The operator console system may allow an operator to create various design templates using the operator console interface, generate designs for user interfaces of various end user devices based on the design template, and schedule the activation of one or more design templates or designs. By allowing for the configuration and changing of user interface designs easier, faster, and with fewer steps, more designs may be scheduled and used, thereby providing a more dynamic end user experience. In some scenarios the schedule of designs may be configured to build anticipation or audience for an anchor content item or event. For example, popular sporting events, movie premiers, or special events may provide an anchor content item or event at a particular time. Operators may schedule designs around the anchor content item or event to provide additional related content items, promote some related content, and/or build excitement for the anchor content. The layout may also be configured for special layouts. For example, FIG. 8 illustrates an example user interface design that includes a mosaic design, in accordance with various embodiments of the subject technology. The mosaic design may include a set of content tiles that each includes a portion of an image associated with a content item. The set of content tiles may be arranged as a mosaic representing the image associated with the content item.

Figure 9:
FIG. 9 illustrates an example operator console interface that includes a layout schedule interface, in accordance with various examples of the application.

FIG. 9 illustrates an example of a layout schedule interface 900 of the operator console interface, in accordance with various embodiments of the subject technology. Once an operator is satisfied with a design template, the operator may save the design template and schedule the activation of the design template (and the designs generated from the design template) using the operator console interface 900 illustrated in FIG. 9. The operator console interface 900 shows information 905 about a saved design template including a title for the design template, a schedule for activation, a last modified timestamp, and/or other information. The operator console interface 900 may also include a preview 910 of the design template. The operator can view more details about the design template, remove the design template (e.g., the layout), edit the design template using interface element 915, and/or change the schedule of activation for the design template using interface element 920.

The operator console interface 900 also includes a layout schedule interface 950 that shows the schedule of design template activations. In some embodiments, the schedule of design templates may be for a particular device, user profile, use case, any combination thereof, and/or other combination of conditions. Using the layout schedule interface 950, an operator may view the schedule of design templates and may select one or more design templates for viewing. For example, the operator may select interface element 955 that corresponds to the design template associated with the information 905 and preview 910 shown above the layout schedule interface 950. The operator can select other design templates scheduled for different times and can quickly see how many design templates are scheduled for a particular day be seeing how many dots representing design templates are listed in the column associated with that day. The operator may also create a new design template using interface element 960. Operator console interface 900 shows a particular layout schedule interface 950, however other types of layout schedule interfaces may also be used.

In some examples, based on the layout schedule 950, one or more triggering events can cause the release of or a modification (or update) to a design template. Illustrative examples of triggering events include a sporting event (e.g., the Super Bowl, a World Cup soccer match, an Olympics event, or other sporting event), a calendar date (e.g., a presidential coronation, a holiday, or other particular date), a release of a program, a release of a movie, an update of an application, support for a new device platform, adding a new content provider, among others. The triggering events can be maintained by the interface management system (e.g., system 120 and/or system 220) and/or the operator system (e.g., system 125 and/or system 225) so that the design template can be released or modified according to the triggering events. In some cases, a particular view or page of the user interface with different layout designs (according to the attributes of the different devices) can be deployed to the different devices based on a triggering event. For example, on the date a new movie is released, a user interface view including customized content related to the movie can be deployed to the user devices so that the user interfaces of the user devices can display the customized user interface view. The customized user interface view can allow a user to access (via a user device) the movie and any other content related to the movie.

The interface management system (e.g., interface management system 120) can automatically deploy modifications (or updates) to a user interface across different types of devices based on a triggering event detected by the operator console system and/or detected by the interface management system. For instance, constantly changing the layout of different views of the user interface based on different events can require a large amount of time and effort for an operator. Incorporating the scheduling and triggering events noted above, an event can be detected in advance and an appropriate layout design can be generated with content from a content source related to that event. When the event occurs according to the schedule, or a predetermined time period the event, the layout can be sent to the appropriate user devices for display.

According to some embodiments, the operator console system may provide controls on the operator console interface to enable the operator to view demand (e.g., social media, trends, statistics) on content, which may be used to select content or control content displayed based on the selected demand. Demand may be integrated from Content Rights optimization which includes statistics and measures with respect to content agreements and trends. Content optimization techniques are described in more detail below with respect to FIG. 38-FIG. 48. The operator console can provide a preview of the appearance of the user interface based on the selected layout and device type/platform. The operator console enables the operator to drag and drop and/or interact to change a layout and/or content. The content may be dynamically replaced in the layout based on criteria configurable by the operator. The criteria may be defined based on one or more sources, such as social media and trend reports. The design template may be built specific to a user or groups of user. Content may vary by region or operator, so the design template and/or the designs generated from the design template may be configured such that content is presented with respect to the constraints.

Figure 10:
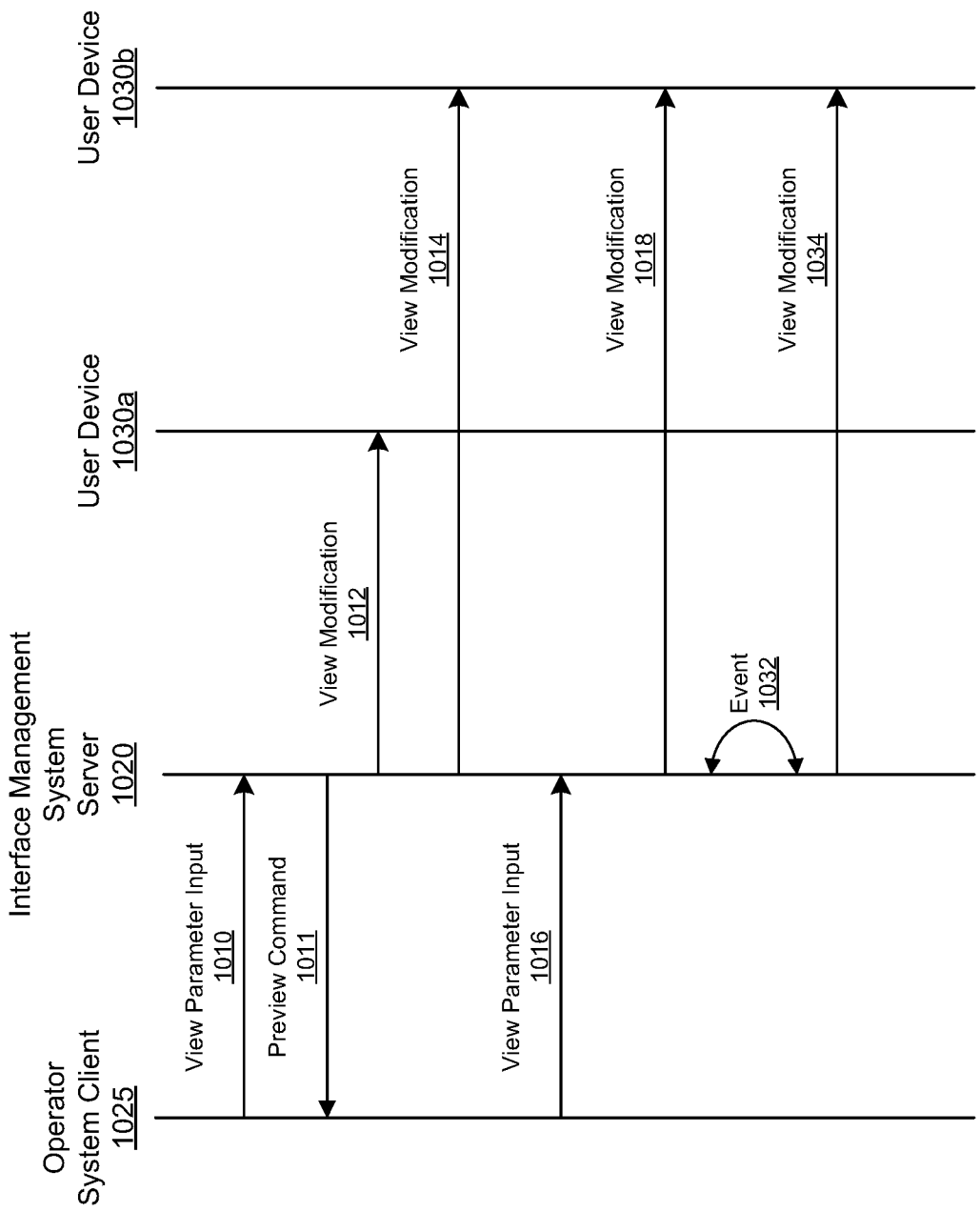
FIG. 10 is a diagram illustrating an example of communications exchanged among an operator system client, an interface management system server, and user devices, in accordance with various examples of the application.

FIG. 10 is a diagram illustrating an example of communications exchanged among an operator system client 1025, an interface management system server 1020, a first user device 1030*a*, and a second user device 1030*b*. The first user device 1030*a* is of a first type (e.g., a mobile phone) and the second user device 1030*b* is of a second type (e.g., a desktop computer or television). As shown in FIG. 10, the operator system client 1025 can send view parameter input 1010 to the interface management system server 1020. The view parameter input 1010 can be provided by an operator using an operator console interface as described above. As noted before, the operator console interface can include a user interface or a graphical user interface (GUI). The view parameter input 1010 defines parameters of a view (or page) of a user interface (e.g., a content guide or other user interface). The parameters can include content source, metadata, and/or other parameters of the different content items of the user interface. While not shown in FIG. 10, one or more content sources can be in communication with the interface management system server 1020, and can provide content to the interface management system for providing with a view modification (described in more detail below).

Figure 11:
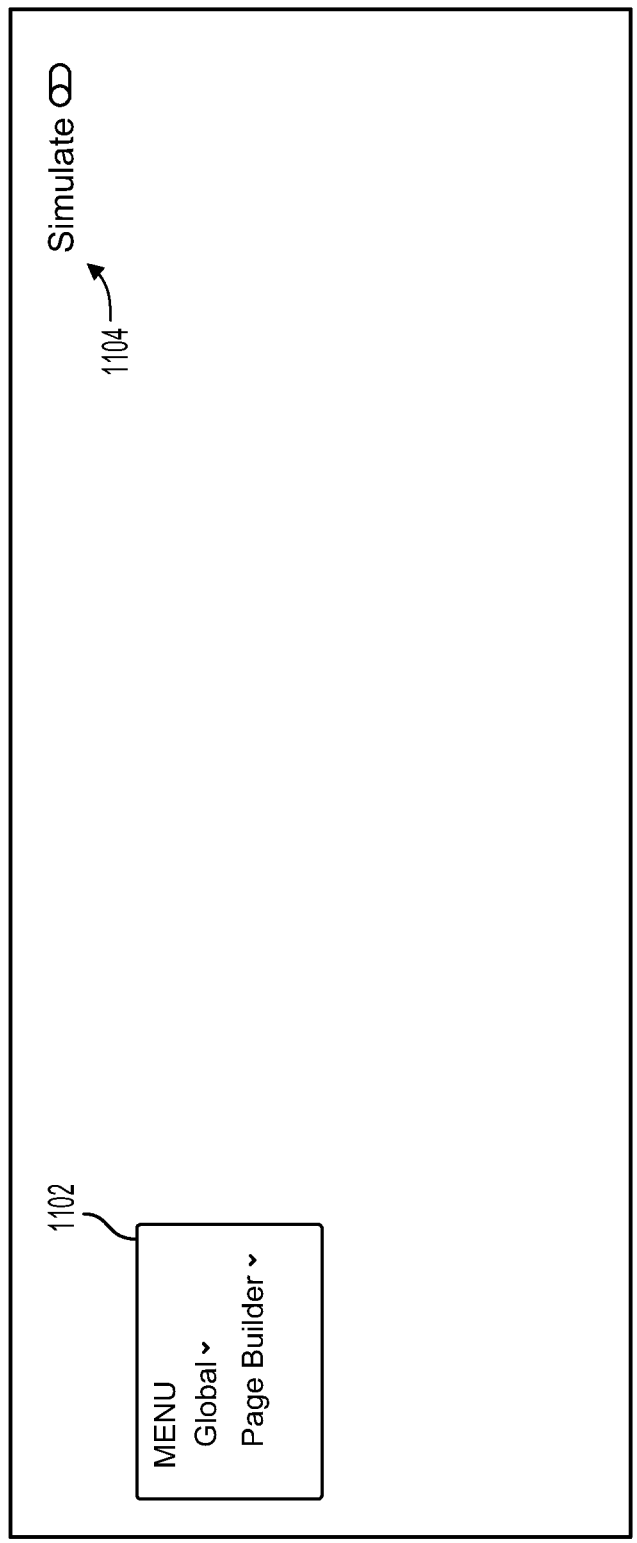
FIG. 11 illustrates an example of a home page of an operator console interface, in accordance with various examples of the application.
Figure 12:
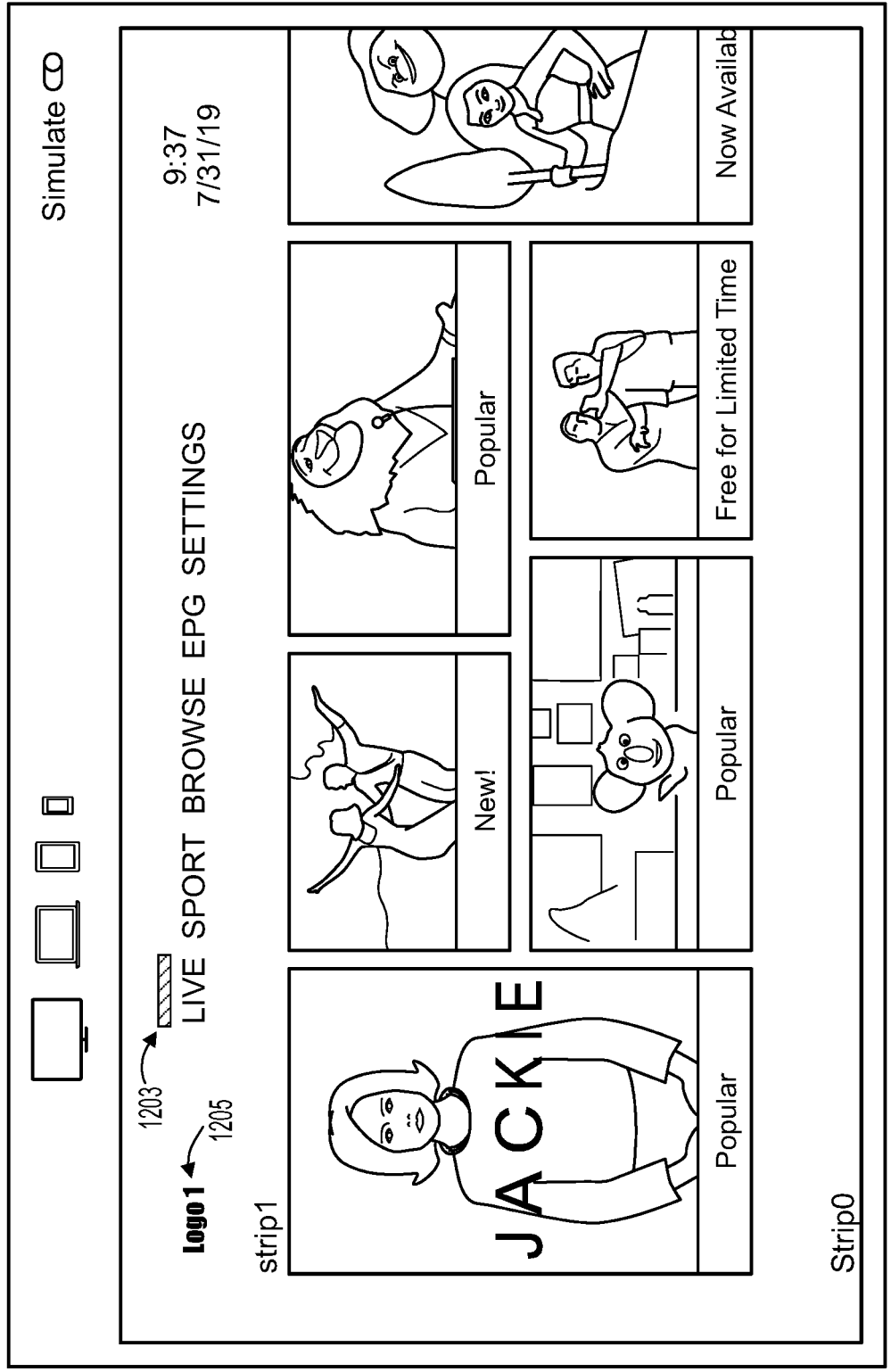
FIG. 12 illustrates an example of a preview of a user interface design, in accordance with various examples of the application.

Illustrative examples of an operator console interface in relation to FIG. 10 will be described with respect to FIG. 11-FIG. 35. As shown in FIG. 11-FIG. 35, the operator console interface can be implemented using a user interface or graphical user interface (GUI). For example, referring to FIG. 11, a home page (or home screen) of an operator console interface is shown. A menu 1102 is shown with a global option and a page builder option. The global option and the page builder option allow the operator to enter various input defining parameters of the user interface, which can be provided as view parameter input 1010 to the interface management system server 1020. As shown in FIG. 11, the operator console interface also includes a simulate interface element 1104. Upon selection of the simulate interface element 1104, a preview of a view of the user interface can be simulated. As shown in FIG. 10, a preview command 1011 can be sent to the operator system client 1025 in response to selection of a simulate interface element. For example, the view parameter input 1010 can include an indication that a simulate interface element has been selected, and the interface management system server 1020 can send the preview command 1011 causing a preview of the view to be displayed on the operator system client 1025. FIG. 12 shows an example of a simulated user interface (e.g., a GUI) based on selection of the simulate interface element 1104. The preview of the view shows the view of the user interface that would be implemented on a user device based on the view parameters input to the operator console interface up until the point at which the simulate interface element 1104 is selected. When a simulate interface element is selected by an operator, a preview of a view having a particular layout is displayed at the operator system client 1025, and a layout of the view is not yet sent to a user device (e.g., user device 1030*a* or user device 1030*b* of FIG. 10).

Figure 13:
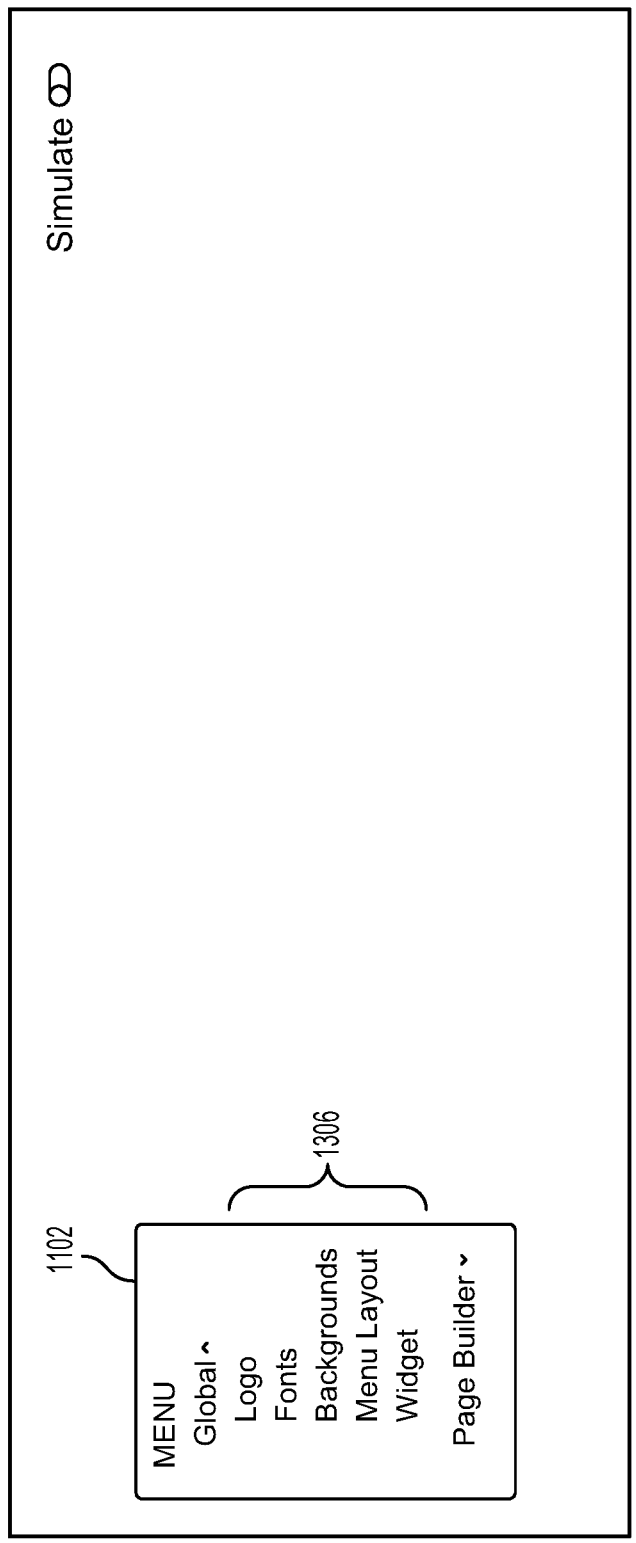
FIG. 13 illustrates another example of an operator console interface, in accordance with various examples of the application.

Upon selection of the global option from the menu 1102, additional options are presented on the operator console interface, which allow an operator to add or change various metadata that will be displayed in a view of the user interface. In some cases, any metadata entered view an option under the Global tab will be displayed across all views (or pages) of the user interface. FIG. 13 illustrates an example of the operator console interface with additional options 1306 that appear in response to selection of the global option from the menu 1102. The additional options 1306 include metadata editing options such as a Logo option, a Fonts option, a Backgrounds option, a Menu Layout option, and a Widget option. The Backgrounds option allows the operator to change the background (the content shown behind content items) of the user interface. The Menu Layout option allows the operator to change the global layout of the user interface. An illustrative example of the Menu Layout option is shown in FIG. 3.

Figure 14A:
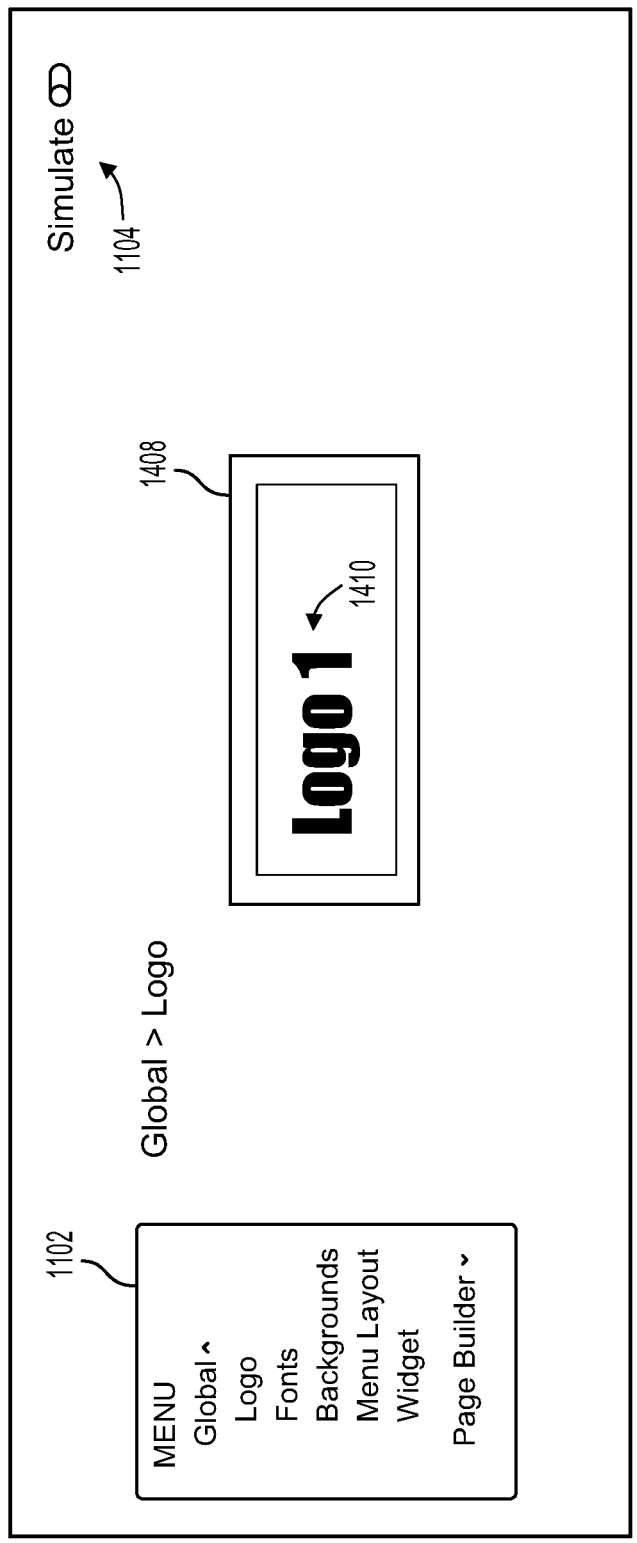
FIG. 14A and FIG. 14B illustrate examples of an operator console interface for creating and/or editing a logo of a user interface, in accordance with various examples of the application.
Figure 14B:
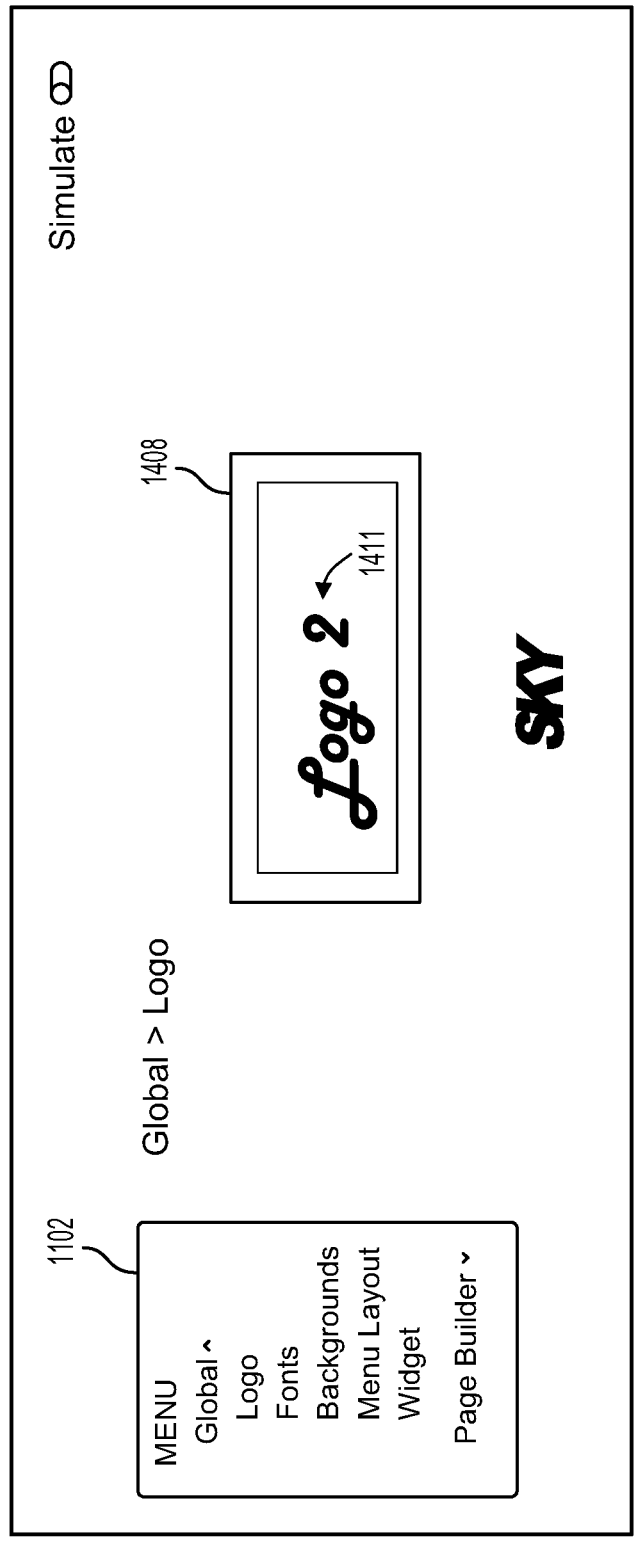

FIG. 14A illustrates an example of the operator console interface when the Logo option is selected. The logo editing box 1408 allows the operator to design and edit a logo for the interface. In some cases, because the Logo option is under the Global tab, the logo entered into the logo editing box 1408 will be displayed across all views (pages) of the user interface. For example, the example shown in FIG. 14A includes an "Logo 1" logo 1410 entered in the logo editing box 1408. The "Logo 1" logo 1205 is shown in the simulation preview of FIG. 12 based upon selection of the simulate interface element 1104. As shown in FIG. 14B, the logo has been changed from the "Logo 1" logo 1410 to a "Logo 2" logo 1411.

Figure 15A:
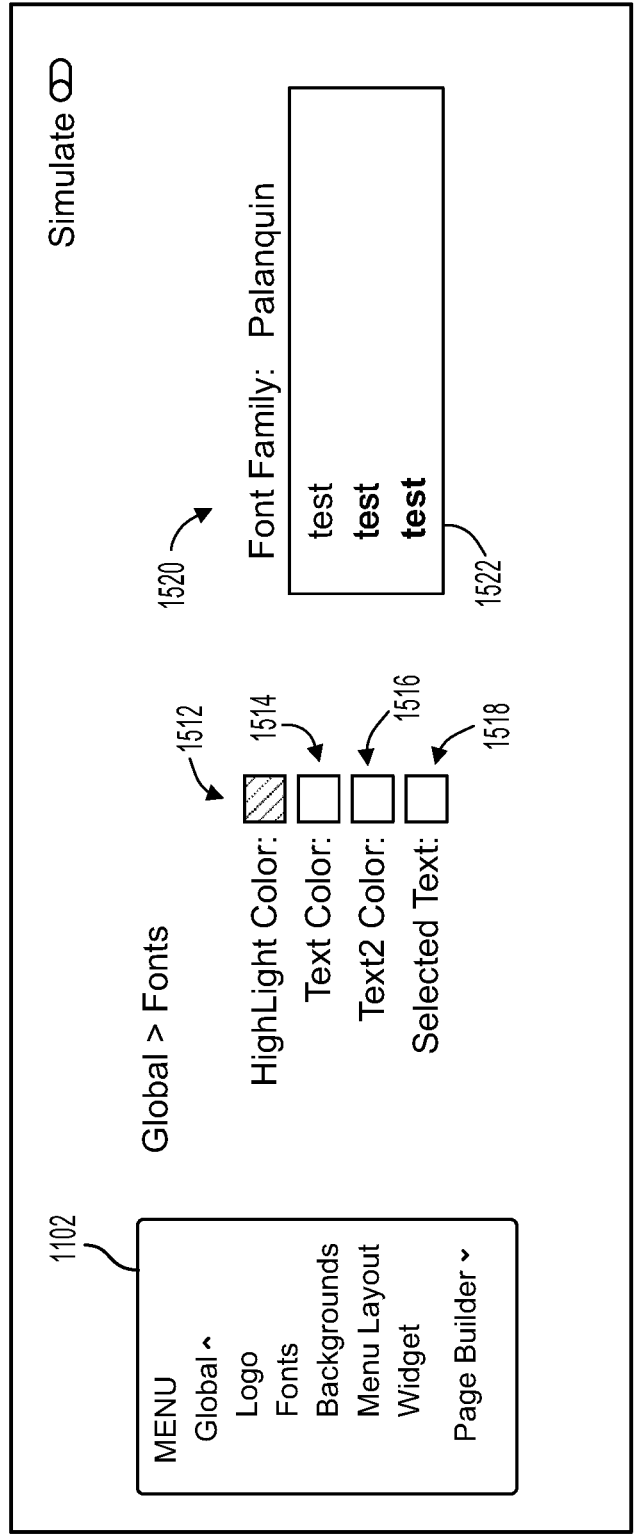
FIG. 15A, FIG. 15B, FIG. 16, and FIG. 17 illustrate examples of an operator console interface for editing fonts of a user interface, in accordance with various examples of the application.
Figure 15B:
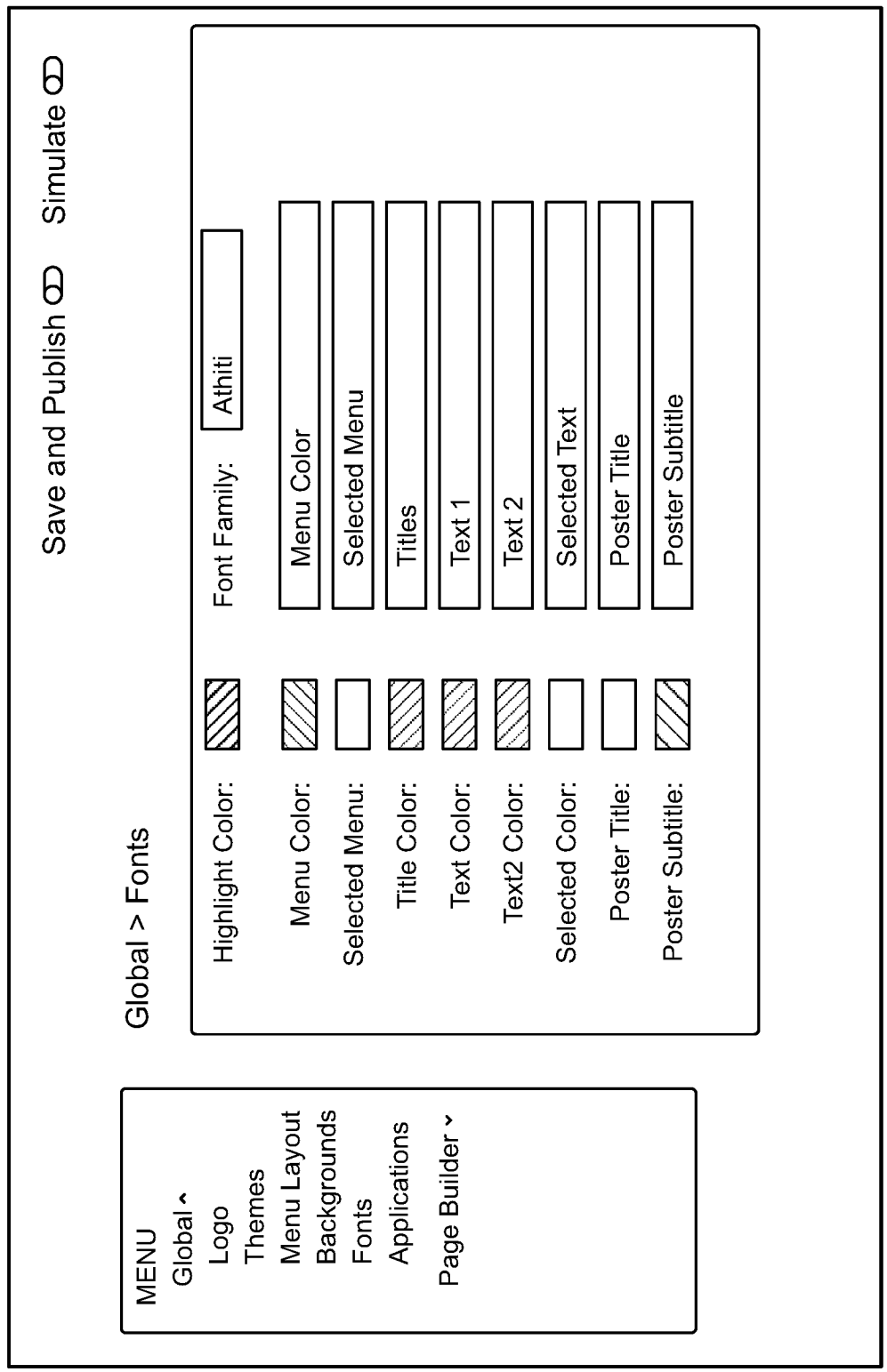

The Fonts option in the menu 1102 allows an operator to edit the fonts associated with the logo and other text and graphical elements of the user interface. FIG. 15A, FIG. 15B, FIG. 16, and FIG. 17 illustrate examples of different pages of the operator console interface that are presented when the Fonts option is selected. For example, as shown in FIG. 15A, an option 1512 is provided for selecting a HighLight color, an option 1514 is provided for selecting a color of a first set of text (denoted as Text), an option 1516 is provided for selecting a color of a second set of text (denoted as Text2), and an option 1518 is provided for selecting a color of selected text (when a user of a user device selects text displayed on the user interface). FIG. 15B is another example of a page of the operator console interface providing font options in response to selection of the Font option. The HighLight color indicates the color of a highlight interface element (e.g., highlight interface element 1203 shown in FIG. 12) that highlights a current selection of content by a user via the user interface. A font selection option 1520 of different font options and a preview box 1522 showing examples of a selected font are also shown in the operator console interface of FIG. 15A. As shown, the currently selected font for text of the user interface is "Palanquin." For example, as shown in FIG. 12, the text "LIVE," "SPORT," "BROWSE," "EPG," and "SETTINGS" (corresponding to different views or pages of the user interface) are shown with Palanquin font based on the selected font from the font selection option 1520.

Figure 16:
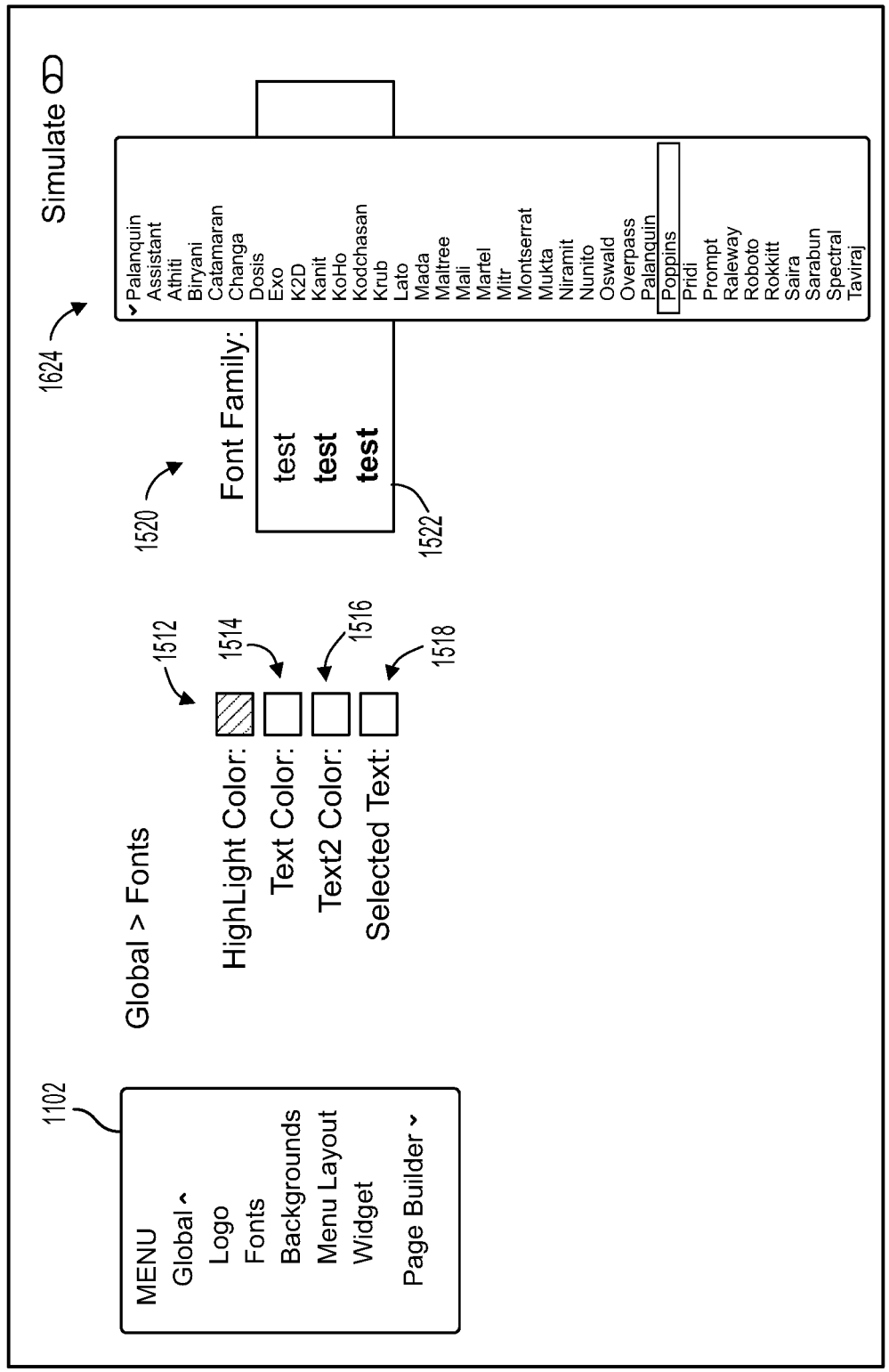
Figure 17:
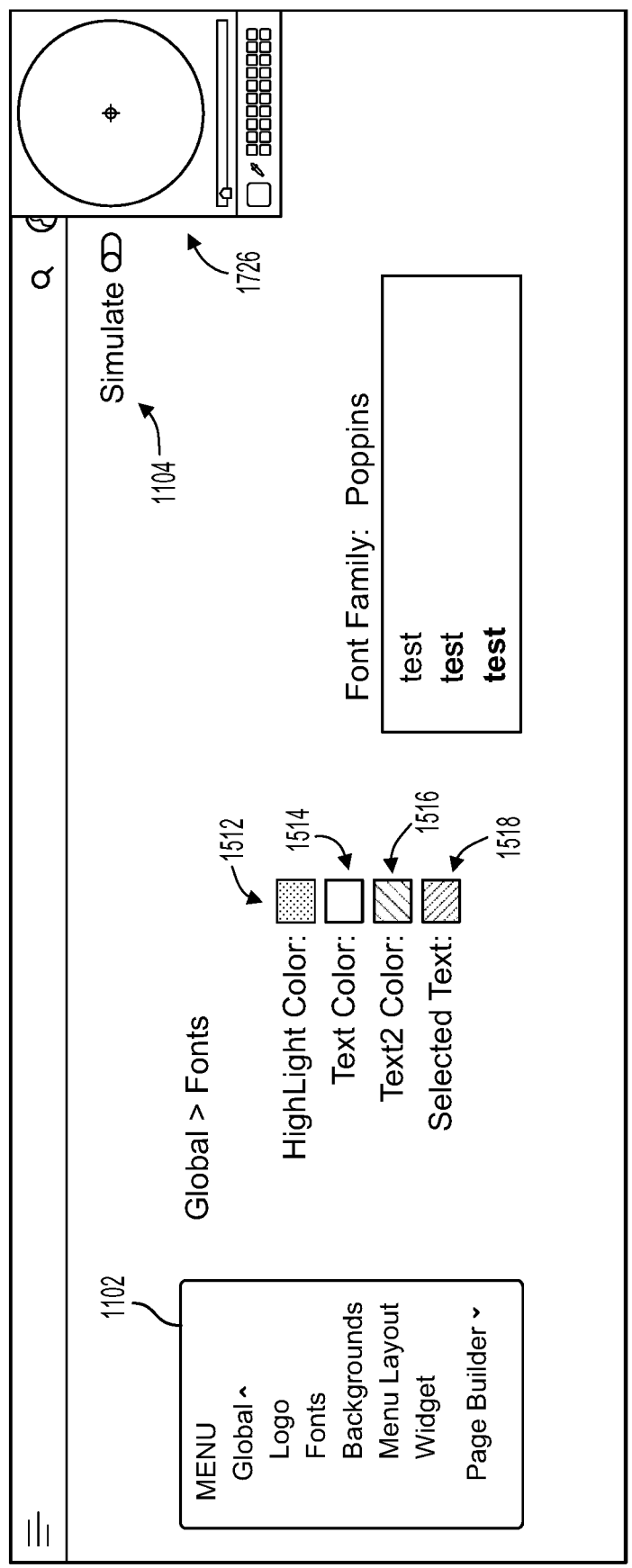
Figure 18:
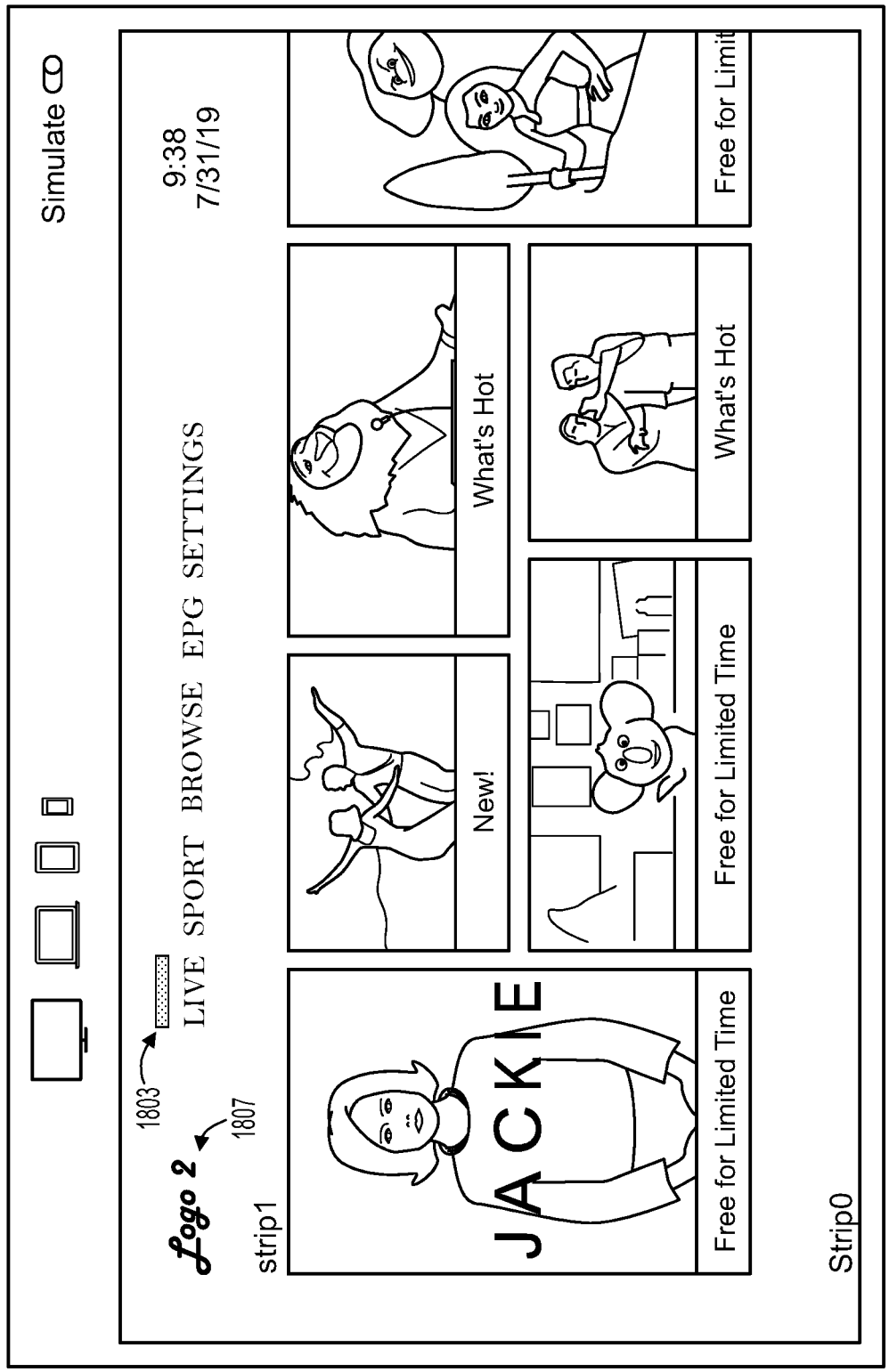
FIG. 18 illustrates an example of a preview of a user interface design, in accordance with various examples of the application.

FIG. 16 illustrates a drop down menu 1624 including the different available font options from the font selection option 1520. The operator can change the font of the text (e.g., "LIVE," "SPORT," "BROWSE," etc.), and in some cases for the "Logo 2" logo 1411, from Palanquin to a new font. In some cases, the font for the text and the font for the logo can be selected as different fonts. As shown in FIG. 16, the operator can select the "Poppins" font. Upon selection of any of the color options 1512, 1514, 1516, and/or 1518, a color editing panel 1726 is presented on the operator console interface, as illustrated in FIG. 17. The operator can select a color from the color editing panel 1726 for the HighLight color, the Text color, the Text2 color, and/or the selected text color. As shown in FIG. 17, the HighLight color, the Text2 color, and the selected text color have been changed as compared to the colors selected using the operator console interface shown in FIG. 15A. The operator can then select the simulate interface element 1104 to simulate a view of the user interface having the updated logo and color options. A simulated view of the user interface having the "Logo 2" logo 1807, the selected Poppins font, and the new color options for the HighLight color (as indicated by the highlight interface element 1803), the Text2 color, and the selected text color is shown in FIG. 18.

Figure 19:
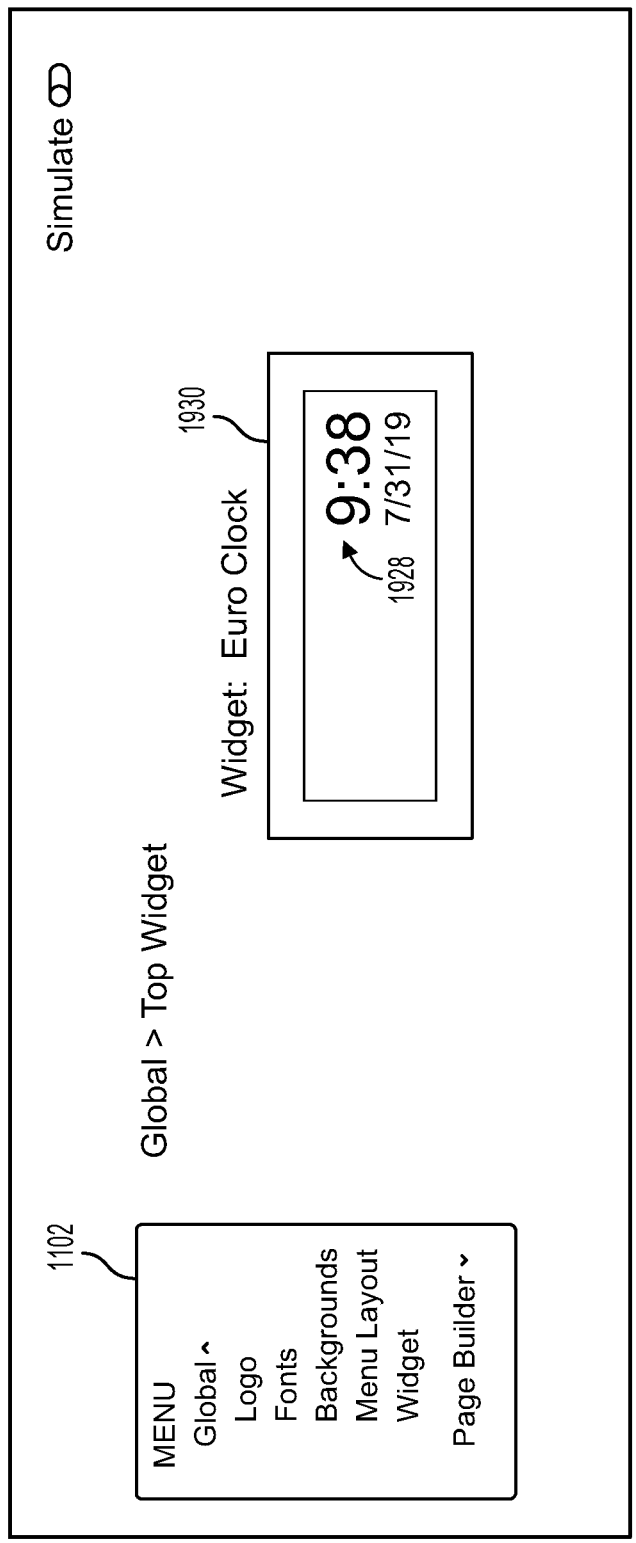
FIG. 19 and FIG. 20 illustrate examples of an operator console interface for editing a widget of a user interface, in accordance with various examples of the application.
Figure 20:
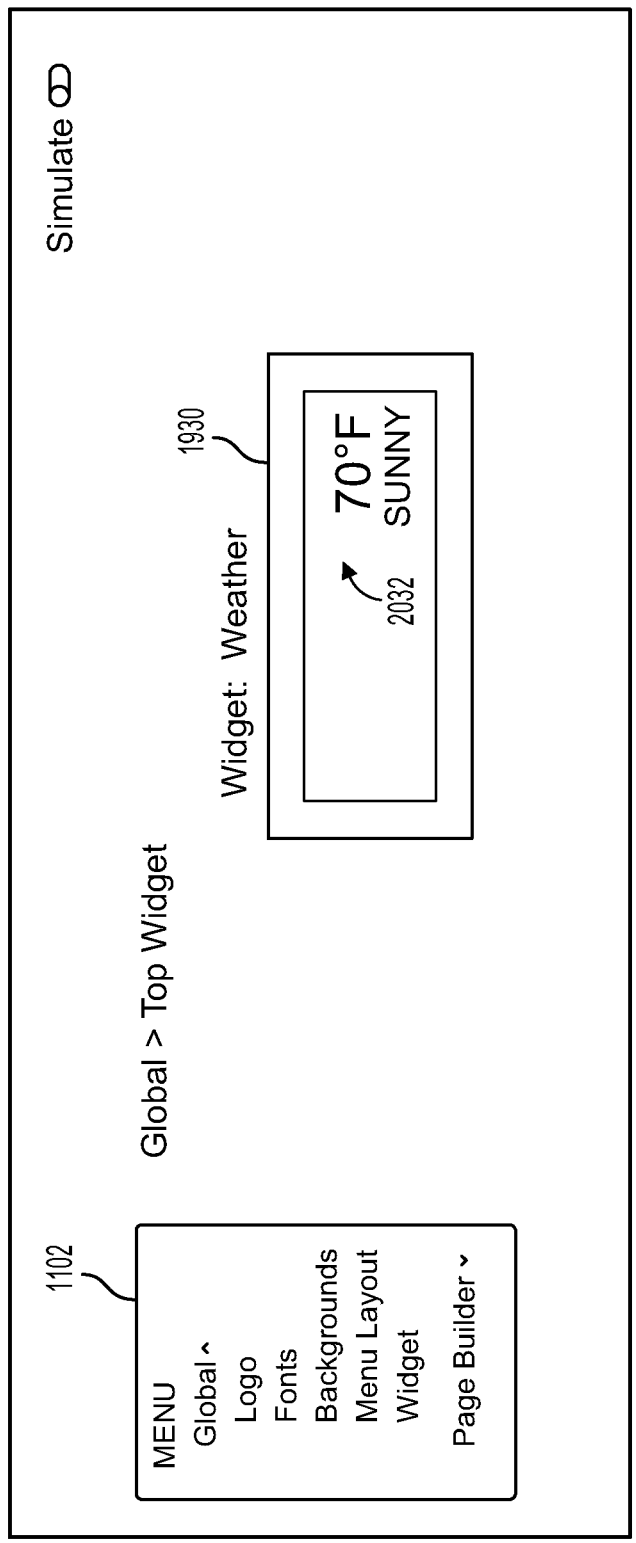
Figure 21:
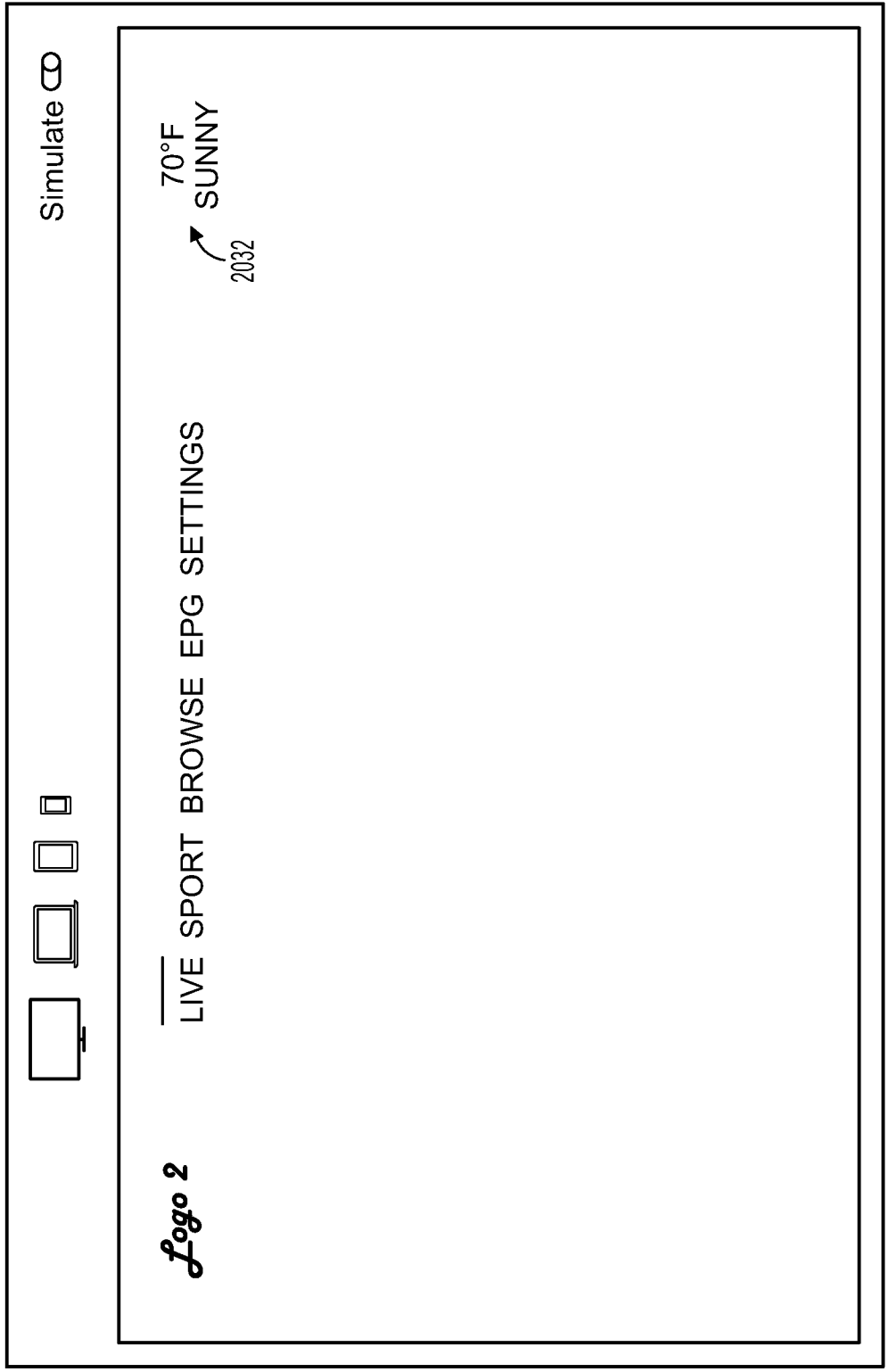
FIG. 21 illustrates an example of a preview of a user interface design, in accordance with various examples of the application.

FIG. 19 illustrates an example of the operator console interface when the Widget option is selected. For example, a clock widget 1928 is shown in a widget editing box 1930 that allows an operator to edit the clock widget 1928. The clock widget 1928 is the widget selected to be displayed at the top of the user interface. While a clock widget 1928 is shown in FIG. 19, various other widgets (or metadata content items) can be generated for display on the user interface and edited using the Widget option of the menu 1102 of the operator console interface. As shown in FIG. 20, the widget displayed at the top of the user interface is changed from the clock widget 1928 to a weather widget 2032. FIG. 21 illustrates a simulated view (based on selection of the simulate interface element 1104) of the user interface with the weather widget 2032 displayed at the top right of the user interface.

Figure 22:
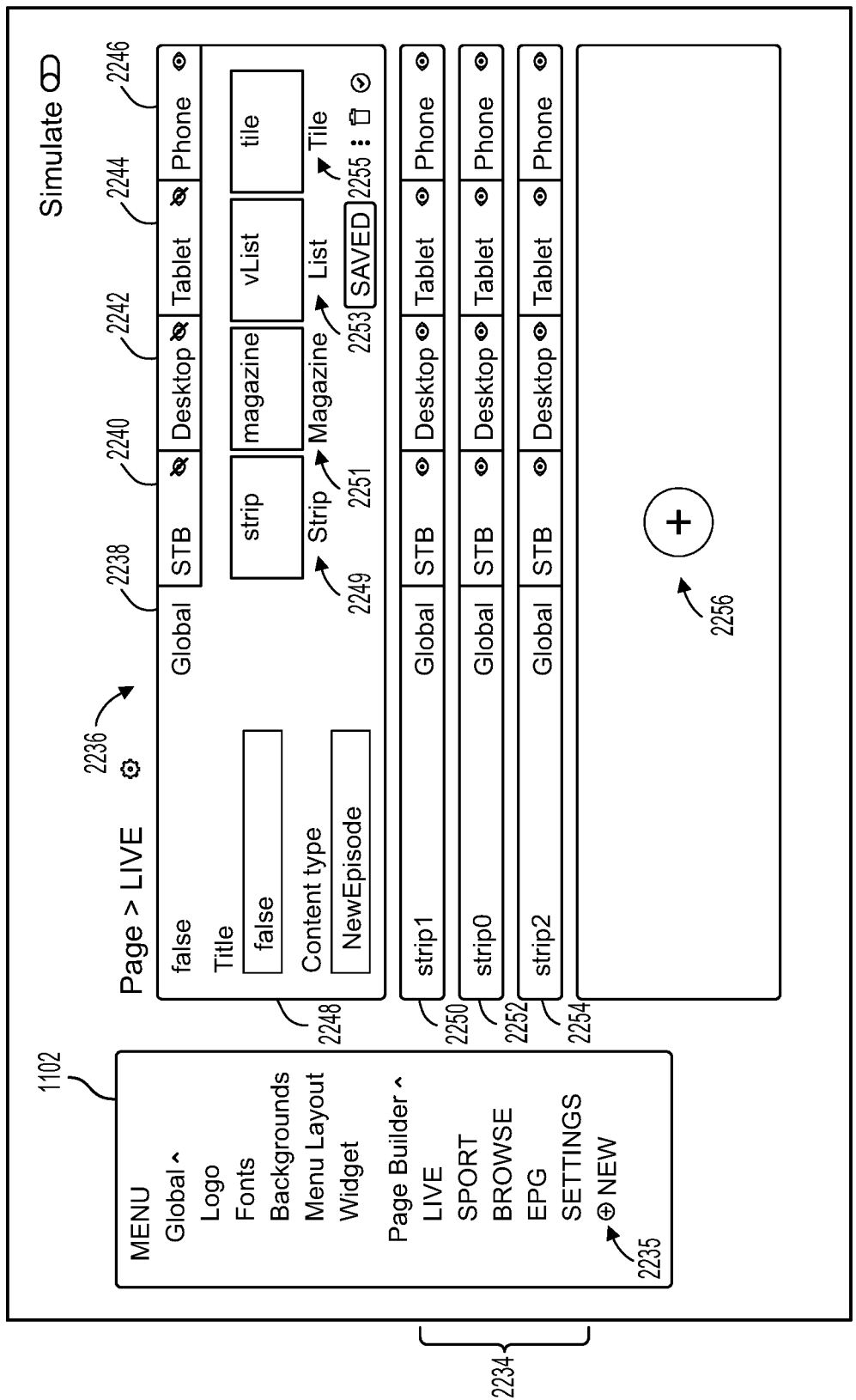
FIG. 22 illustrates an example of an operator console interface for editing a view (or page) of a user interface, in accordance with various examples of the application.
Figure 58:
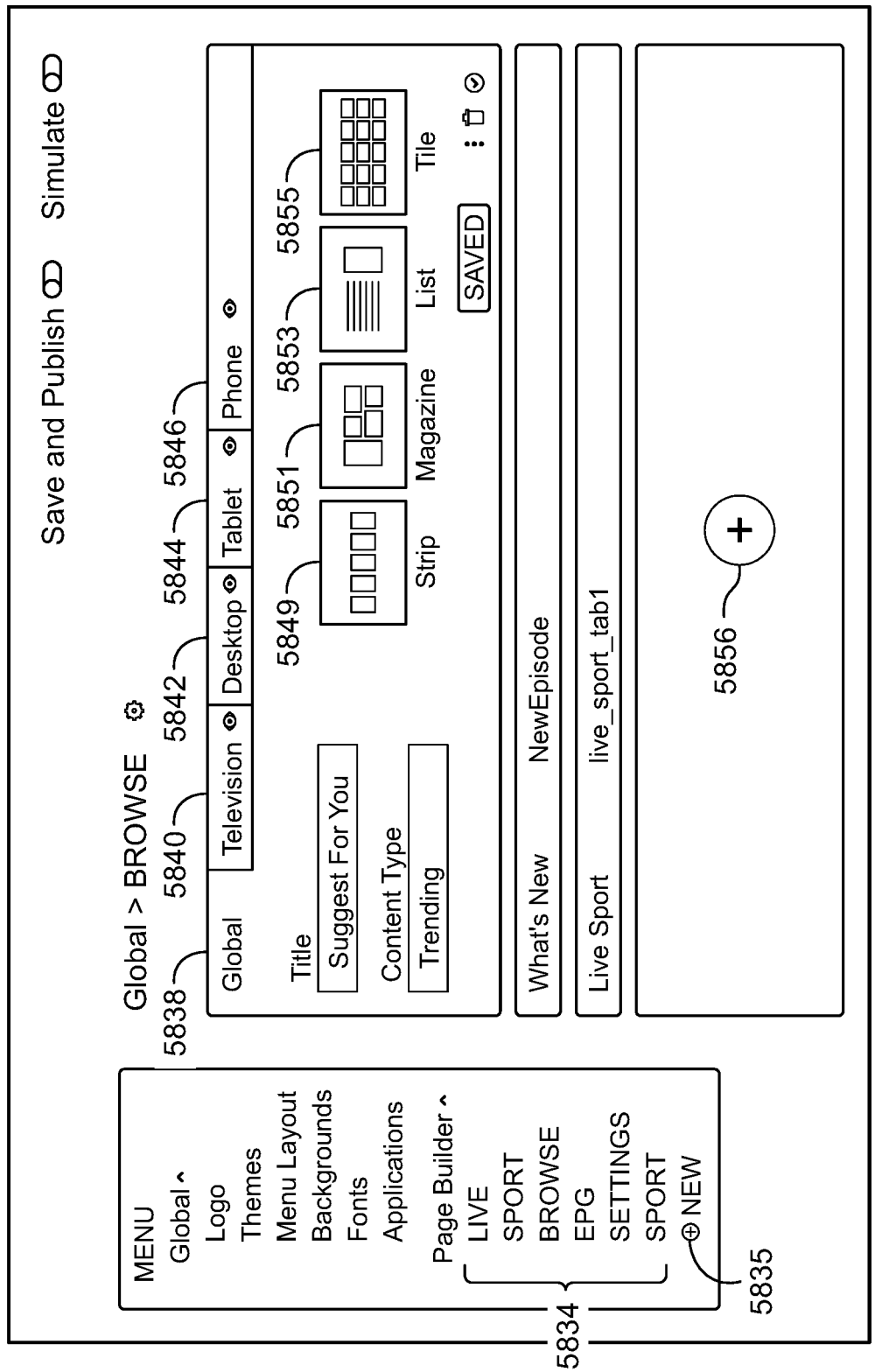
FIG. 58, FIG. 59, FIG. 60, and FIG. 61 illustrate other examples of an operator console interface for editing views (or pages) of a user interface, in accordance with various examples of the application.

In response to selection of the page builder option of the menu 1102, various views (also referred to as a page) 2234 are shown. Under the page builder option, an operator can create new views (by selecting the NEW page option 2235) and can change parameters of the existing views 2234 of the user interface. The views 2234 that have been built using the page builder include a LIVE view, a SPORT view, a BROWSE view, an EPG view, and a SETTINGS view. FIG. 22 shows a parameter editing section 2236 for the LIVE view. As shown, the operator can edit the title, the content type (corresponding to a content source), among other parameters of the LIVE view. The LIVE view is designed to have various sections of content within the view, including a section 2248 (titled as "false" in the interface of FIG. 22), a section 2250 (titled "strip1" in the interface of FIG. 22), a section 2252 (titled "strip0" in the interface of FIG. 22), and a section 2254 (titled "strip2" in the interface of FIG. 22). In some cases, the layout of the content tiles for a section can be arranged in different arrangements, such as a magazine arrangement, a list arrangement, or a tile arrangement. For example, content tiles for the section 2248 in FIG. 22 can be arranged in a strip arrangement by selecting strip option 2249. In another example, content tiles for the section 2248 can be arranged in a magazine arrangement by selecting magazine option 2251. In another example, content tiles for the section 2248 can be arranged in a list arrangement by selecting list option 2253. In another example, content tiles for the section 2248 can be arranged in a tile arrangement by selecting tile option 2255. Example illustrations of a strip arrangement 5849, a magazine arrangement 5851, a list arrangement 5853, and a tile arrangement 5855 are shown in FIG. 58.

Figure 23:
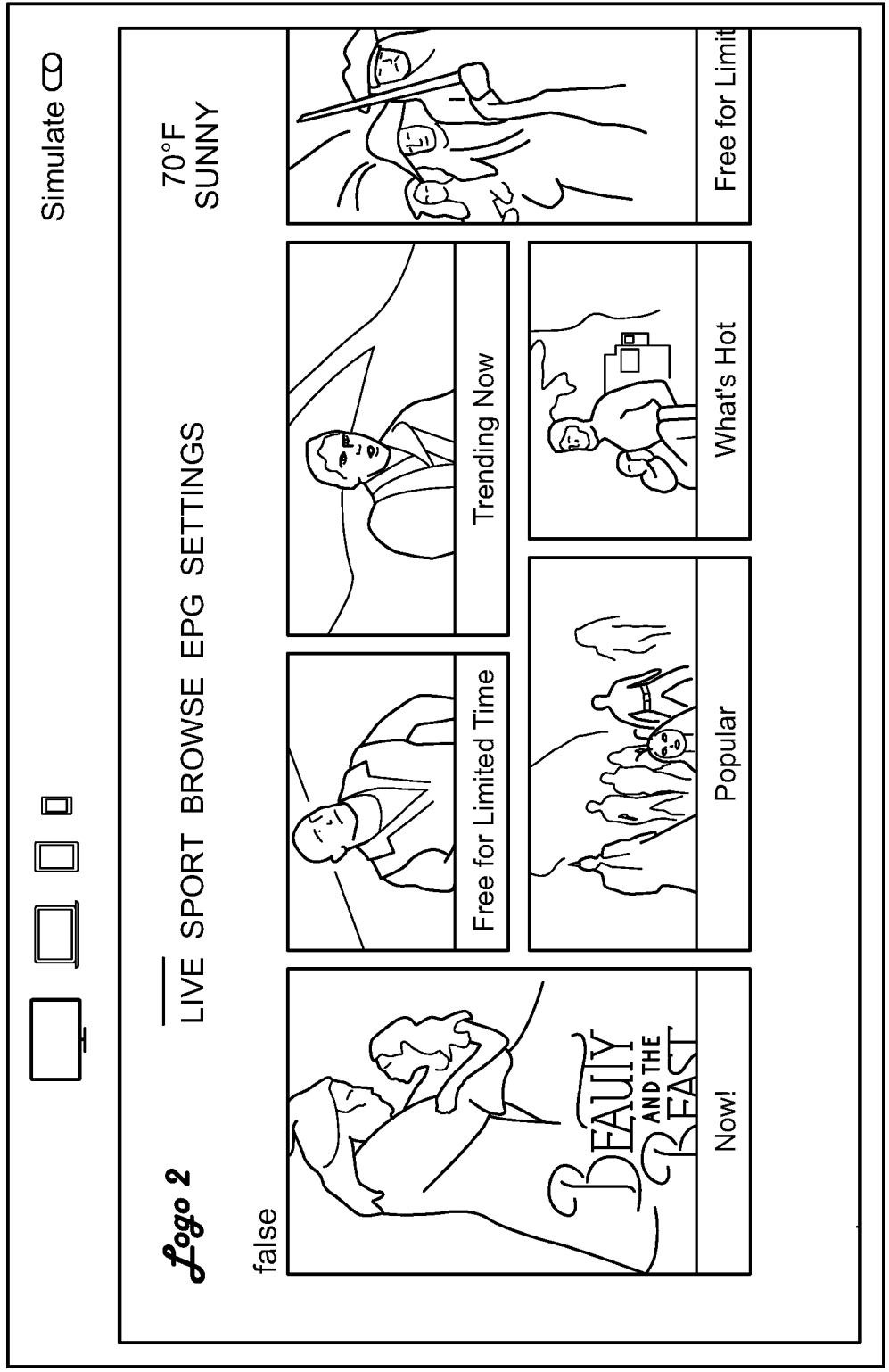
FIG. 23 illustrates an example of a preview of a user interface design, in accordance with various examples of the application.

As shown in FIG. 22, the content type for the "false" section 2248 is selected to be from a NewEpisode content source, which can include a content provider that provides new episodes (e.g., a most recently-released episode or release) of movies, television shows, and/or other media content. FIG. 23 illustrates a simulated view (based on selection of the simulate interface element 1104) of the LIVE view of the user interface with the "false" section of content. A new section option 2256 is also included in the operator console interface of FIG. 22 that allows an operator to add a new section to the LIVE page.

Figure 24:
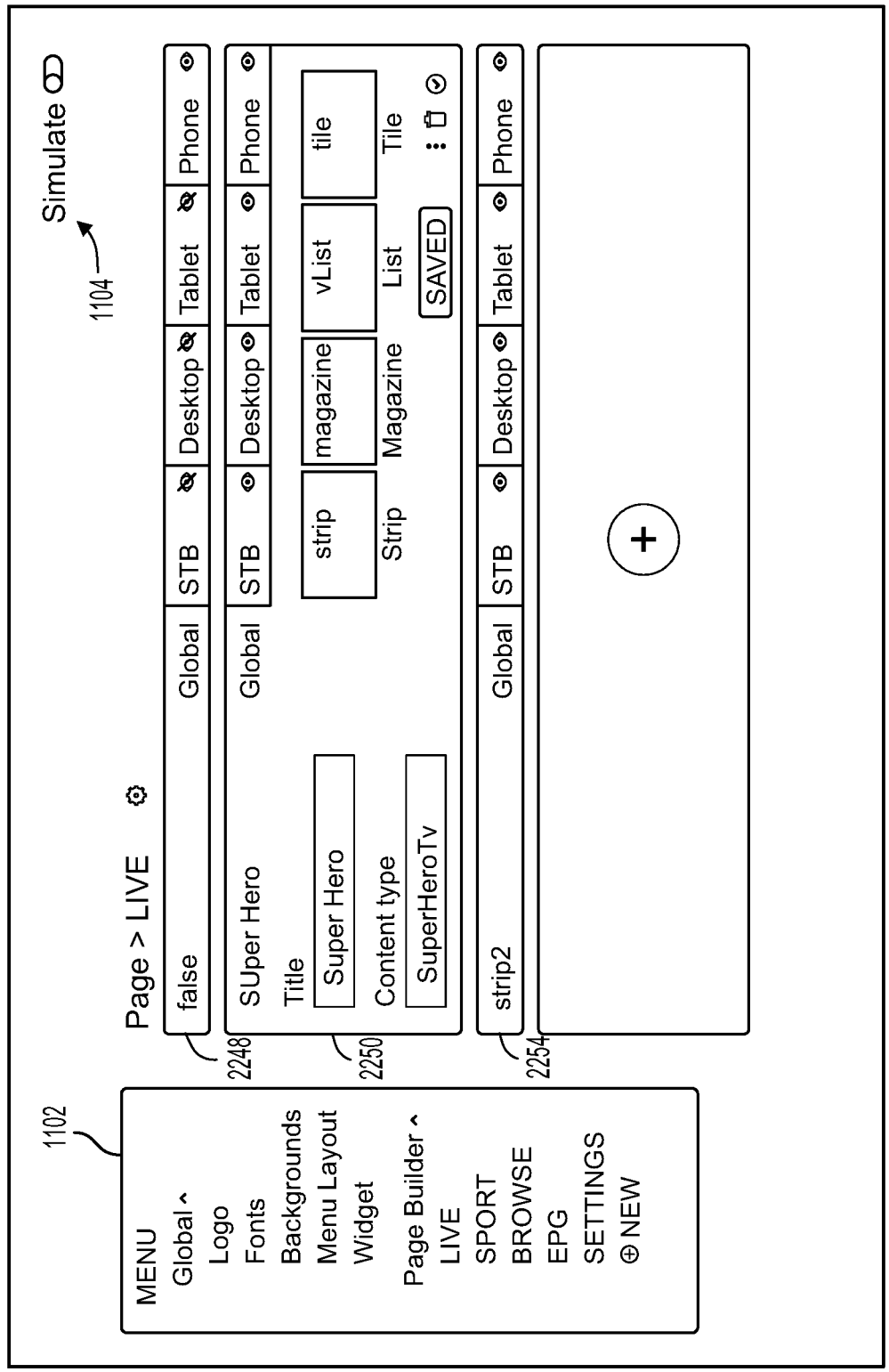
FIG. 24, FIG. 25, FIG. 26, FIG. 27, FIG. 28, FIG. 29, FIG. 30, and FIG. 31 illustrate examples of an operator console interface for editing views (or pages) of a user interface, in accordance with various examples of the application.

FIG. 24 shows the operator console interface with the section 2252 deleted from the LIVE view and the section 2250 selected. As shown, the title of the section 2250 has been edited to "Super Hero" from "Strip1." Further, the content type for the "Super Hero" section 2250 is selected to be from a content source denoted SuperHeroTv, which can include a content provider that provides movies, television shows, and/or other media content related to super heroes.

Figure 25:
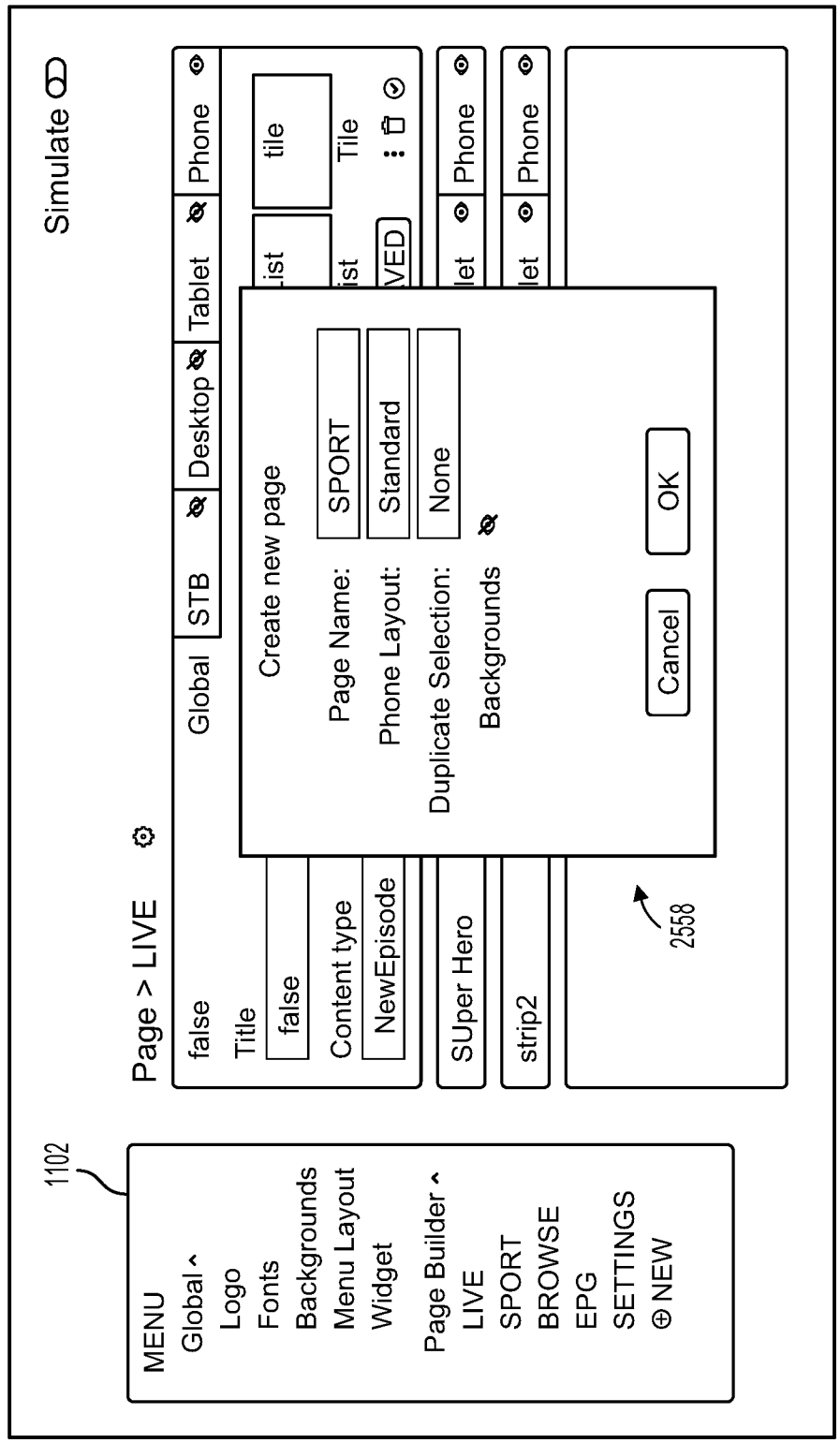

Returning to FIG. 22, an operator can select the NEW page option 2235 under the page builder option, which allows an operator to create a new view (page) for the user interface. FIG. 25 shows an example of a dialog box 2558 that is displayed in response to selection of the NEW page option 2235. As shown, the dialogue box 2558 includes fields that allow the operator to enter parameters for the view being created, including the view title, the phone layout, duplicate selection, and backgrounds. With respect to the phone layout field, when a new view is created, the content for the view can be displayed in various ways on the phone device. For example, a view can be created where the images will be shown on a top portion of the view and other content will be displayed in the bottom section of the view. In another example, a view can be created that will include multiple vertical lists that can be accessed by clicking a corresponding tab. The duplicate selection field allows a previously generated view to be duplicated. Once a view is duplicated, various changes (e.g., change to the content feeds, add or delete other content, or other changes) can be made to the new view, which will not affect the view that was duplicated.

Figure 26:
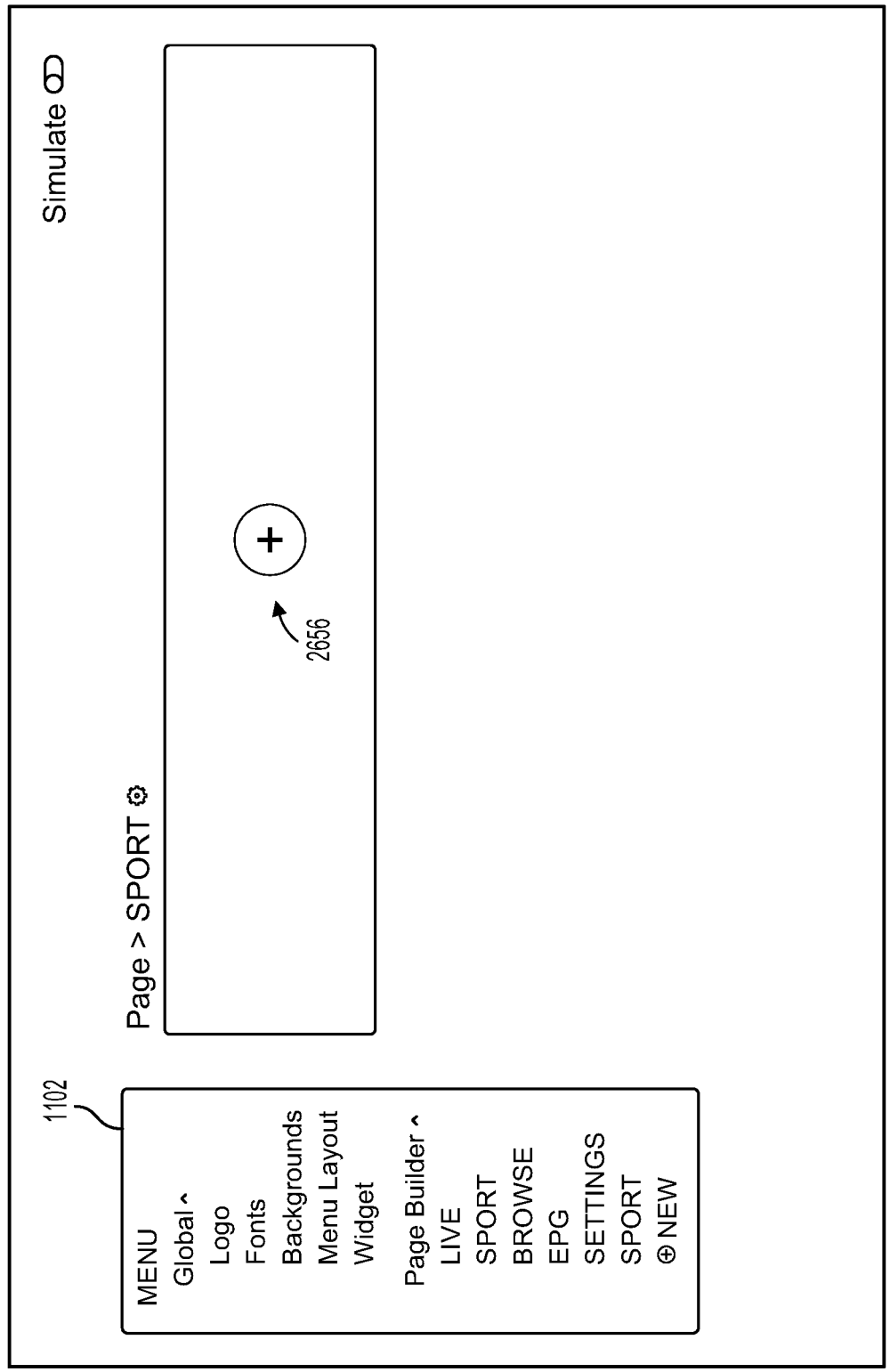
Figure 27:
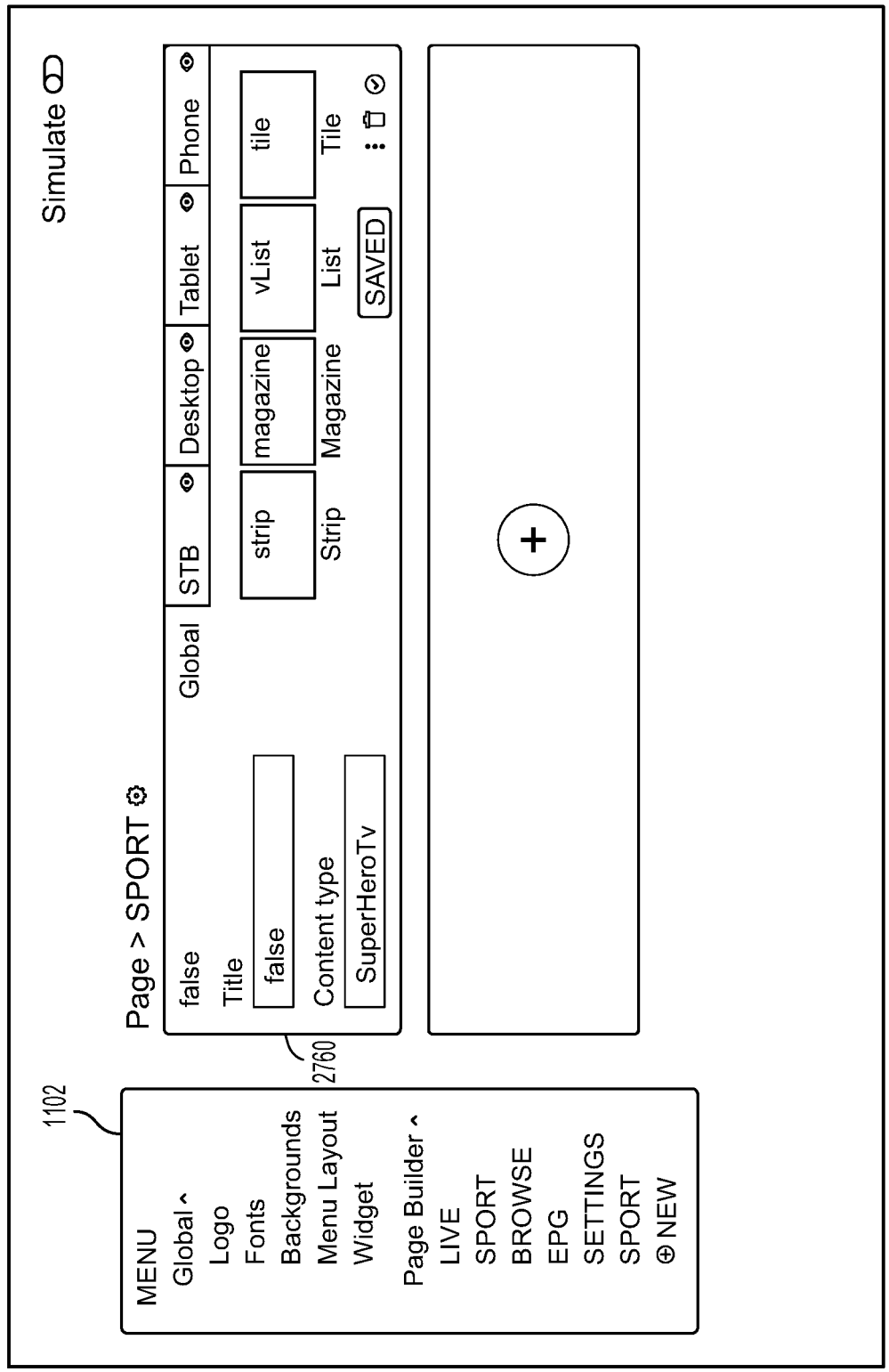
Figure 28:
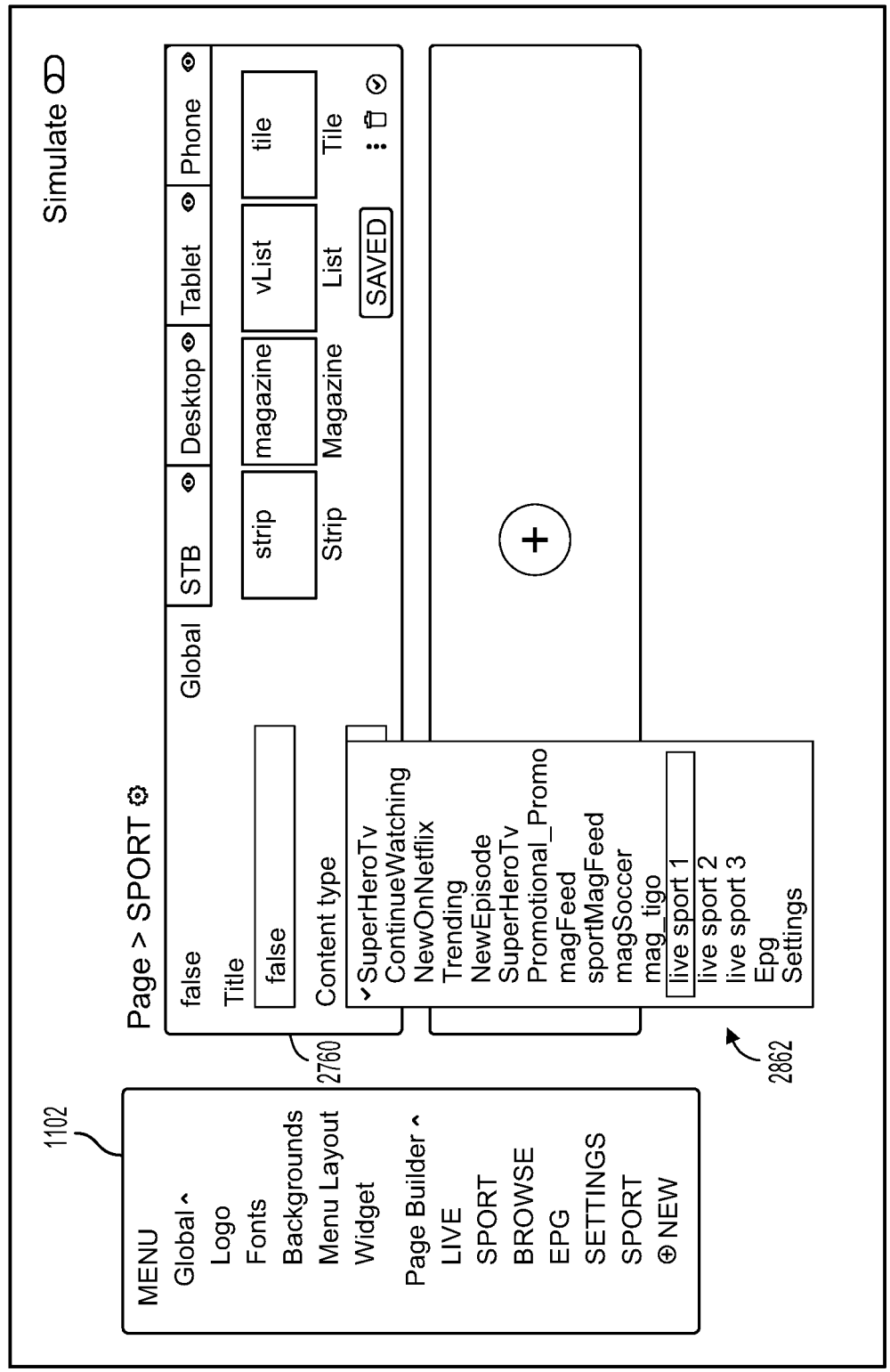

In the example of FIG. 25, the operator entered a view title of "SPORT", a phone layout of "Standard", and selected "None" for the duplicate section, and selected no backgrounds. FIG. 26 shows an example of the operator console interface in response to selection of the "OK" option shown in the dialogue box 2558 of FIG. 25. A new section option 2656 is shown that allows an operator to add a new section to the newly created SPORT view. FIG. 27 shows an example of the operator console interface in response to selection of the new section option 2656. As shown, a new section 2760 is generated that includes a title "false" and a content type of SuperHeroTv. As shown in FIG. 28, the operator can change the content type of the section 2760 by selecting a "live sport 1" content source from a drop down menu 2862. The "live sport 1" content source can be provided by content provider that provides live sports television or other live sports content.

Returning to FIG. 10, the interface management server 1020 can also receive information defining attributes of different types of devices that can implement the user interface, including the first type (e.g., a mobile phone) associated with the first user device 1030a and the second type (e.g., a desktop computer) associated with the second user device 1030b. For example, as shown in FIG. 22, the operator console interface includes various tabs, including a global tab 2238 and tabs corresponding to different types of devices, including a set-top box (STB) (e.g., corresponding to a layout that will be displayed on a television connected to the STB), a Desktop computer, a tablet computer, and a mobile phone. In some cases, the first type of device and the second type of device (and in some cases other types of devices) can be registered with the interface management system 1020. During registration of the different types of devices, information defining the attributes or characteristics of the types of devices can be provided to the interface management system 120. For example, resolutions (or screen size), screen types, aspect ratios, memory capabilities (e.g., amount of storage, random access memory (RAM), etc.), bandwidth capabilities, compute power, portrait and/or landscape screen orientation, and/or other attributes of the first and second types of devices can be provided to the interface management system 1020 during registration of the first and second types of devices.

Using the view parameter input 1010 received (e.g., including some or all of the input discussed herein with respect to FIG. 3-FIG. 35) from the operator system client 1025 and the information defining the attributes of the first user device 1030a and the attributes of the second user device 1030b, the interface management server 1020 generates a view modification 1012. The view modification 1012 can include modifications to any views (pages) of the user interface that have changed based on view parameter input 1010. In some cases, the view modification 1012 can include the entire user interface, even portions that have not changed since a last modification of the user interface. As shown in FIG. 10, the view modification 1012 is provided (e.g., sent, transmitted, or otherwise provided) to the first user device 1030a and to the second user device 1030b.

The interface management server 1020 operator console can automatically generate different layout designs for a view of the user interface for different types of devices using the common set of view parameter input 1010 information and using the different device attributes provided to the interface management server 1020. For example, user interfaces with different layouts, content, and/or other features can be built for multiple types of devices in an efficient manner using a common set of user interface parameter information input through the operator console interface, preventing an operator from manually defining user interfaces separately for each different type of devices. For example, while being based on the same common input information provided in the operator console interface, the layout of the SPORT view shown in FIG. 35 generated by the operator console for a mobile device is completely different than the layouts shown in FIG. 32 and FIG. 33 generated for a desktop computer and a tablet, respectively, as described in more detail below.

As noted above, the operator console interface illustrated in FIG. 22 includes a global tab 2238 and tabs corresponding to different types of devices. The tabs for the different device types include a tab 2240 for a STB, a tab 2242 for a Desktop computer, a tab 2244 for a tablet computer, and a tab 2246 for a mobile phone. The global tab 2238 is shown as being currently selected. The global tab 2238 allows the operator to make changes globally across all views (pages) for all types of devices. Each of the device type specific tabs 2240, 2242, 2244, and 2246 allow changes to be made only to a specific device type's user interface.

Figure 29:
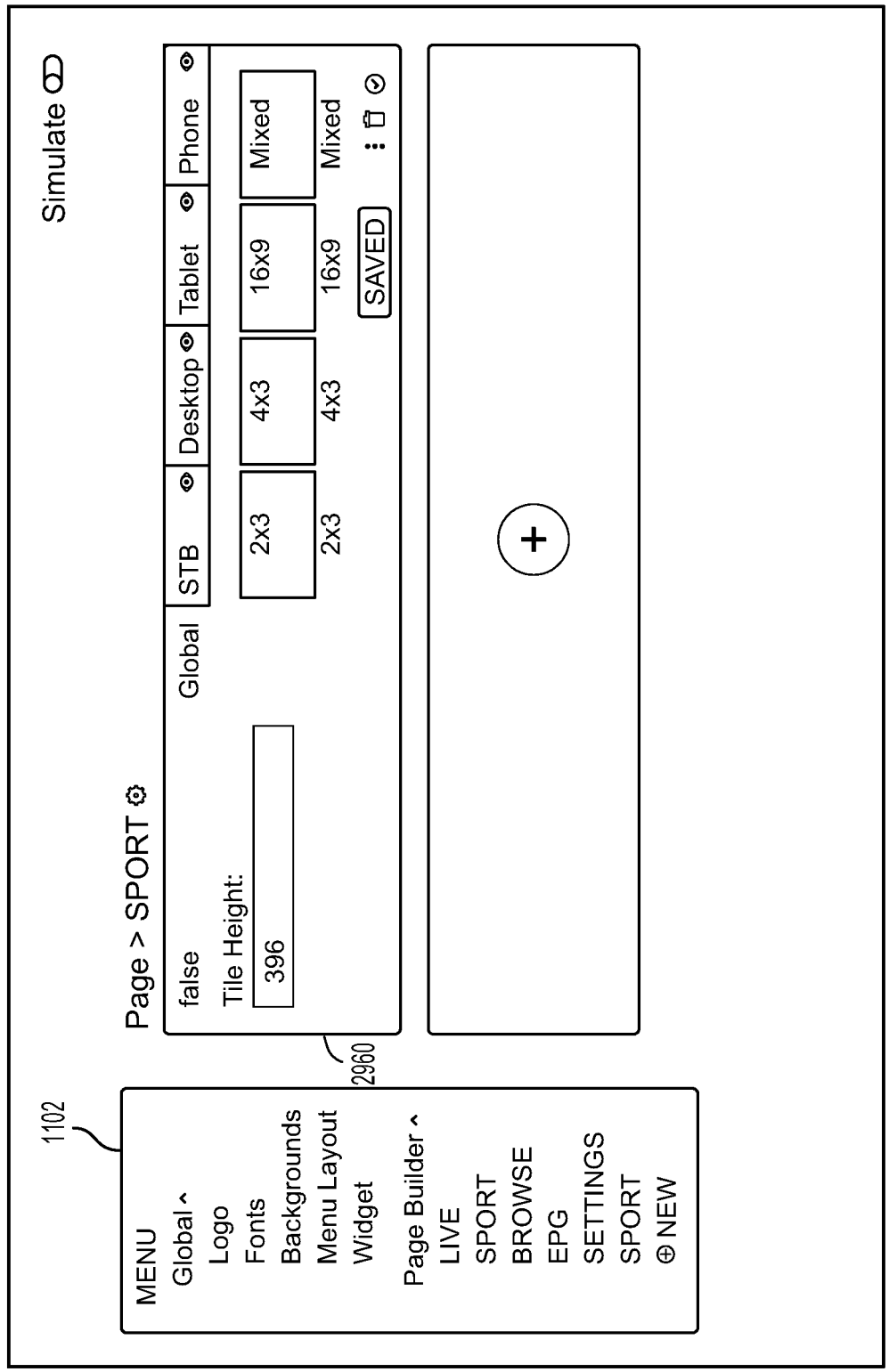

FIG. 29 shows an example of the operator console interface in response to selection of the STB tab 2240. The interface shown in FIG. 29 allows an operator to change the parameters of a STB-specific section 2960, including the aspect ratio and the height (denoted as "Tile Height") of each content tile within the STB-specific section 2960. For example, the operator can select from among different aspect ratios for a strip or tile arrangement, including 2×3, 4×3, 16×9, or mixed. Further, as shown, the operator has entered a tile height of 396. The aspect ratios 2×3, 3×4, and 16×9 represent the ratio of images in a "strip" or "tile" arrangement. If a "magazine" arrangement is selected, aspect ratios available for a magazine layout will be presented. Examples of a strip arrangement 5849, a magazine arrangement 5851, a list arrangement 5853, and a tile arrangement 5855 are shown in FIG. 58. The tile height of 396 indicates the height of the tiles in the sections.

Figure 30:
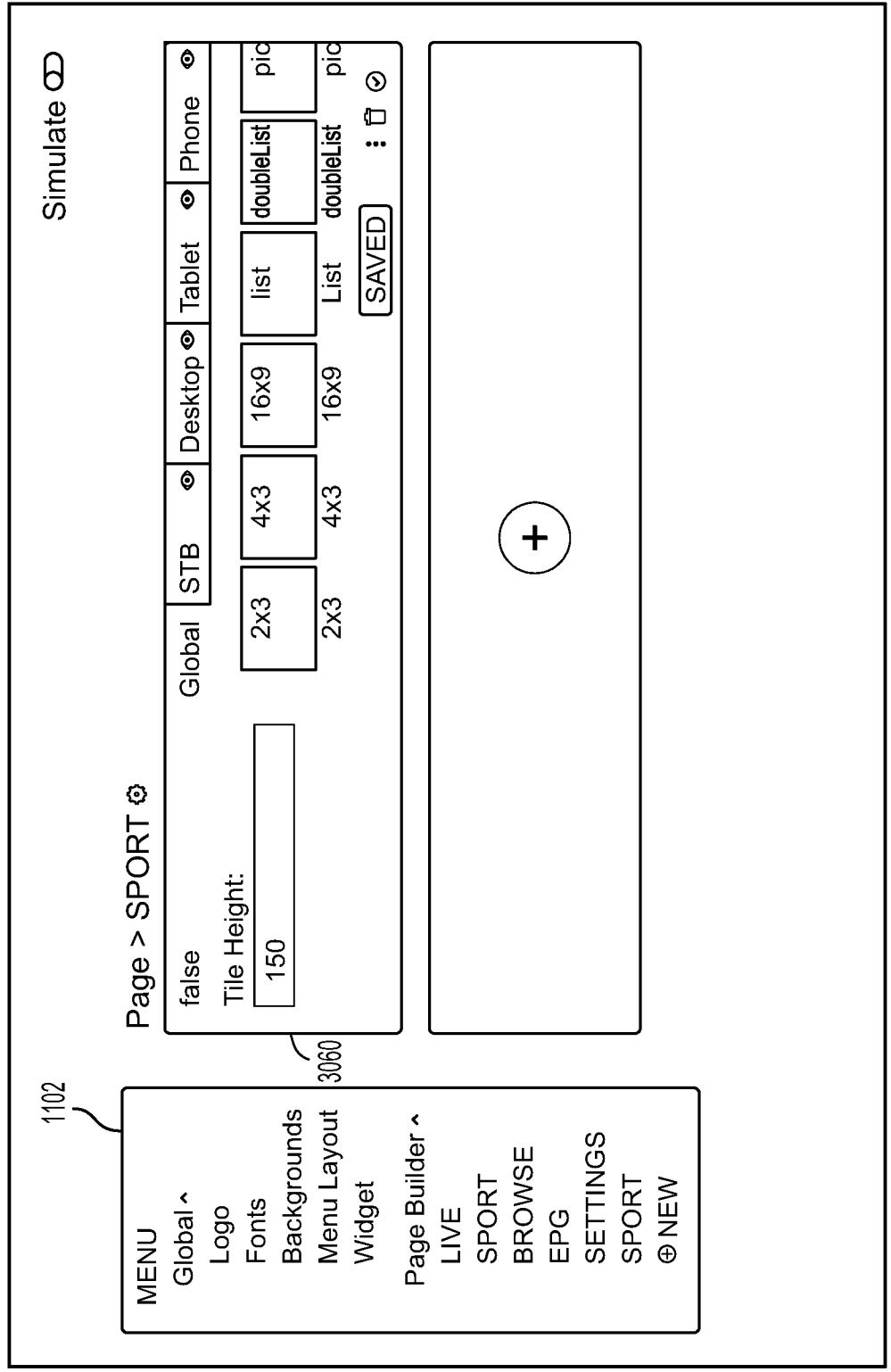

FIG. 30 shows an example of the operator console interface in response to selection of the phone tab 2246. An operator can change the parameters of a phone-specific section 3060 using the interface shown in FIG. 30. For example, the operator can modify the aspect ratio and the height ("Tile Height") of each content tile within the phone-specific section 3060. For example, the operator can select from among different aspect ratios for the section, including 2×3, 4×3, 16×9, list, double list, or pic. As shown, the operator has entered a tile height of 150 for the phone-specific section 3060.

Figure 31:
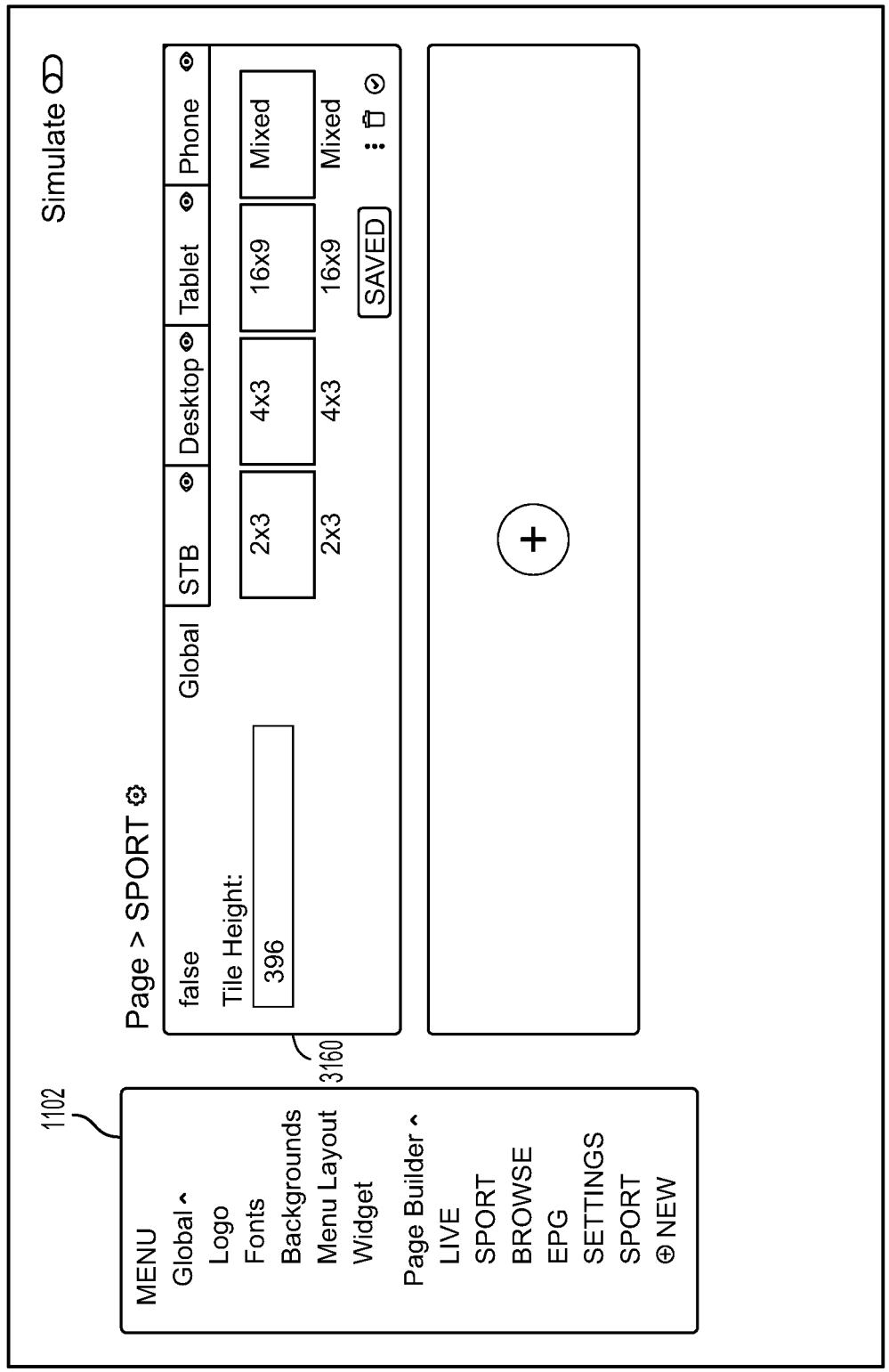

FIG. 31 shows an example of the operator console interface in response to selection of the tablet tab 2244. An operator can change the parameters of a tablet-specific section 3160 using the interface shown in FIG. 31. For example, the operator can modify the aspect ratio and the height ("Tile Height") of each content tile within the tablet-specific section 3160. For example, the operator can select from among different aspect ratios for the section, including 2×3, 4×3, 16×9, or mixed. As shown, the operator has entered a tile height of 396 for the tablet-specific section 3160.

Figure 32:
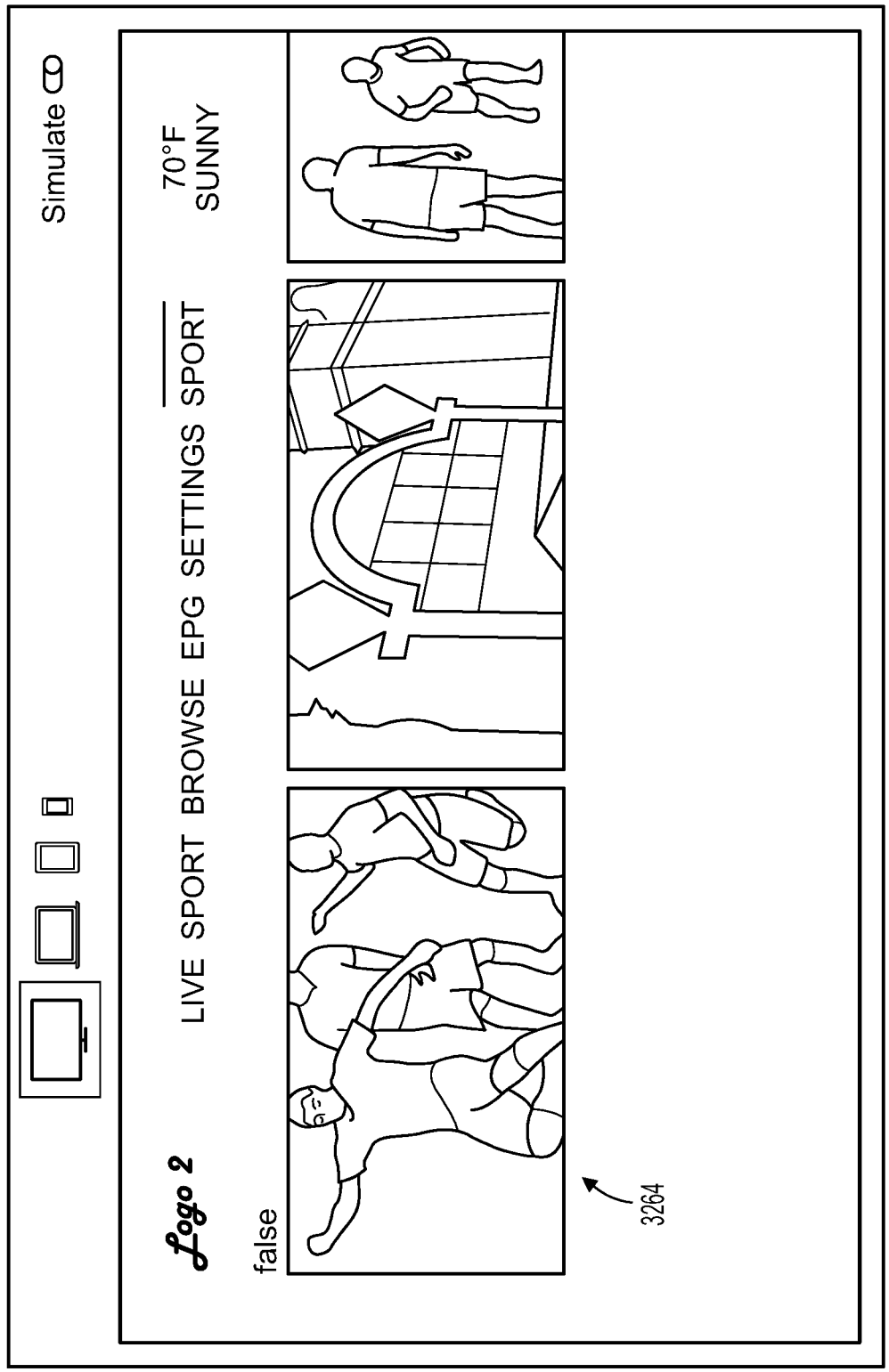
FIG. 32, FIG. 33, FIG. 34, and FIG. 35 illustrate examples of previews of a user interface design for different types of devices, in accordance with various examples of the application.
Figure 33:
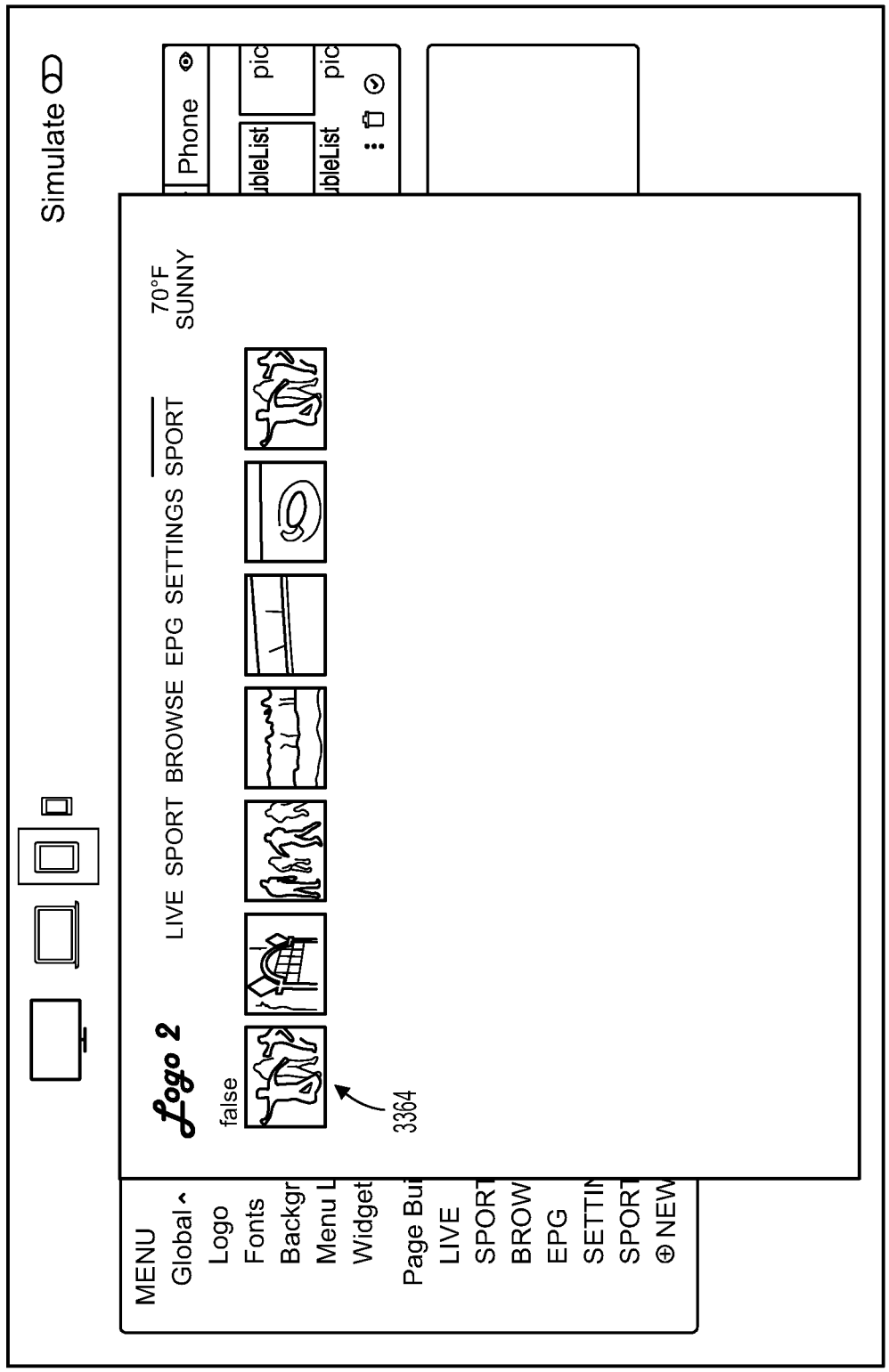

As noted above, the operator can select the simulate interface element 1104 to simulate a view of a page of the user interface. FIG. 32 illustrates a simulated view (based on selection of the simulate interface element 1104) of a layout design for the "false" section of the SPORT view for a desktop computer type of device. The layout shown in FIG. 32 is defined based on the parameters entered in the fields of desktop computer tab 2242. FIG. 33 illustrates a simulated view (based on selection of the simulate interface element 1104) of a layout design for the "false" section of the SPORT view for a tablet type of device. The content tiles (e.g., a content tile 3264 showing content for a soccer match) for the tablet layout design for the "false" section shown in FIG. 33 are smaller than the content tiles (e.g., a content tile 3364 showing content for the same soccer match as that presented by the content tile 3264 from FIG. 32) for the desktop computer layout design for the "false" section shown in FIG. 32. The difference in content tile size is based on the tile height and aspect ratios selected in the tablet table 2244 and the desktop computer tab 2242, respectively.

Figure 34:
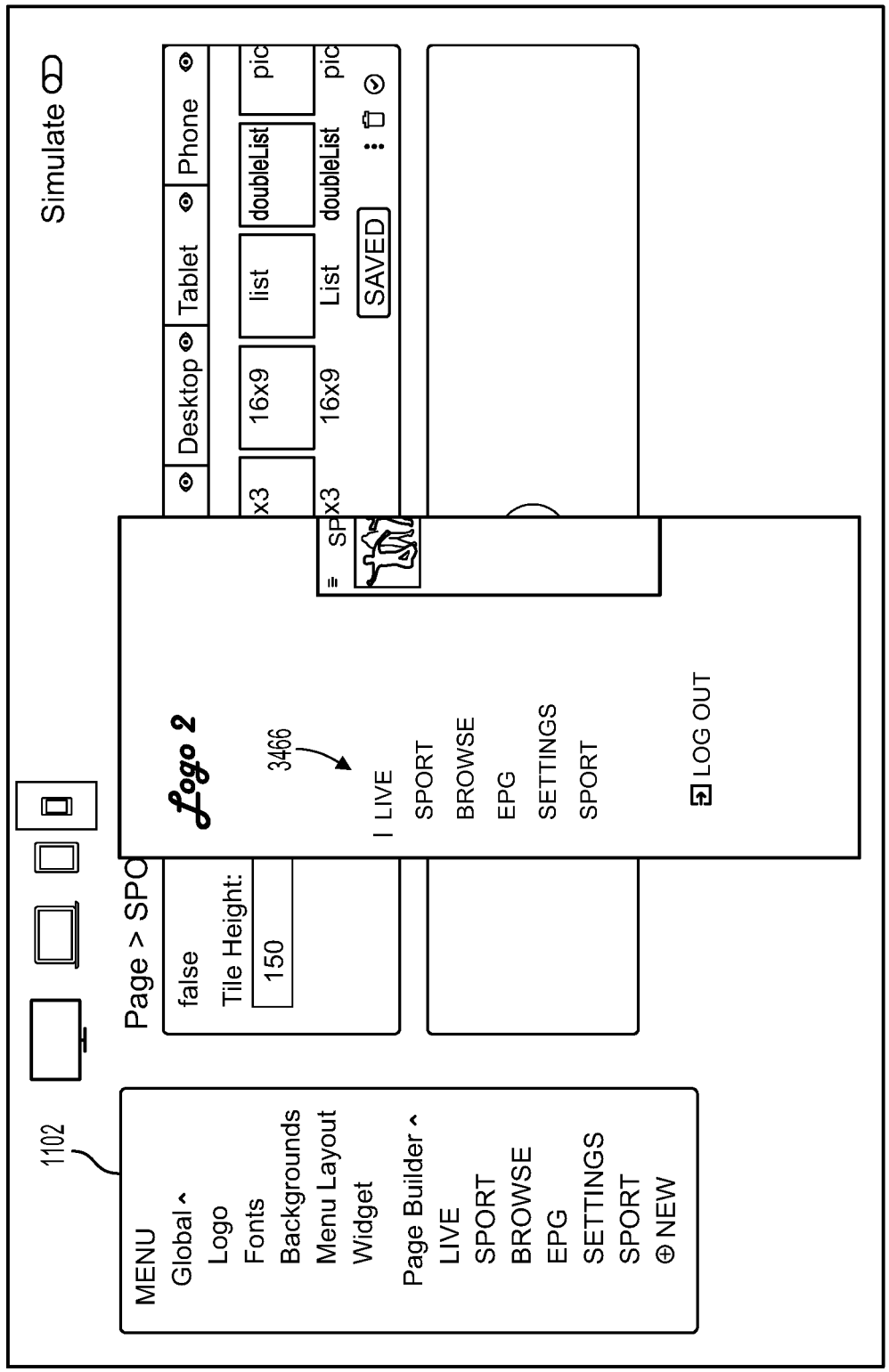
Figure 35:
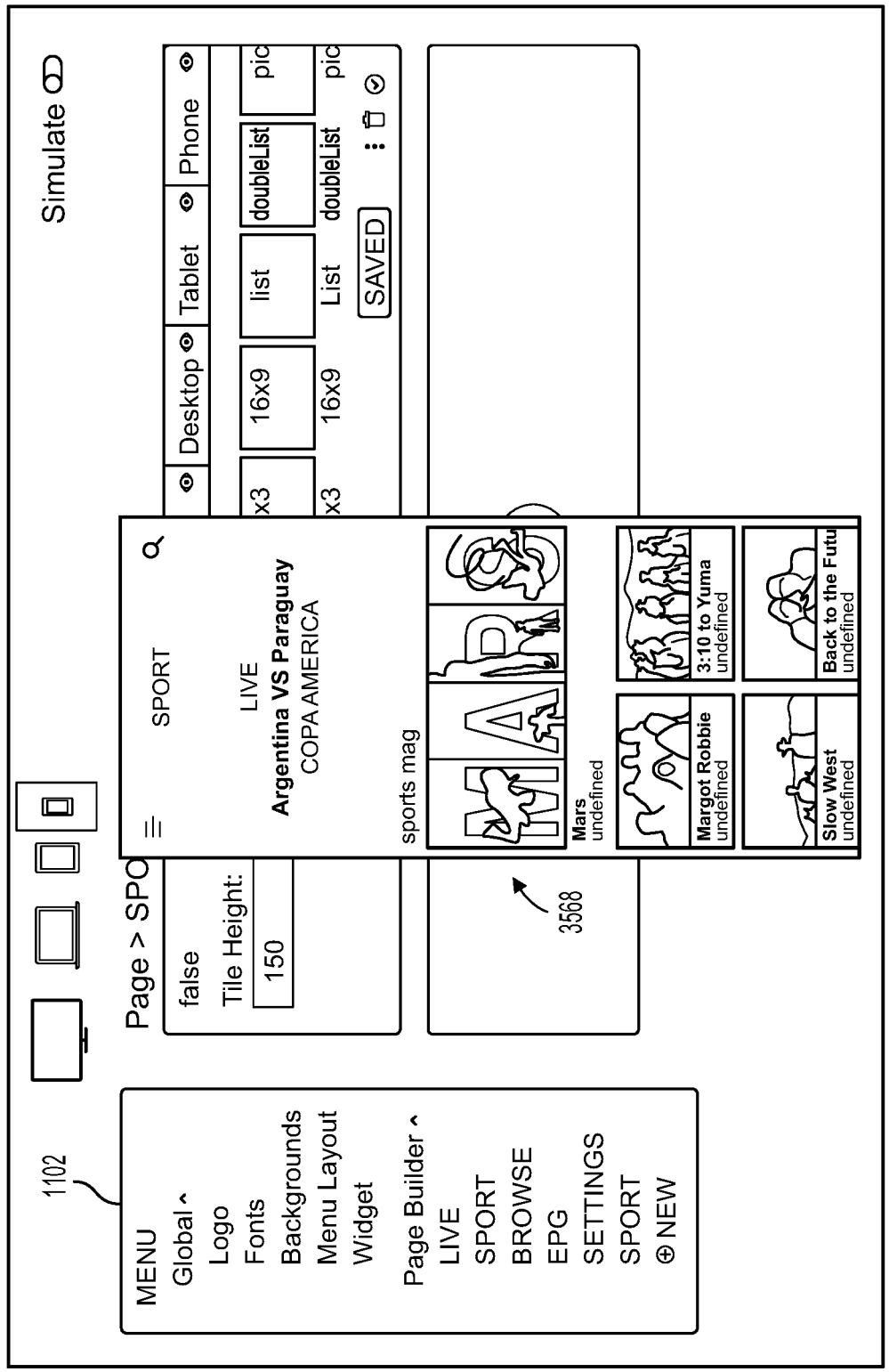

FIG. 34 illustrates a simulated view (based on selection of the simulate interface element 1104) of a layout design for a phone type of device. The layout design in FIG. 34 shows a menu 3466 listing the different pages available for display. FIG. 35 illustrates a simulated view 3568 of a SPORT view of the user interface in response to selection of the SPORT view option from the menu 3466 shown in FIG. 34. As shown in FIG. 34, while being based on the same common input information provided in the global section of the operator console interface, the layout of the SPORT view generated by the operator console is completely different than the layouts shown in FIG. 32 and FIG. 33.

FIG. 58, FIG. 59, FIG. 60, and FIG. 61 illustrate other examples of pages of the operator console interface (e.g., implemented as a user interface or GUI) that can be presented in response to selection of the page builder option of the menu 1102. As shown in FIG. 58, various views (or pages) 5834 are shown. An operator can create new views (by selecting the NEW page option 5835) and can change parameters of the existing views 5834 of the user interface. Similar to that described with respect to FIG. 22, an operator can edit the title, the content type (corresponding to a content source), among other parameters of the various views (a "BROWSE" view is shown as being edited in FIG. 58). Example illustrations of various strip arrangements for content tiles of the "BROWSE" view are shown in FIG. 58, including a strip arrangement 5849, a magazine arrangement 5851, a list arrangement 5853, and a tile arrangement 5855. While in the global tab 5838, an operator can select a global arrangement (e.g., strip arrangement 5849, magazine arrangement 5851, list arrangement 5853, or tile arrangement 5855) that will apply for all device types. The operator can also select a device-specific tab (e.g., a television tab 5840, a desktop computer tab 5842, a tablet computer tab 2244, or a mobile phone tab 5846), and can then select a device-specific arrangement for each type of device.

Figure 59:
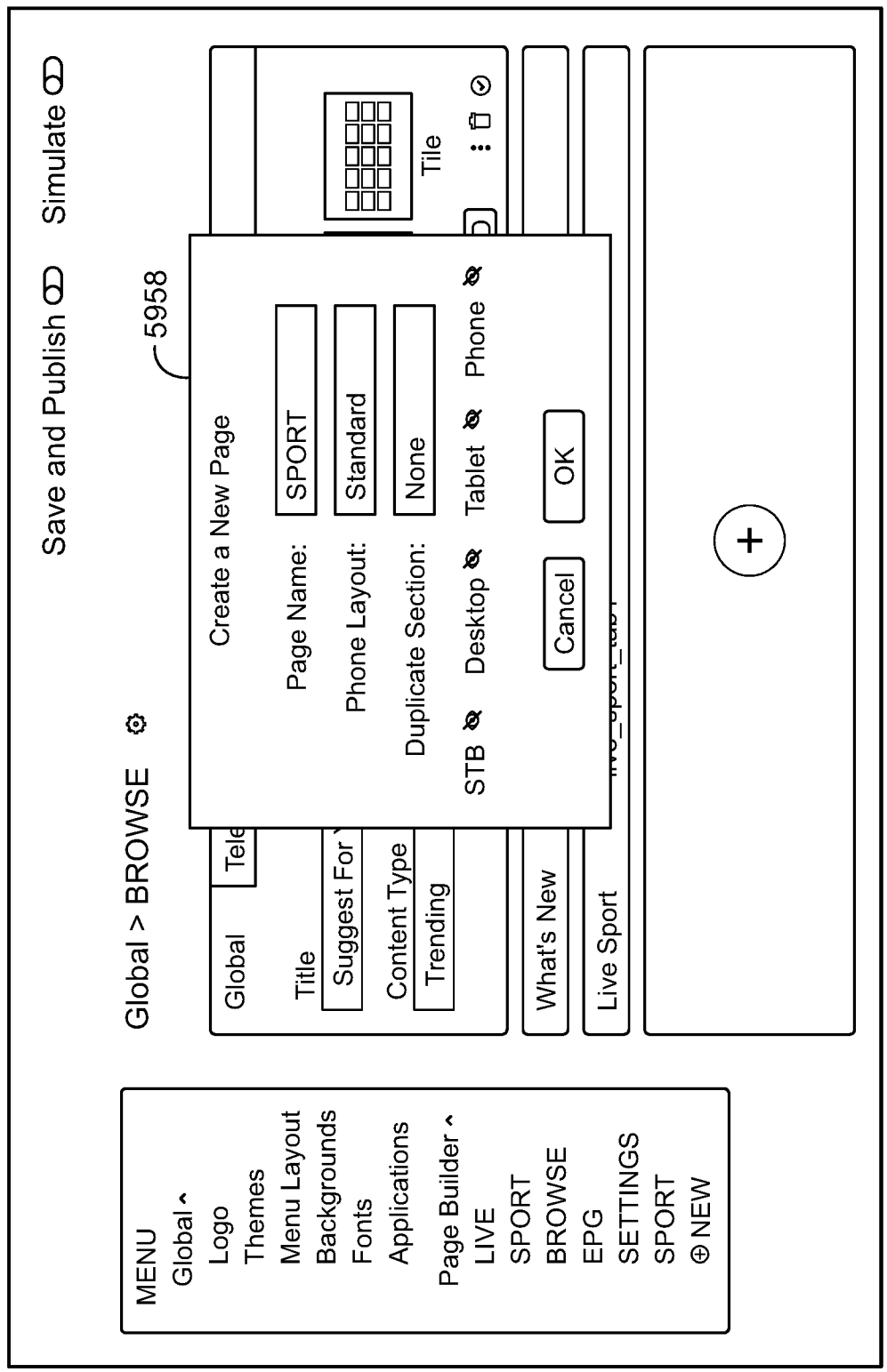
Figure 60:
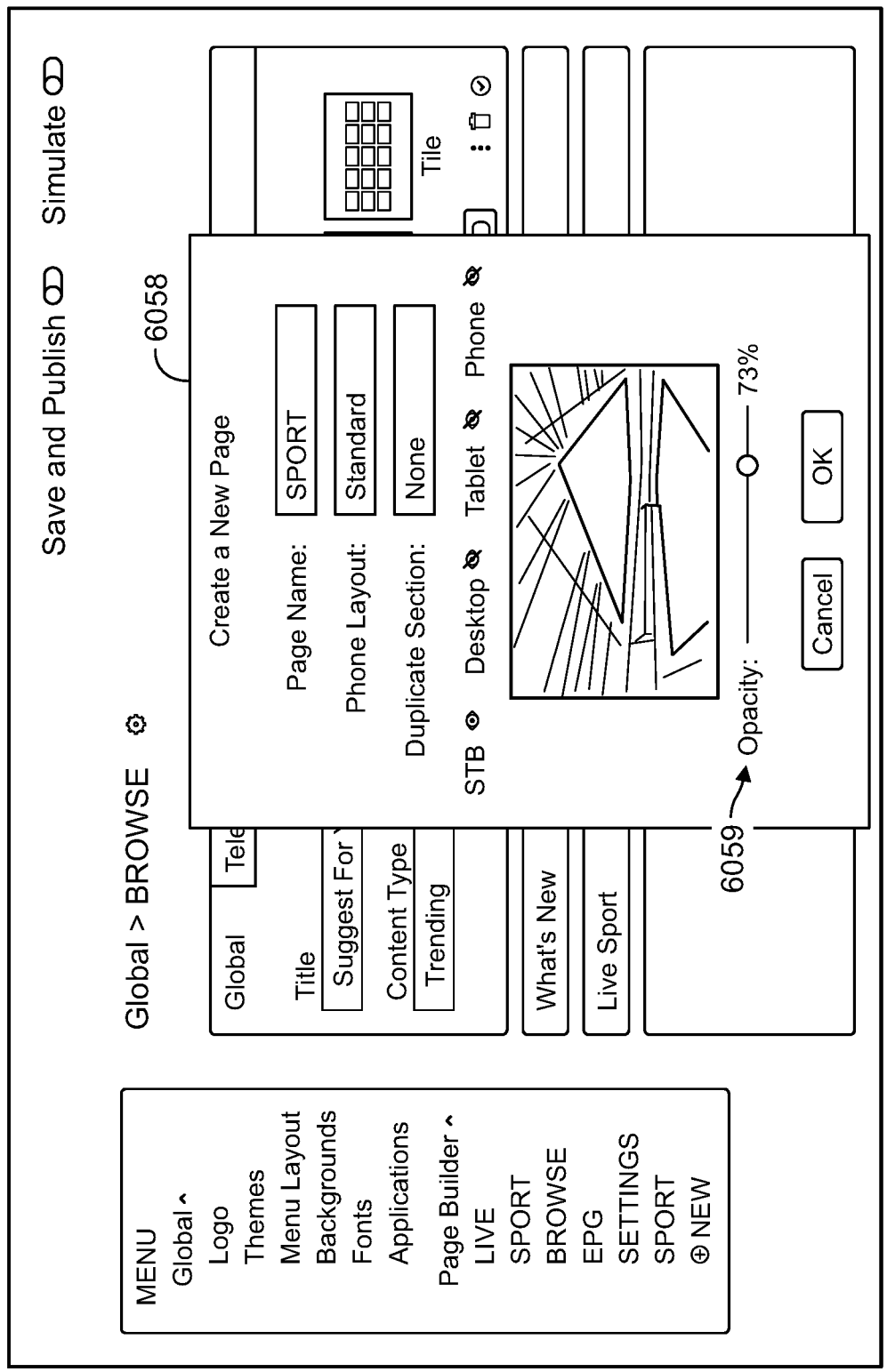

FIG. 59 shows a page of the operator console interface with a dialog box 5958 that is presented in response selection of the NEW page option 5835 under the page builder option of FIG. 58. As shown, the dialogue box 5958 includes fields that allow the operator to enter parameters for the view being created, including the page name (or view title), the phone layout, duplicate selection, and backgrounds, which are described above with respect to FIG. 25. In the example of FIG. 59, the operator entered a view title of "SPORT", a phone layout of "Standard", and selected "None" for the duplicate section, and selected an affirmative for backgrounds. FIG. 60 shows an example of a page of the operator console interface with a dialog box 6058 that is displayed in response to selection of the background option shown in the dialogue box 5958 of FIG. 59. The dialog box 6058 allows an operator to select an image, a video, clip art, text, a logo, any combination thereof, and/or other media for display in the background of the view being created. The operator can select the opacity of the background using opacity option 6059. The opacity option controls whether a background is displayed more or less opaque (where a larger numerical value, such as a percentage, indicates more opacity). While the opacity option 6059 is shown as a slider in FIG. 60, the opacity option 6059 can include any other suitable interface element, such as a numerical entry field that allows the operator to manually enter an opacity percentage, a drop down menu with various opacity options, and/or other interface element that allows the operator to control the opacity.

Figure 61:
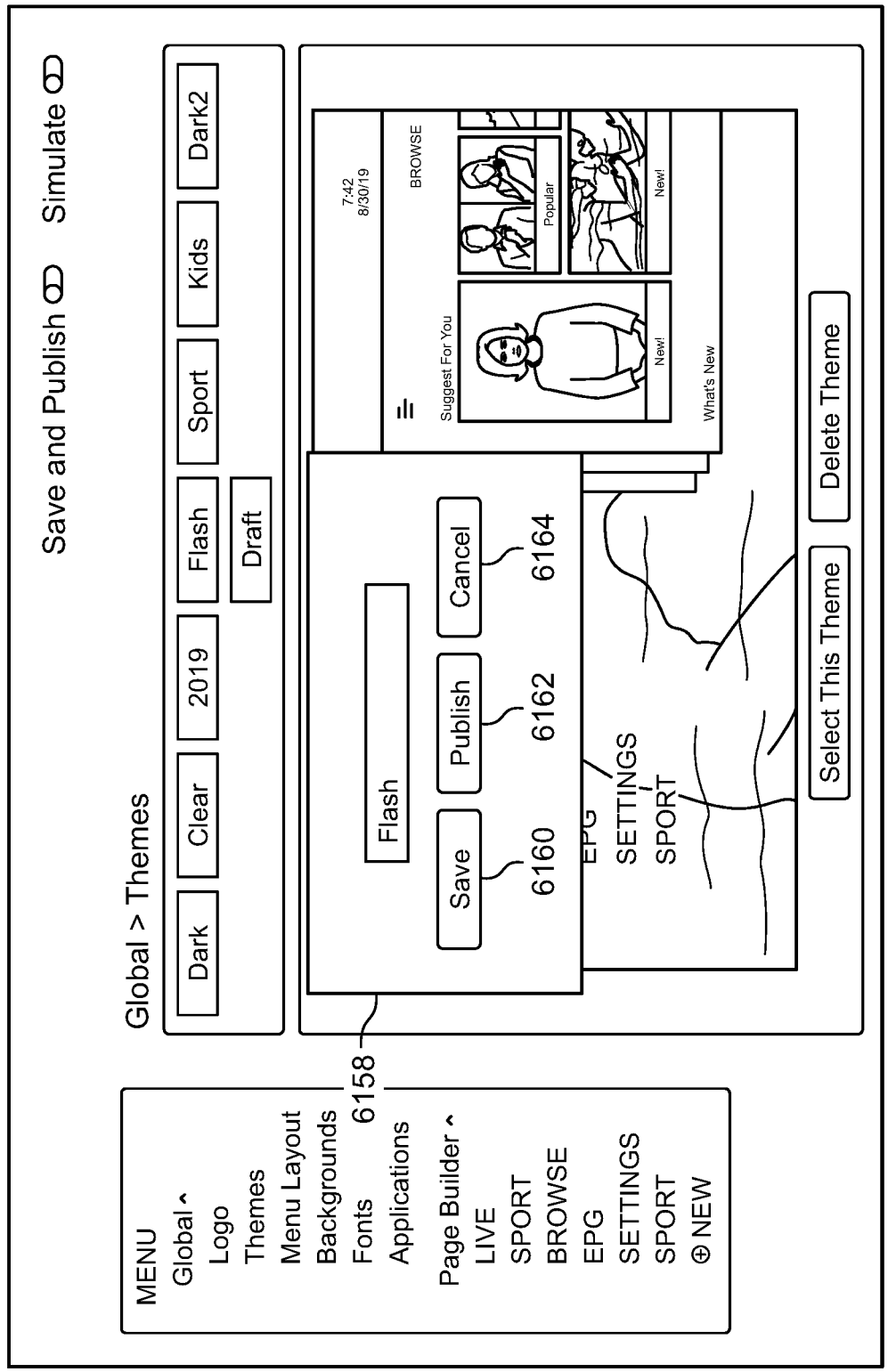

FIG. 61 shows an example of a dialog box 6158 of the operator console interface that allows an operator to save a view as a default theme (default themes are discussed below with respect to FIG. 49) by selecting save option 6160, publish the view for deployment to one or more user devices by selecting publish option 6162, or cancel the view (e.g., delete the view) by selecting the cancel option 6164.

Figure 49:
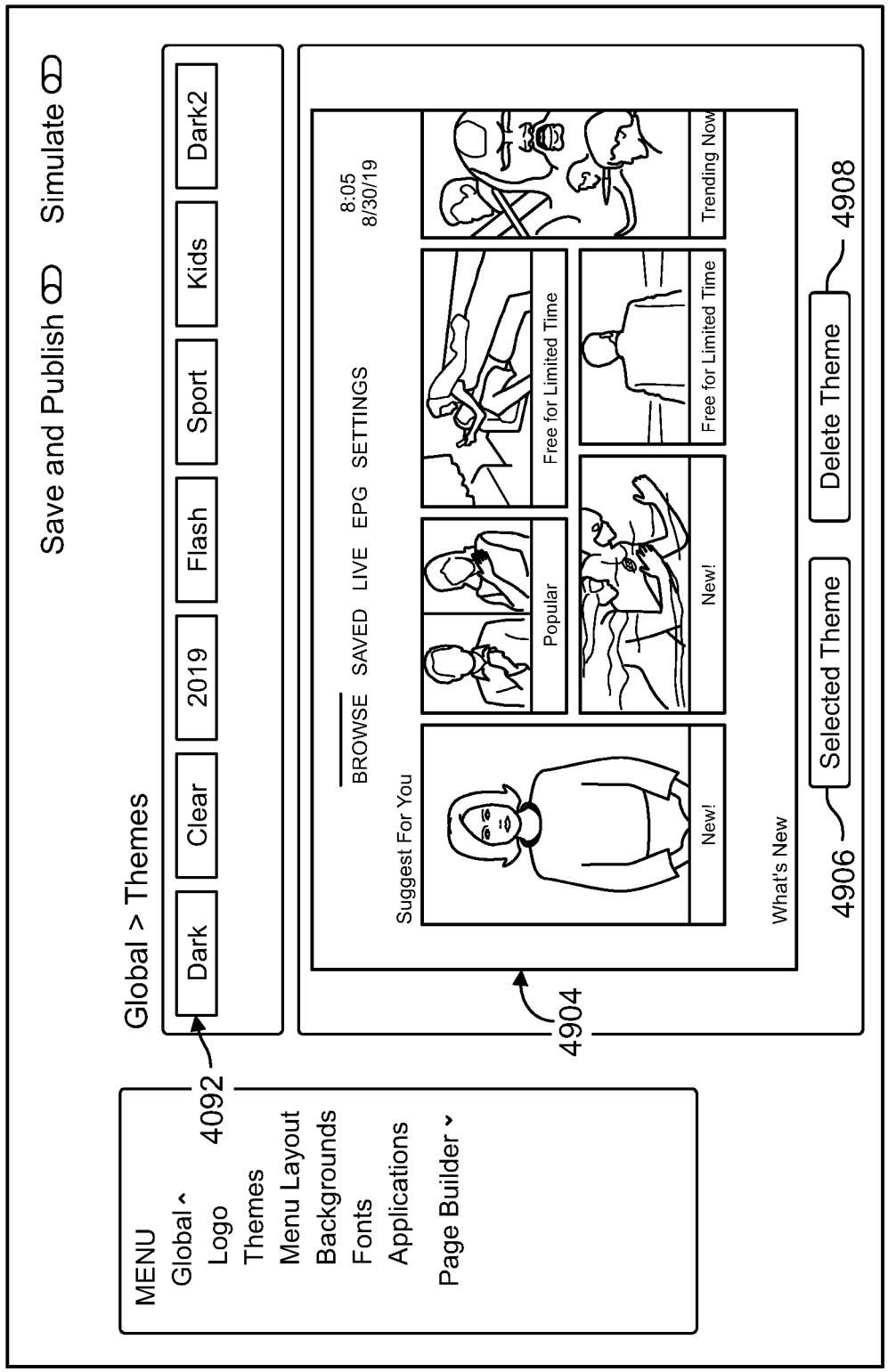
FIG. 49 illustrates an example of a page of an operator console interface including default themes for a user interface, in accordance with various examples of the application.
Figure 50:
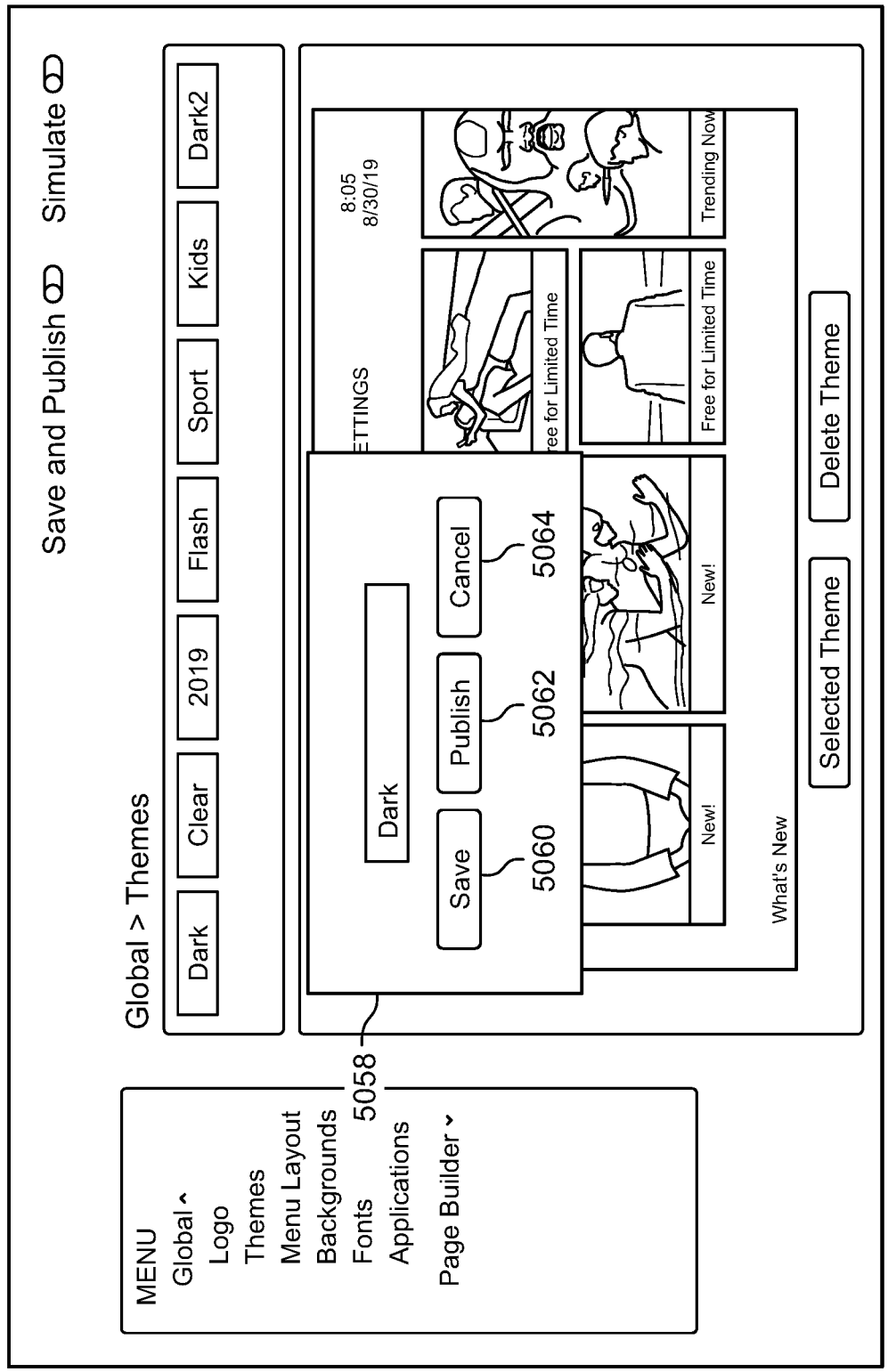
FIG. 50 illustrates an example of a page of an operator console interface including an option to save or publish a default theme for a user interface, in accordance with various examples of the application.

FIG. 49 shows an example of a page of the operator console interface including default themes. The default themes include saved parameters that can be applied as templates to newly created views. The parameters can include font type, font color, highlight color, background, tile arrangement (e.g., strip, magazine, list, and/or tile), menu arrangement (e.g., vertical or horizontal, as described below with respect to FIG. 51), any combination thereof, and/or other parameters described herein. As shown in FIG. 49, default themes include Dark 4902, Clear, 2019, The Flash, Sport, kids, and Dark2. In the example of FIG. 49, the Dark default theme 4902 is selected and a preview 4904 of the Dark default theme 4902 is shown. The operator can delete the Dark default theme 4902 by selecting the "delete theme" option 4908. The operator can select the Dark default theme 4902 for use when creating a new view (or page) by selecting the "selected theme" option 4906. FIG. 50 shows a dialog box 5058 that appears over the page shown in FIG. 49 when the "selected theme" option 4906 is selected by an operator. An operator can save the Dark default theme 4902 by selecting save option 5060, publish the Dark default theme 4902 for deployment to one or more views by selecting publish option 5062, or cancel the display of the dialog box 5058 by selecting the cancel option 5064.

Figure 51:
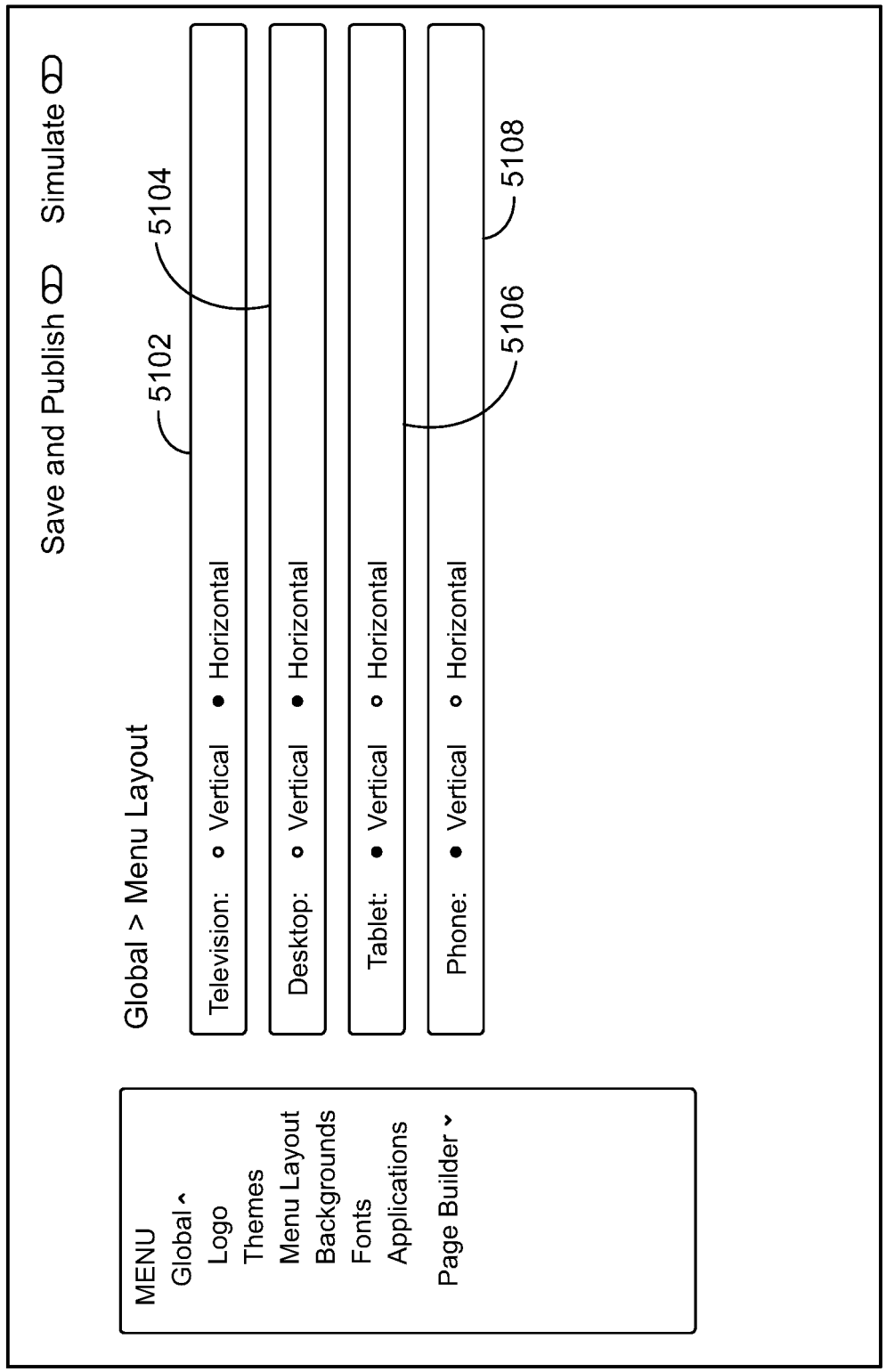
FIG. 51 illustrates an example of a page of an operator console interface for editing a menu layout of different types of devices, in accordance with various examples of the application.
Figure 52:
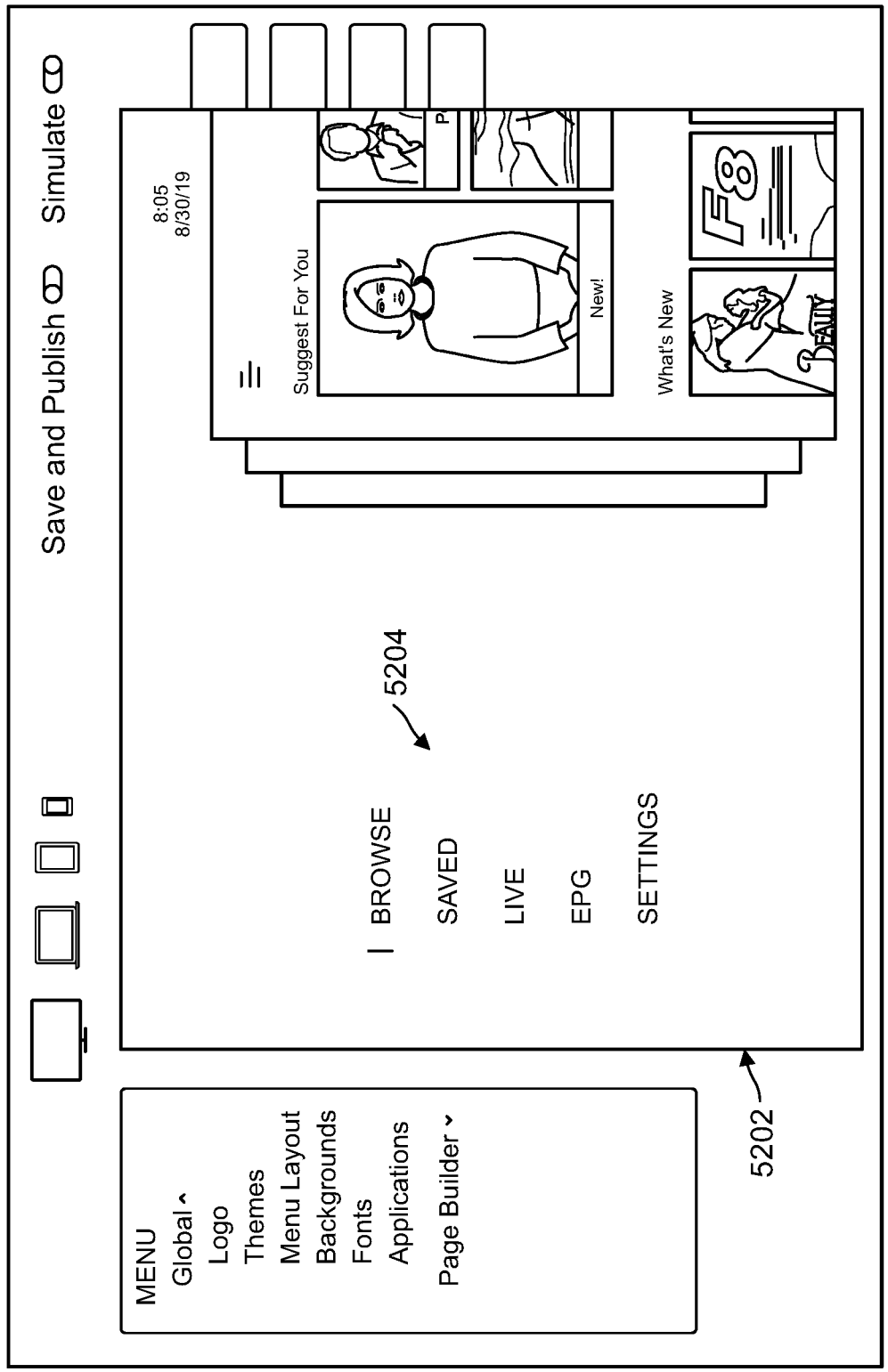
FIG. 52 illustrates an example of a preview of a user interface design for a tablet computer type of device based on a menu layout selected on the page of the operator console interface shown in FIG. 51, in accordance with various examples of the application.
Figure 53:
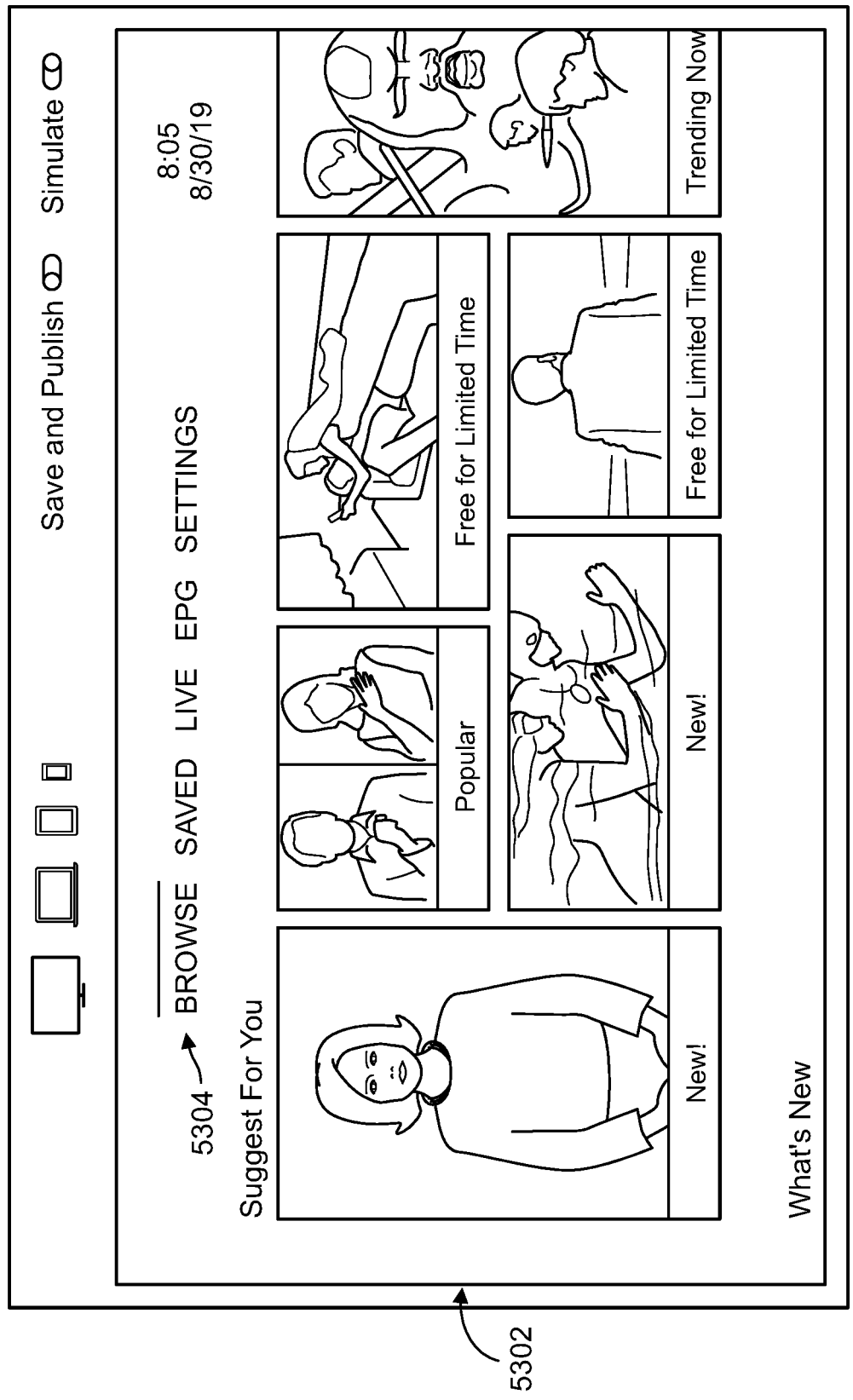
FIG. 53 illustrates an example of a preview of a user interface design for a television type of device based on a menu layout selected on the page of the operator console interface shown in FIG. 51, in accordance with various examples of the application.
Figure 54:
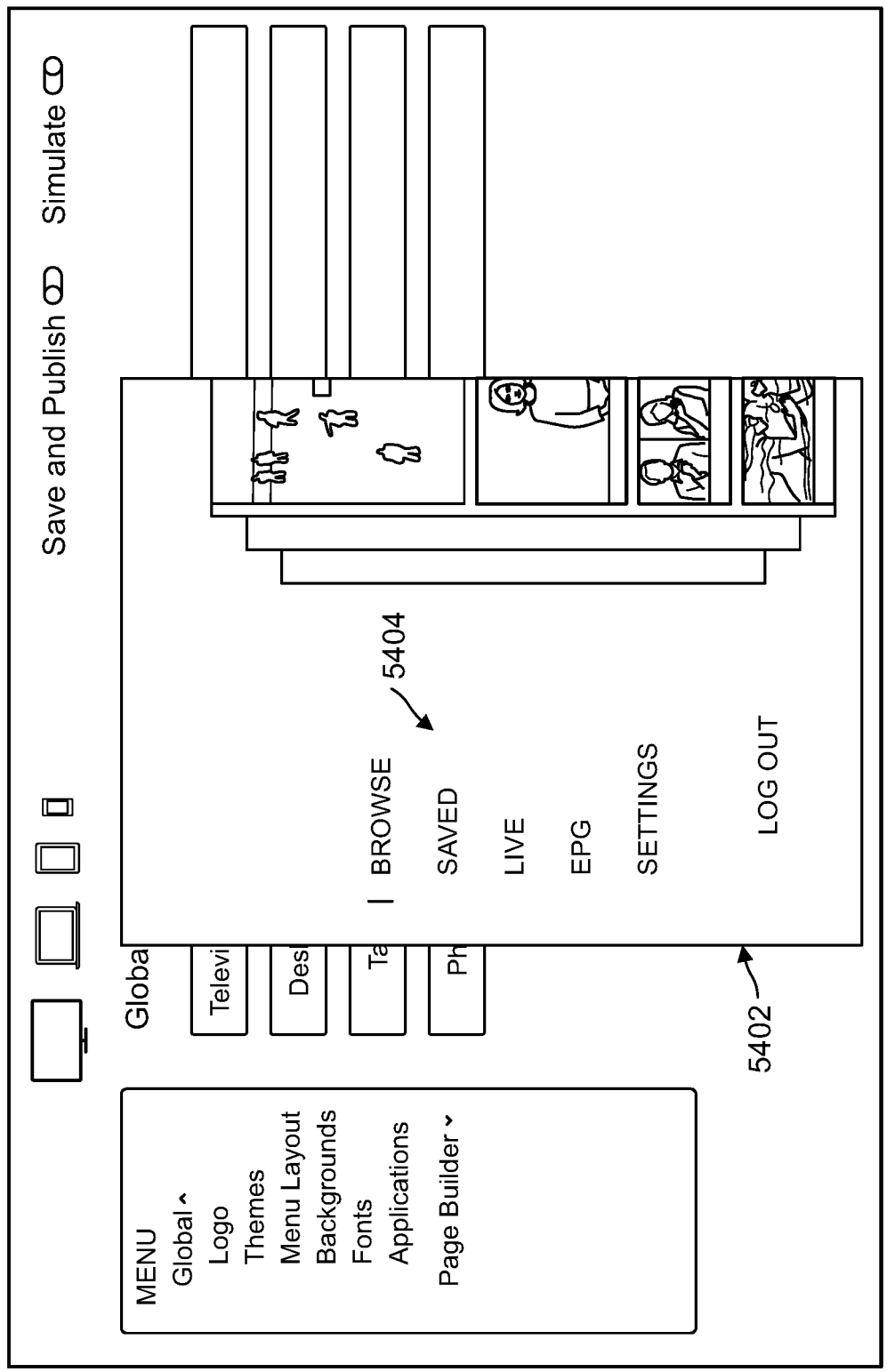
FIG. 54 illustrates an example of a preview of a user interface design for a mobile phone type of device based on a menu layout selected on the page of the operator console interface shown in FIG. 51, in accordance with various examples of the application.

FIG. 51 shows an example of a page of the operator console interface including options for editing a global menu layout of a user interface. The global menu layout page allows an operator to configure the menu layout of different types of devices. For example, a television menu layout option 5102 is provided for configuring the menu layout for a television, a desktop computer menu layout option 5104 is provided for configuring the menu layout for a desktop computer, a tablet computer menu layout option 5106 is provided for configuring the menu layout for a tablet computer, and a mobile phone menu layout option 5108 is provided for configuring the menu layout for a mobile phone. The menu layout options include vertical and horizontal. The vertical menu layout option configures a menu to be arranged in a vertical arrangement, and the horizontal menu layout option configures a menu to be arranged in a vertical arrangement. FIG. 52 shows an example of a preview 5202 of a user interface design for a tablet computer type of device based on a vertical menu layout option being selected on the page shown in FIG. 51. As shown, the menu 5204 is arranged in a vertical layout. FIG. 53 shows an example of a preview 5302 of a user interface design for a television type of device based on a horizontal menu layout option being selected on the page shown in FIG. 51. As shown, the menu 5304 is arranged in a horizontal layout. FIG. 54 shows an example of a preview 5402 of a user interface design for a mobile phone type of device based on a vertical menu layout option being selected on the page shown in FIG. 51. As shown, the menu 5404 is arranged in a vertical layout.

Figure 55:
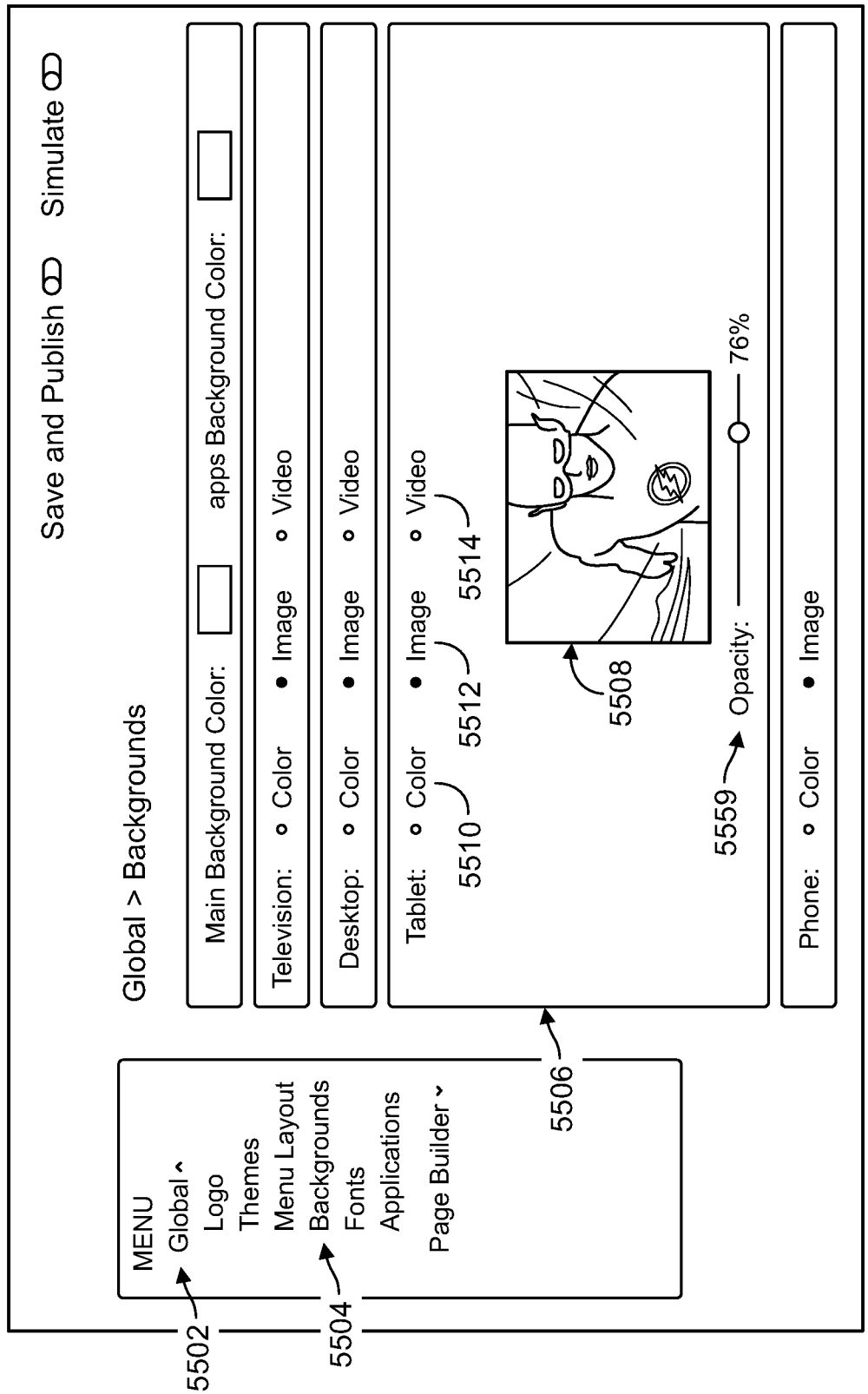
FIG. 55 illustrates an example of a page of an operator console interface for editing a background of a user interface, in accordance with various examples of the application.

FIG. 55 is an example of a background page of an operator console interface including options for editing a global background of a user interface. The background page shown in FIG. 55 can be displayed in response to selection of the "Backgrounds" option 5504 under the global option 5502. As shown, a tablet computer section 5506 is selected. An operator to select an image (using image option 5510), a video (using video option 5514), clip art, text, a logo, any combination thereof, and/or other media for display in the background of the user interface. In some cases, selection of the image option 5510 and/or the video option 5514 can direct the operator to a dialog box (not shown) that allows the operator to select a file location from which an image and/or video can be selected. The operator can also select a color for the background using color option 5510.

The global background created using the "Backgrounds" option 5504 can be applied to all pages of the user interface (based on the "Backgrounds" option 5504 being under the global option 5502). In some implementations, an operator can select individual backgrounds for individual views (or pages) when creating a view (as described above with respect to FIG. 59 and FIG. 60). For instance, an operator can change the background for a view from the global background (selected under the "Backgrounds" option 5504) to a different background (e.g., selected using dialog box 6058 shown in FIG. 60). The operator can select the opacity of the global background using opacity option 5559. The opacity option controls whether a background is displayed more or less opaque, in which case a larger numerical value (e.g., a percentage or other numerical value) indicates more opacity. While the opacity option 5559 is shown as a slider in FIG. 55, the opacity option 5559 can include any other suitable interface element, such as a numerical entry field that allows the operator to manually enter an opacity percentage, a drop down menu with various opacity options, and/or other interface element that allows the operator to control the opacity.

Figure 56:
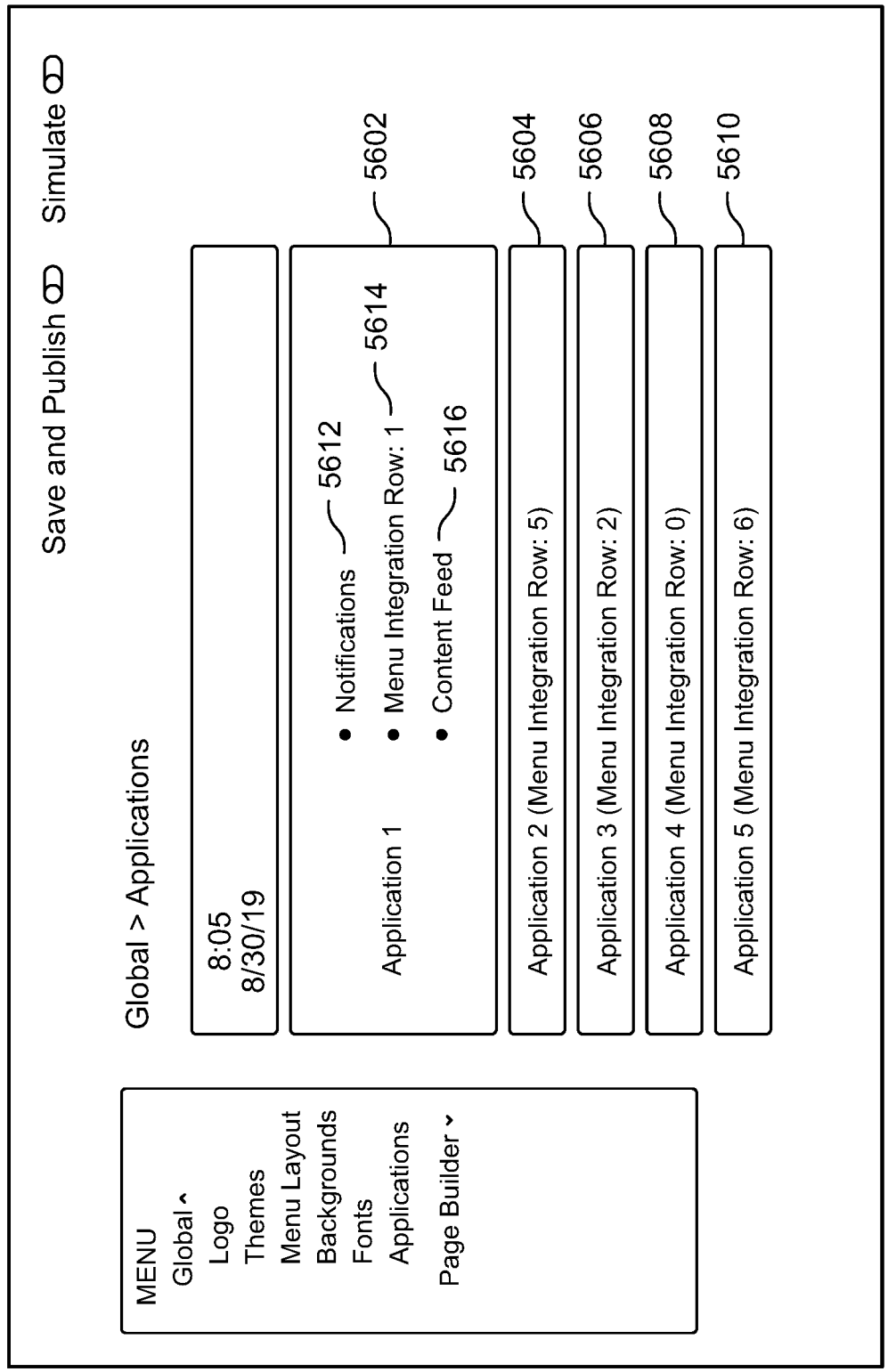
FIG. 56 illustrates an example of a page of an operator console interface for managing applications, in accordance with various examples of the application.

FIG. 56 illustrates an example of an application page of an operator console interface for managing applications. The applications shown in FIG. 56 include application 1 5602, application 2 5604, application 3 5606, application 4 5608, application 5 5610. For example, the applications can include applications that provide media content (e.g., video streaming applications, audio streaming applications such as a streaming music service, etc.), or applications that provide other functions, such as security (e.g., a security application), temperature control (e.g., a thermostat application), and/or other functions. The application page allows an operator to configure notifications for an application (e.g., whether notifications can be sent for a particular application) using a notifications option 5612. The application page also allows an operator to change the order of display of the various applications, by selecting the menu integration row option 5614. For example, a menu row value of 0 can correspond to a first row in the user interface, a menu row value of 1 can correspond to a second row in the user interface, and so on. An operator can also select a content source for an application through the application page by selecting the content feed option 5616. The content source can indicate the source (e.g., a source location, such as a server location) that will provide the content for a particular application.

Figure 57:
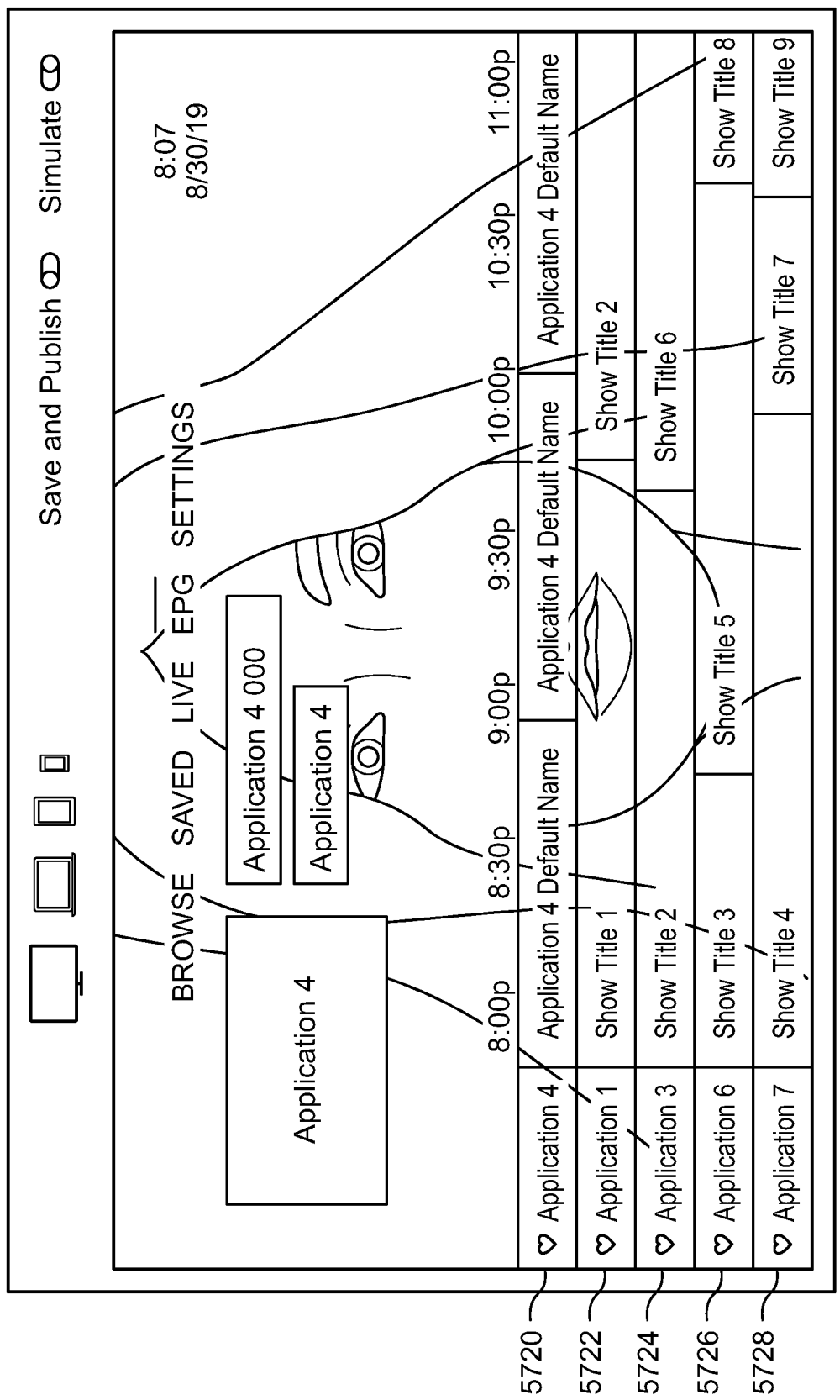
FIG. 57 illustrates an example of a preview of a user interface design based on application settings selected on the page of the operator console interface shown in FIG. 56, in accordance with various examples of the application.

FIG. 57 illustrates an example of a preview of a user interface design based on application settings selected on the page of the operator console interface shown in FIG. 56. As shown, the Application 4 5608 is displayed in a first row 5720 of the user interface, the Application 1 5602 is displayed in a second row 5722 of the user interface, the Application 3 5604 is displayed in a third row 5724 of the user interface, an Application 6 (not shown in FIG. 56) is displayed in a fourth row 5726 of the user interface, and an Application 7 (not shown in FIG. 56) is displayed in a fifth row 5728 of the user interface. The Application 2 5604 and the Application 5 5610 are not shown in FIG. 57.

Returning the FIG. 10, the view modification 1012 is provided to the first user device 1030a and also to the second user device 1030b. In some cases, some view modifications may only be provided to certain types of devices. For instance, a view may be generated by the interface management server 1020 that cannot be displayed properly on a certain type of device. In one illustrative example, a display of a mobile phone may be too small to display the content of a particular view, in which case the interface management server 1020 may not send the modified view to the mobile device. For instance, as shown in FIG. 10, view parameter information 1016 is provided to the interface management server 1020 from the operator system client 1025. The interface management server 1020 can generate a view modification 1018 based on the view parameter information 1016. The view modification 1018 is provided by the interface management server 1020 to the user device 1030b, but not to the user device 1030a.

In some cases, the interface management server 1020 can deploy modifications to a user interface based on one or more triggering events detected by the interface management server 1020 (and/or detected by the operator system client 1025). For instance, as shown in FIG. 10, the interface management system server 1032 can detect a triggering event 1032, and can generate a view modification 1034 in response to detecting the triggering event 1032. The triggering event 1032 can include a sporting event, a calendar date, a release of a program, a release of a movie, an update of an application, support for a new device platform, adding a new content provider, among others. The interface management system server 1032 can send the view modification 1034 to the user device 1030b. While not shown, in some cases, the interface management system server 1032 can send the view modification 1034 to the user device 1030a.

As noted above, one or more layouts of a view or one or more modified layouts of a view can be provided by the interface management system (e.g., the interface management system server 1032) to one or more user devices (e.g., user device 1030a and/or user device 1030b). In some cases, the layout of the view can be provided in a file that is sent to one or more user devices. An example of a file is a JavaScript Object Notation (JSON) file. An illustrative example of a portion of a JSON file for providing a layout of a view to one or more user devices is provided as follows:

```
{
/* this part contains the data displayed in the "global" section of the operator UI */
    "global": {
        "themeName": "ion dark", /*Name of the theme*/
        "date": "2019-09-03T17:36:37.992Z",/* date of last update
        /* logo section */
        "logo": "/opUi/database/upload/ion-400x130.png",
        /* font section */
        "hilite": "#02e977",
        "mainColor": "#ffffff",
        "theme": "dark",
        "fonts": {
            "font": "Athiti", // font name used to fetch the fonts in the google database
            "light": "200",//
            "medium": "300",// font style.. small medium large
            "bold": "600",//
            "textHilite": "#ffffff",
            "textColor": "#acacac",
            "textColor2": "#acacac",
            "menuColor": "#8d8d8d",
            "posterTitle": "#ffffff",
            "posterSubtitle": "#dcdcdc",
            "selectedMenuColor": "#ffffff",
            "titleColor": "#bebebe",
            "titleWeight": "300",//
            "textWeight": "200",// style for title
            "menuWeight": "300",//
            "posterTitleWeight": "300",//
            "posterSubtitleWeight": "200"// style for poster
        },
        /*background section
        this part holds all the info about the MAIN backgrounds for all the devices */
        "backgrounds": {
            "mainBackgroundColor": "#000000",
            "appBackgroundColor": "#000000",
            "stb": {
                "kind": "video",
                "plate": 0.84,
                "url": "/opUi/database/upload/Humans2.jpg",
                "appUrl": "/opUi/database/upload/Humans.jpg"
            },
            "desk": {
                "kind": "color",
                "plate": 0.85,
                "url": "/opUi/database/upload/s2p2.png",
                "appUrl": "/opUi/database/upload/Humans.jpg"
            },
            "tab": {
                "kind": "image",
                "plate": 0,
                "url": "/opUi/database/upload/greyclBk.jpg",
                "appUrl": "/opUi/database/upload/Humans.jpg"
            },
            "pho": {
                "kind": "image",
                "plate": 0,
                "url": "/opUi/database/upload/greyclBk.jpg",
                "appUrl": "/opUi/database/upload/Humans.jpg"
            }
        },
        // this describe the kind of clock we want to display
        "rightWidget": "usClock",
        // menu layout per devices ( vertical or horizontal)
        "menuLayout": {
            "stb": "Horizontal",
            "desk": "Horizontal",
            "tab": "Horizontal",
            "pho": "Vertical"
        },
        // applications displayed in the "app" section of the oprator UI
        "apps": [{
            "name": "Netflix",
            "feed": false,
            "epg": false,
            "epgRow": "0",
            "notif": false,
            "app": "netflix"
        }, {
            "name": "Nest",
            "feed": false,
            "epg": false,
```

-continued

```
                "epgRow": "0",
                "notif": false,
                "app": "nest"
        }, {
                "name": "Youtube",
                "feed": false,
                "epg": false,
                "epgRow": 2,
                "notif": false,
                "app": "youtube"
        }, {
                "name": "Ring",
                "feed": false,
                "epg": false,
                "epgRow": false,
                "notif": false,
                "app": "ring"
        }, {
                "name": "Amazon",
                "feed": false,
                "epg": false,
                "epgRow": false,
                "notif": false,
                "app": "amazon"
        }]
},
"profile": [{
        "hPos": "0", /* this gives the place of a section in the UI so hPOs is 0, therefore, this section will be the first one to be displayed */
        "bk": { /* this describes the kind of background needed for each devices */
                "stb": {
                        "show": false,
                        "url": false,
                        "plate": 0.8
                },
                "desk": {
                        "show": false,
                        "url": false,
                        "plate": 0.8
                },
                "tab": {
                        "show": false,
                        "url": false,
                        "plate": 0.8
                },
                "pho": {
                        "show": false,
                        "url": false,
                        "plate": 0.8
                }
        },
        "sectionName": "sectionBROWSE1564333371659", // unique ID of a section
        "title": "BROWSE", // title of the section
        "display": true, // tells if this section should be displayed or not
        "phone": { // describe what kind of display is needed for the phone ( double content, or multitabs)
                "doubleContent": true,
                "multiTabs": false
        },
        "feed": [{ // this is where the content of a section starts
                "vPos": "0",// vertical position of a widget in the section
                "feedType": "Trending",// type of feed
                "name": false,
                "title": "Suggest For You", // title of the widget
                "phone": {
                        "display": true, // tell if it needs to be displayed or not on a particular device ( here it will be displayed on a phone but not on a tablet)
                        "widget": "magazine",// the kind of widget we want to use
                        "ratio": "ph_Mag_A" // ratio of the strips or pattern of a magazine etc..
                },
                "tablet": {
                        "display": false, // display is false for tablet
                        "widget": "magazine",
                        "ratio": "tablet_Mag_A"
                },
                "stb": {
                        "display": true,
                        "widget": "magazine",
                        "ratio": "stb_Mag_A"
```

```
        },
        "desktop": {
            "display": true,
            "widget": "magazine",
            "ratio": "stb_Mag_A"
        }
    },
    ...};
```

The example JSON file portion shown above defines the global look and feel and one section of the user interface. Below is an example line of the JSON file (not shown in the example JSON file above):

{"date":"2019-09-03T16:53:13.853Z", "device":["all"], section:["browse"]}

The example line of the JSON file shown above keeps track of the changes a user interface of a user device (referred to as a client UI) is calling to the JSON file every periodic amount of time (e.g., every 10 to 30 seconds, or other periodic amount of time) and compares the date to the date the JSON file has on record. If the dates are not matching, the code in the JSON file checks if the update is affecting the device in use. If the update is affecting the device in use, the JSON file will update all the sections (corresponding to views or pages) included in the "section" variable (e.g., in the example line of the JSON file shown above, the BROWSE view (or page) will be updated). In this case, the last update from the operator console interface was on 2019 Sep. 3 at 16:53:13, and that update affected all the devices because the "browse" view (or page) changed.

The user devices also include code for rendering the user interface configured by an operator using the operator console interface. One illustrative example of sample code for client side rendering of the user interface executing JavaScript accessed at the server is as follows:

```
    override func viewDidLoad( ) {
        super.viewDidLoad( )
        let userContentController = WKUserContentController( );
        let webConfiguration = WKWebViewConfiguration( );
        webConfiguration.userContentController = userContentController;
        webView = WKWebView(frame: CGRect(x: 0, y: 0, width: self.view.frame.size.width,
height: self.view.frame.size.height), configuration: webConfiguration);
        self.view.addSubview(webView);
    }
    //~~~~~~~~~~~~~~~~~~~~~~~~~~~~~~~~~~~~~~
    //viewWillAppear
    override func viewWillAppear(_ animated: Bool) {
        super.viewWillAppear( animated);
        let url:URL = URL(string: "http://www.otvresearch.com/clientTest")!
        let fragUrl = URL(string: "#FRAG_URL",relativeTo: url)!
        let request:URLRequest = URLRequest(url: fragUrl);
        webView.navigationDelegate = self;
        webView.load(request);
    }
```

FIG. 36 illustrates an example process for providing an operator console, in accordance with various embodiments of the subject technology. At operation 3602, a system is configured to receive, via an operator console on an operator system, one or more inputs for a template for a user interface. The inputs may include, for example, a selection of a particular layout or layout style or modifications to the layout. The inputs may further include adding, modifying, or specifying interface elements such as content tiles, content item, strip arrangements, magazine arrangements, tile arrangements, list arrangements, rows, columns, panels, any combination thereof, and/or other interface elements that may be used to configure a layout of the design template. The inputs may further include assigning selected content or dynamic content from one or more sources to one or more interface elements. The inputs may also include rearranging interface elements in the layout or selecting other user interface options (e.g., changing logos, changing backgrounds, selecting primary focus colors or themes, etc.).

At operation 3604, the system may generate, based on the one or more inputs, the template for the user interface. This may include modifying an existing design template based on the one or more inputs received. Once the template is generated, at operation 3606, the system may generate a set of designs for the user interface based on the template. Each design in the set of designs may be generated based on a different interface profile. The interface profile may include information such as a device type, a screen size, a resolution, or an aspect ratio. For example, a design may be generated for tablet devices, another design may be generated for smart phone devices, and still another design may be generated for a television screen. Other designs may be generated for devices associated with displays with 1080p resolution (e.g., 1920×1080) and other designs may be generated for other resolutions (e.g., 720p, 4K, etc.). Designs may also be generated based on user profile information (e.g., adult users, users under 18 years of age, users with specific interests or tendencies, etc.). Various designs may be generated for various different interface profiles based on one or more pieces of information and/or combinations of different pieces of information.

In some embodiments, the generated designs may be provided to a content management system for eventual distribution to end user devices. In other embodiments, the system may select a design for an end user device based on how information associated with the user device (e.g., device type, resolution, aspect ratio, user profile information, etc.) compares with the interface profile for the design and provide the selected design to the end user device.

The system may also provide previews of the designs to the operator console. In some cases, the design may include dynamic content (e.g., content tiles for recommended content items, "watch next" items, promoted items, or schedule based content items). Accordingly, in order to generate an accurate preview, the system may retrieve the dynamic content from a content management system or other content source, insert the dynamic content into the design to generate the preview, and render the preview of the design at the operator console. In some cases, the template may be scheduled for a particular date and time as well. Accordingly, to generate the preview, the system retrieves dynamic content that is appropriate for the scheduled date and time.

FIG. 37 illustrates an example process 3700 implemented using the techniques described herein. At block 3702, the process 3700 includes obtaining, by a server computer, input defining one or more parameters of a view of a content guide. The view displays content accessible using the content guide. For example, an operator can provide the input using the operator console interface described above. In some examples, the content guide is a user interface to allow a user to access the content from a content management system. In some examples, the one or more parameters include at least one of a content source for the content accessible using the content guide and metadata associated with the content accessible using the content guide. In some cases, the metadata associated with the content includes at least one of a font, a font color, a background, any combination thereof, or other metadata.

At operation 3704, the process 3700 includes obtaining first information defining one or more attributes of a first type of device. The first type of device can include any type of device, such as a television, a desktop computer, a tablet computer, or a phone. In some examples, the one or more attributes of the first type of device include at least one of a device type, a screen size, a resolution, an aspect ratio, and a user profile.

At operation 3706, the process 3700 includes obtaining second information defining one or more attributes of a second type of device. The second type of device is different than the first type of device. The second type of device can include any type of device that is different than the first type of device, such as a television, a desktop computer, a tablet computer, or a phone. In some examples, the one or more attributes of the second type of device include at least one of a device type, a screen size, a resolution, an aspect ratio, and a user profile.

At operation 3708, the process 3700 includes generating, based on the one or more parameters and the first information, a first layout of the view of the content guide for the first type of device. At operation 3710, the process 3700 includes generating, based on the one or more parameters and the second information, a second layout of the view of the content guide for the second type of device. The second layout of the view is different than the first layout of the view. The first layout and the second layout of the view are generated using the same set of parameters (the one or more parameters), but are different based on the first information defining one or more attributes of the first type of device and the second information defining one or more attributes of the second type of device. For example, the first layout can include the same content presented to the user as the second layout, but can have the content arranged in a different arrangement (e.g., a tile arrangement) than an arrangement (e.g., a magazine arrangement) of the second layout. In some cases, different content can be presented by the first layout as compared to the second layout.

At operation 3712, the process 3700 includes providing, by the server computer, the first layout of the view of the content guide to a first device of the first type. The first layout is configured to modify the content guide for the first device. At operation 3714, the process 3700 includes providing, by the server computer, the second layout of the view of the content guide to a second device of the second type. The second layout is configured to modify the content guide for the second device. For example, as described above, the server computer can provide a first file (e.g., a JSON file) defining the first layout to the first device, and can provide a second file (e.g., a different JSON file) defining the second layout to the second device.

In some examples, the process 3700 includes obtaining additional input to modify the first layout of the view, and modifying, based on the additional input, the first layout of the view to a first modified layout. For example, an operator can provide the additional input using the operator console interface that changes the first layout, and the server computer can modify the first layout to the first modified layout based on the additional input. The additional input can be used to change only the first layout (e.g., based on being input to a page of the operator console interface corresponding to a device tab, such as the desktop computer device tab 2240 shown in FIG. 22), and not the second layout or any other layout for other devices. The process 3700 can further include providing the first modified layout of the view to the first device to replace the first layout.

In some examples, the process 3700 includes obtaining additional input defining at least one parameter of an additional view of the content guide, and generating, based on the at least one parameter and the first information, a first layout of the additional view of the content guide for the first type of device. The process 3700 can further include providing the first layout of the additional view to the first device. In some cases, a second layout of the additional view is not generated for the second type of device based on the second information defining the one or more attributes of the second type of device. For instance, the first layout of the additional view may not be appropriately viewable on the second type of device, in which case the first layout of the additional view will not be generated for and sent to devices of the second type. In one illustrative, some or all of the content of the first layout of the additional view may not fit on a screen of the second type of device.

In some examples, the process 3700 includes obtaining additional input to modify a parameter of the view of the content guide, and modifying, based on the modified parameter and the first information, the first layout of the view to a first modified layout. The process 3700 can further include modifying, based on the modified parameter and the second information, the second layout of the view to a second modified layout, providing the first modified layout of the view to the first device, and providing the second modified layout of the view to the second device. For example, input provided by an operator on a page corresponding to a global tab (e.g., global tab 2238 shown in FIG. 22) can be used to modify all layouts of a view for all device types.

In some examples, the process 3700 includes obtaining scheduling information for the view of the content guide, and scheduling, using the scheduling information, activation of a modification to the view of the content guide. In some cases, the process 3700 can include generating, in response to the scheduled activation, a modification of the view of the content guide. In some cases, the process 3700 can include scheduling the activation of the modification to the view of the content guide based on a scheduled event. Scheduled events (also referred to as triggering events) can include a sporting event, a calendar date, a release of a program, a release of a movie, an update of an application, support for a new device platform, adding a new content provider, any combination thereof, and/or other scheduled events.

In some examples, the process 3700 includes generating a preview of the first layout of the view of the content guide for the first type of device. An example of a preview is shown in FIG. 23, and can be displayed in response to selection of a simulate interface element (e.g., simulate interface element 1104).

In some examples, the process 3700 can utilize the content optimization techniques described below. For example, at least a portion of the content accessible using the content guide can be based on expected access of the content. As explained in more detail below with respect to the content optimization techniques, the expected access can be determined based on actual access of the content through a content provider system. In some examples, the process 3700 can include modifying the first layout of the view of the content guide for the first type of device based on the expected access of the content.

The examples described above with respect to FIG. 36 and FIG. 37 can be implemented individually or in any combination.

Systems, methods, and computer-readable media are also described that provide content rights optimization (also referred to as content optimization) for content provider systems (which can be part of or separate from a content management system). A large burden for operators of content provider systems (e.g., over-the-top media service providers) is managing the access rights and constraints defined by contracts with the content providers. Content providers produce, distribute, and/or otherwise hold the rights to distribute content. For example, a content provider for a movie can be a film studio that produced the movie. Content provider systems can include systems for distributing content, separate from a content provider of the content. For example, a content provider system can include a system for distributing a movie that is separate from a film studio that produced the movie.

Operators of content provider systems can obtain (e.g., purchase) access rights to content from content providers in bulk and agree to minimum fees. Such minimum fees are typically agreed to regardless of actual access or usage of the content provisioned by content provider systems. For example, an operator of a content provider system can agree to a particular fee for the right to distribute specific content regardless of how many users or how many times the specific content is actually accessed by users (e.g., as part of a subscription or as pay-per-view). In some cases, operators of content provider systems can obtain access rights to content with variable fees based on usage in addition to agreed-upon minimum fees for purchasing rights to the content. Operators of content provider systems need to measure access to a specific piece of content from different sources (e.g., broadcast, VOD, OTT), each with its own fee model (pay-per-view, subscription), and must manage provisioning to different sources. This can further increase the burden for operators in managing access rights and constraints, and managing the revenue generated from distribution of the content.

There exists a need for content provider systems that can operate to offset or otherwise minimize the impact of such burdens on operators. There also exists a need for content provider systems that allow operators to monitor and manage content provisioning according to the burdens for managing access rights and constraints and managing revenues.

In some cases, operators of content provider services also face the challenge of determining appropriate fees to pay for obtaining access to content. As rights are often obtained using minimum fees and potentially with variable fees based on usage, as noted above, including provisioning across multiple sources (e.g., broadcast, VOD, OTT), there exists a need for content provider systems that offset or otherwise minimize the impact on operators of such burdens.

The content optimization techniques and systems described herein provide improved content provider systems for controlling provisioning of content. In various embodiments, a target access of content offered through a content provider system can be set. As will be discussed in greater detail below, the target access of the content can be set based on access constraints of access rights between a content provider and an operator of the content provider system, in which case the access constraints are mapped to the content. Further, actual access of the content provisioned through the content provider system can be monitored, and expected access of the content can be computed within a time frame based on the actual access of the content. As discussed further below, the expected access of the content can be computed by applying an access projection model to the measured actual access of the content. The access projection model can be maintained based on observed actual access of various content provisioned by the content provider system. Provisioning of the content through the content provider system can be managed based on the expected access of the content with respect to the target access of the content.

A usage profile can include applicable information related to provisioning of the content through a content provider system. An access model (also referred to as an access projection model) can include a model for identifying expected access to content at least in part based on actual access to the content. Expected access, as used herein, can include how much one or more users are expected to access content provisioned through a content provider system. Actual access, as used herein, can include how much one or more users actually access content provisioned through a content provider system. A content profile can include an actual profile of content displayed to one or more operators of one or more content provider systems based on actual and/or expected access of the content through the one or more content provider systems.

Figure 38:
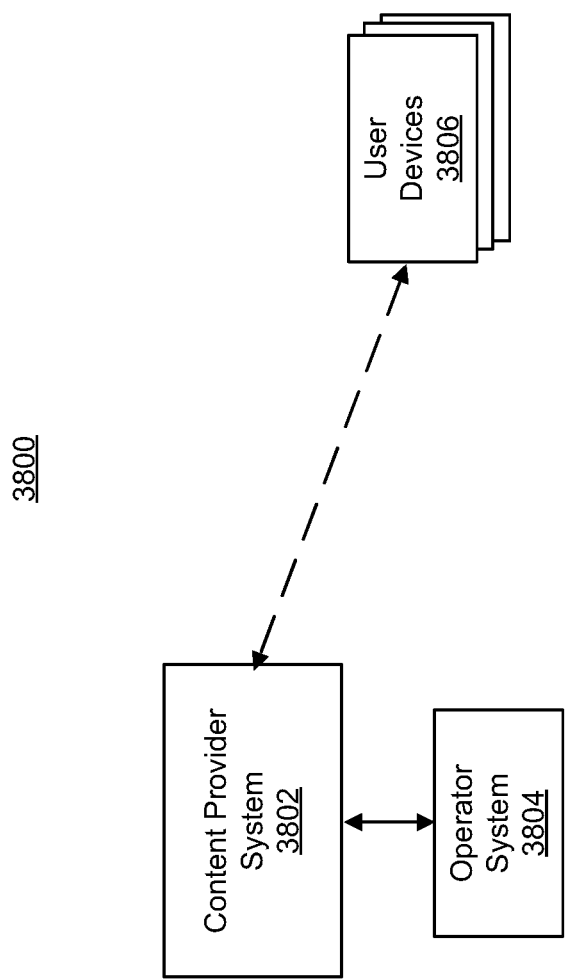
FIG. 38 illustrates an example network environment, in accordance with various embodiments of the subject technology.

FIG. 38 illustrates an example network environment 3800, in accordance with various embodiments of the subject technology. The network environment 3800 of FIG. 38 includes a content provider system 3802, an operator system 3804, and one or more user devices 3806. The content provider system 3802 can be configured to enable the user devices 3806 to stream or otherwise access content over a network (e.g., the Internet). In some examples, the content provider system 3802 can be similar to the content management system 110 of FIG. 1. In some implementations, the content provider system 3802 can be a digital media broadcasting platform that allows end users to access digital media content or services on their user devices 3806. As described above with respect to FIG. 1, an example digital media streaming or broadcast platform can be an interactive digital television platform that allows users to stream video content on their user devices 3806 over cable, satellite, internet, or other communication means. The video content can include, for example, video-on-demand (VOD) content, broadcasted content, over-the-top (OTT) content, or content from any other sources or combination of sources. However, in other embodiments the digital media broadcasting platform can include other types of content such as audio content, news content, games, etc.

The content provider system 3802 can receive content from various content providers and/or content sources. For example, the content can be retrieved over a network and preprocessed (e.g., encoded) before being received by the content provider system 3802. Subsequently, after the content is received from various content providers and/or content sources (e.g., after it is pre-processed), the content provider system 3802 can provide the content to one or more user devices (e.g., user devices 3806). Further, the content provider system 3802 can provide additional services (e.g., to the user devices 3806) through user interfaces between the content provider system 3802 and the user device 3806. These services, in some cases, can be provided by third-parties.

Users, via the user devices 3806, can navigate, select, and view the content provided by the content provider system 3802 through a user interface on the user devices 3806. The user devices 3806, however, can be of different device types (e.g., tablet, laptop computer, mobile phone, home appliance etc.) and have different characteristics (e.g., resolution, screen type, aspect ratio, memory, bandwidth, compute power, portrait or landscape screen orientation, etc.). Furthermore, the users can be of different user types (e.g., adult, under 18 years of age, visually impaired, etc.) and the user profiles associated with the users can have different user profile information (e.g., settings, preferences, viewing history, recommendations, etc.).

The content provider system 3802 can manage provisioning of content to users based on expected access of the content by users through the content provider system 3802. For example, the content provider system 3802 can manage provisioning of content to users based on expected access of the content provisioned through the content provider system 3802 in comparison to target access of the content through the content provider system 3802. Access of content provisioned through the content provider system 3802 can include a number of users who perceived the content through the content provider system 3802, a number of times one or more users perceived the content through the content provider system 3802, total amounts paid by the users to perceive the content through the content provider system 3802, returns (e.g., revenue) made by the content provider system 3802 in provisioning the content to one or more users, other factors, or any combination thereof. For example, the content provider system 3802 can identify expected returns of content provisioned through the content provider system 3802. In some cases, the content provider system 3802 can compare the expected returns of the content to target returns for the content in order to manage provisioning of the content through the content provider system 3802.

In some implementations, an operator of the content provider system 3802 can view, through the operator system 3804, statistics on provisioning of content by the content provider system 3802 to users on the user devices 3806. Specifically, an operator can view target access of content and at least one of expected access of the content and one or more quantifications of actual access of the content through a graphical user interface provided by the operator system 3804. For example, the graphical user interface of the operator system 3804 can display a graph showing expected access of content in relation to actual access of the content provisioned by the content provider system 3802 through the operator system 3804. In another example, the operator system 3804 can be used to present, to an operator, a visual representation of an expected number of users to perceive content in relation to an actual number of users who have perceived the content through the content provider system 3802.

Target access of content can include a target revenue of provisioning the content through the content provider system, a target number of users to perceive the content provisioned through the content provider system, a target number of times the content is perceived through the content provider system, one or more target amounts paid by one or more users to perceive the content through the content provider system, other factors, or any combination thereof. For example, a target access of video content offered through the content provider system can include a target number of users to view the video content. Expected access of the content can include expected revenue earned from provisioning of the content through the content provider system, an expected number of users to perceive the content through the content provider system, an expected number of times the content is perceived through the content provider system, one or more amounts paid by one or more expected users to perceive the content through the content provider system, other factors, or any combination thereof. For example, a number of users who are expected to view a movie through a video provider system can be identified as part of computing expected access of the content provisioned through the content provider system.

In some examples, an operator of the operator system 3804 can control provisioning of content by the content provider system 3802 to users on the user devices 3806 through the operator system 3804. For example, as noted above, the content provider system 3802 can present to an operator target access of content and at least one of expected access of the content and one or more quantifications of actual access of the content in a graphical user interface through the operator system 3804. The operator can then provide control input for provisioning the content to the content provider system 3802 based on the presentation of the target access of the content and at least one of the expected access of the content and one or more quantifications of the actual access of the content through the graphical user interface. In some cases, the content provider system 3802 can be similar to the operator system 125, and can include an operator console similar to that described above with respect to FIG. 1-FIG. 37.

The content provider system 3802 can provision the content according to the control input received from the operator. In one illustrative example, an operator can view a graphical display of performance of content indicating that the expected access of the content is below a target access of the content through the operator system 3804. In response to the expected access being below the target access, the operator can provide input, through the operator system 3804, for changing placement of the content in a home page of a user interface for one or more users of the content provider system 3802. The content provider system 3802 can then change placement of the content in the home page of the user interface for the one or more users based on the input received from the operator through the operator system 3804.

In some implementations, the content provider system 3802 can automatically provision the content based on the target access of the content and at least one of the expected access of the content and one or more quantifications of the actual access of the content. In one illustrative example, a content provider system may obtain an indication that the expected access of the content is below a target access of the content through the operator system 3804. The operator system 3804 can change placement of the content in a home page of a user interface for the one or more users of the content provider system 3802 in response to the indication that the expected access is below the target access. The content provider system 3802 can then change placement of the content in the home page of the user interface for the one or more users based on the indication.

The network environment of FIG. 38 is provided for illustrative purpose and can be in various other configurations and can include additional, fewer, or alternative components in different configurations. For example, in some embodiments, the content provider system 3802 and the operator system 3804 can be a part of the same system or platform. Further, in some embodiments, the content provider system 3802 and/or the operator system 3804 can be a digital content provider system as will be illustrated in further detail with respect various Figures described herein.

Figure 39:
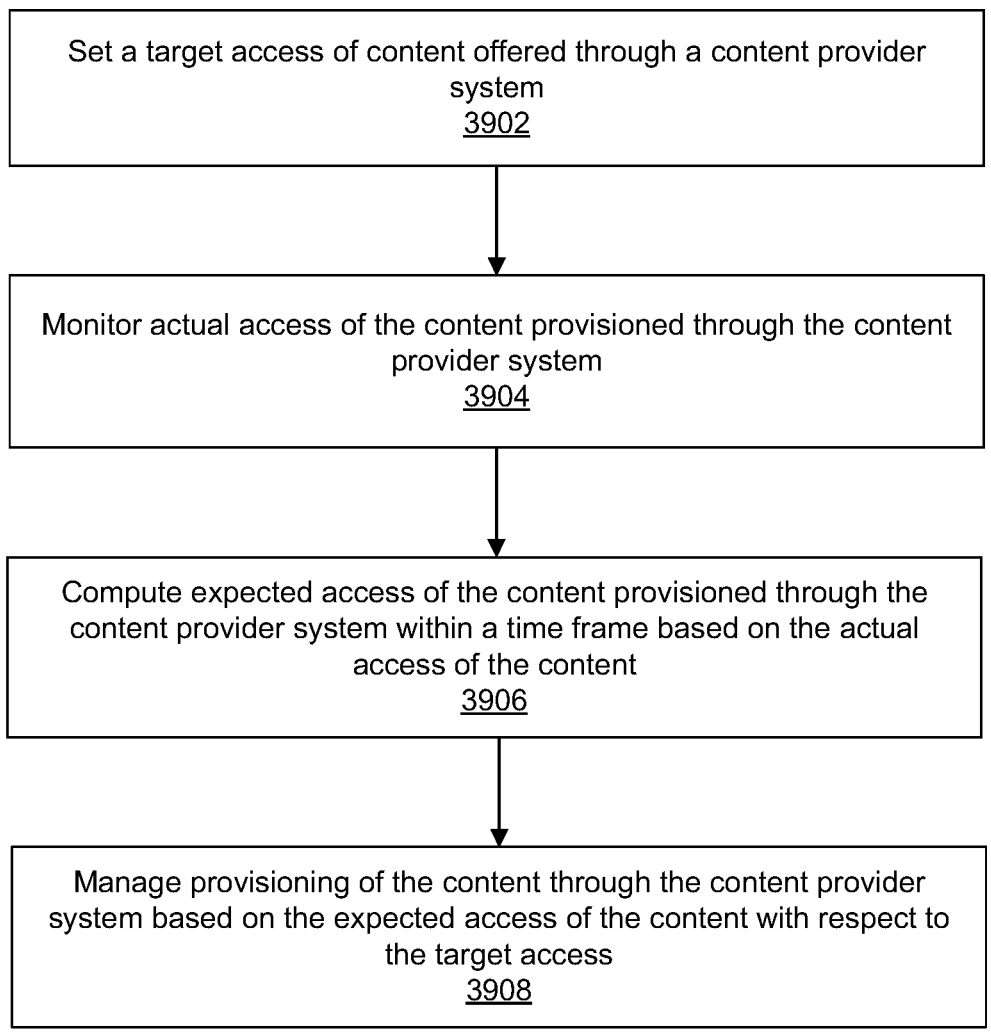
FIG. 39 illustrates an example process for managing provisioning of content through a content provider system, in accordance with various embodiments of the subject technology

FIG. 39 illustrates an example process 3900 for managing provisioning of content through a content provider system, in accordance with various embodiments of the subject technology. It should be understood that, for any process discussed herein, there can be additional, fewer, or alternative steps performed in similar or alternative orders, or in parallel, within the scope of the various embodiments unless otherwise stated.

At operation 3902, a target access of content offered through a content provider system, such as the content provider system 3802 shown in FIG. 38, is set. As described above, target access of content can include one or a combination of a target revenue of provisioning the content through the content provider system, a target number of user to perceive the content provisioned through the content provider system, a target number of times the content is perceived through the content provider system, and one or more target amounts paid by one or more users to perceive the content through the content provider system. For example, a target access of video content offered through the content provider system can include a target number of users to view the video content.

A target access of content can be set with respect to a specific amount of time. Specifically, a target access of content can be a target access level achievable through provisioning of the content through a content provider system after a set amount of time. For example, a target access of a movie can include 1,000,000 views of the movie provisioned through a content provider system. Further, a target access of content can be set with respect to a specific amount of time from a release date of the content on a content provider system. For example, a target access of an episode of a video series can include 100,000 users viewing the episode within one month after its release on a video provider system.

Further, as will be discussed in greater detail later, a target access of content offered through a content provider system can bet set based on agreed upon access rights between an operator of the content provider system and one or more providers of the content. A content provider, as used herein, is an entity or person who holds the rights to distribute the content. For example, a provider of a movie can include a film studio that produced and subsequently controls distribution of the movie. Further in the example, a target access of the movie offered through a content provider system can be set based on agreed upon access rights for the movie between the film studio and an operator of the content provider system.

At operation 3904, actual access of the content provisioned through the content provider system is monitored. Actual access of the content can include one or a combination of actual returns earned from provisioning of the content through the content provider system, an actual number of users who perceived the content through the content provider system, an actual number of times the content is accessed through the content provider system, and one or more amounts paid by one or more users to actually perceive the content through the content provider system. For example, a number of users who viewed a movie through a video provider system can be identified as part of monitoring actual access of the content provisioned through the content provider system.

Actual access of the content provisioned through the content provider system can be monitored over time. For example, the total number of times a movie was viewed through a video provider system within a six month time period can be determined as part of identifying actual access of the movie through the video provider system. Further, actual access of the content provisioned through the content provider system can be identified over a plurality of set time periods (e.g., repeatable periods of time). For example, monthly viewership of a movie offered through a video provider system can be monitored over time as part of identifying actual access of the movie through the video provider system over time.

One or more usage profiles of the content can be maintained based, at least in part, on measured actual usage, or access, of the content through the content provider system. A usage profile can be maintained for each of a plurality of content separate from an access projection model maintained based on usage of the content. Further, as discussed previously, a usage profile of content, as used herein, can include applicable information related to provisioning of the content through a content provider system. For example, a usage profile of content provisioned through a content provider system can include one or a combination of a target usage for the content through the content provider system, actual usage of the content through the content provider system, expected access of the content through the content provider system, a distributor of the content, a content type of the content, and characteristics of actual provisioning of the content through the content provider system. For example, a usage profile of a movie can include a pay-per view price for accessing the movie through a video provider system. In another example, a usage profile of a series can include the types of devices that were used to access the series through a video provider system.

Usage profiles of content can include metadata associated with the content. Specifically, usage profiles of content can include metadata associated with provisioning the content through a content provider system. Metadata associated with provisioning content through a content provider system can include data describing the content or other applicable data used to provision the content through the content provider system. For example, metadata associated with provisioning content can include a description of the content that is presented to a user through a user interface (e.g., for purposes of driving the user to access the content through a content provider system). In another example, metadata associated with provisioning content can include keywords associated with the content that can be used by a user to discover the content in a content provider system. In yet another example, metadata associated with provisioning content can include keywords used to present offers of the content to users through a content providing system. In turn, the content provider system 3802 can use metadata associated with content (e.g., as included as part of a usage profile of the content, to present the content to users). For example, a user can input a keyword in a search of the content provider system 3802, and the content provider system 3802 can present content based on an association of the content with the keyword, as indicated by metadata of the content.

Content can be grouped into one or more usage profiles based on applicable information related to the content itself. Specifically, content can be grouped into one or more usage profiles based on one or a combination of content type of the content, a distributor and/or producer of the content, and persons in or involved with production of the content. For example, movies produced by the same studio can be grouped into the same usage profile. In another example, video productions that include the same actor or actress can be grouped into the same usage profile.

Returning back to the example process 3900 shown in FIG. 39, at operation 3906, expected access of the content provisioned through the content provider system within a time frame is computed. Specifically, expected access of the content can be identified through a usage profile of the content. For example, actual usage of the content, as indicated by a usage profile for the content, can be analyzed to determine an expected access of the content.

As described above, expected access of the content can include one or a combination of expected revenue earned from provisioning of the content through the content provider system, an expected number of users to perceive the content through the content provider system, an expected number of times the content is perceived through the content provider system, and one or more amounts paid by one or more expected users to perceive the content through the content provider system. For example, a number of users who are expected to view a movie through a video provider system can be identified as part of computing expected access of the content provisioned through the content provider system.

Expected access of the content provisioned through the content provider system can be computed over time. For example, an expected total number of times a movie will be viewed through a video provider system within a six month time period can be determined as part of identifying expected access of the movie through the video provider system. Further, expected access of the content provisioned through the content provider system can be identified over a plurality of set time periods (e.g., repeatable periods of time). For example, expected monthly viewership of a series offered through a video provider system can be projected over time as part of identifying expected access of the series through the video provider system over time. Further, expected access of content can be set with respect to a specific amount of time from a release date of the content on a content provider system. For example, expected access of an episode of a video series can include an expected 100,000 users viewing the episode within one month after its release on a video provider system.

Further, expected access of the content can be computed based on the actual access of the content provisioned through the content provider system. For example, if 10,000 users viewed an episode of a series in a first month of its release on a video provider system, then an expected access of the episode can be 60,000 viewers in six months of the episode being released. Further, and as will be discussed in greater detail later, expected access of the content can be computed based on an access model applied to the content on the content provider system. Specifically, one or more access models can be applied to the actual accesses of the content to determine expected access of the content. For example, if an access model is maintained based on the content receiving 100,000 views in a first month, then the access model can predict an expected access of 600,000 views for the content over four months using the actual access of the content of 100,000 views in the first month. Further access models can be applied to usage profiles of the content to identify expected access of the content.

At operation 3908, provisioning of the content through the content provider system is managed based on the expected access of the content with respect to the target access of the content. In managing provisioning of the content based on the expected access with respect to the target access, presentation of the content within a graphical user interface accessible by users of the content provider system can be modified. Specifically, the content can either be promoted or demoted based on the expected access of the content with respect to the target access of the content. For example, if a television show has or is expected to have less access than a set target access, then advertisements for the television show can be moved to a home page presented to users of a video provider system. Alternatively, if a movie has or is expected to have greater access than a set target access, then advertisements for the movie can be moved off of a home page presented to users of a video provider system. This is advantageous, as it can help operators of content provider systems to maximize content access of content with respect to obtained access rights for the operators. Specifically, operators can ensure that their goals, set forth by the burdens to obtain the access rights to the content, are met.

Further, in managing provisioning of the content based on the expected access with respect to the target access, metadata of the content can be managed based on the expected access with respect to the target access. Specifically, either or both a summary and keywords associated with the content can be kept the same or modified based on the expected access with respect to the target access. For example, if a television show is expected to have less access than a set target access, then a summary of the television show that is presented to users in a home page of the video provider system can be modified to potentially attract more users to the television show. In another example, if a movie is expected to have greater access than a set target access, then keywords utilized by users to find the movie through video provider system can be kept the same. In yet another example, if a movie is expected to have less access than a set target access, then metadata for the movie can be modified in order to target different user groups utilizing a video provider system.

Additionally, in managing provisioning of the content based on the expected access with respect to the target access, a price to access the content through the content provider system can either be kept the same or modified. Specifically, either or both a pay-per-view price or a subscription price to access the content through the content provider system can either be kept the same or modified based on expected access of the content respect to the target access of the content. For example, if a television show has or is expected to have less access than a set target access, then a subscription price to access the television show through a video provider system can be modified to potentially attract more users to the television show. In another example, if a movie has or is expected to have greater access than a set target access, then a pay-per-view price to access the movie through a video provider system can be kept the same.

In managing provisioning of the content based on the expected access with respect to the target access, the effectiveness of actions taken in managing provisioning of the content can be identified. Specifically, the actual access of the content can be measured again and a new expected access of the content be computed based on the newly measured actual access of the content. The new expected access of the content can then be compared to the previously set target access to determine the effectiveness of actions taken in managing provisioning of the content. For example, if a description of a movie is changed, then a new expected access for the movie can be identified as a result of changing the description of the movie to determine whether this change is actually increasing access of the movie through a video provider system. This process of identifying the effectiveness of actions taken in managing provision of the content can continue over a period of time to help ensure that the content meets its target access through the content provider system. As will be discussed in greater detail later, an indication of the effectiveness of actions taken in managing provisioning of the content (e.g., an indicator of measured actual access and/or determined expected access) can be visually presented to an operator. The operator can then manually control provisioning of the content based on the effectiveness of actions taken in managing provisioning of the content through the content provider system. In addition, the access projection model can be updated to indicate effectiveness for similar content.

In managing provisioning of the content based on expected access of the content with respect to the target access, the content provider system can automatically manage provisioning of the content based on the expected access of the content. Specifically, the content provider system can automatically manage provisioning of the content absent operator instruction based on the expected access of the content. For example, the content provider system can change metadata of content automatically in response to an expected access of the content being below a target access of the content.

Figure 40:
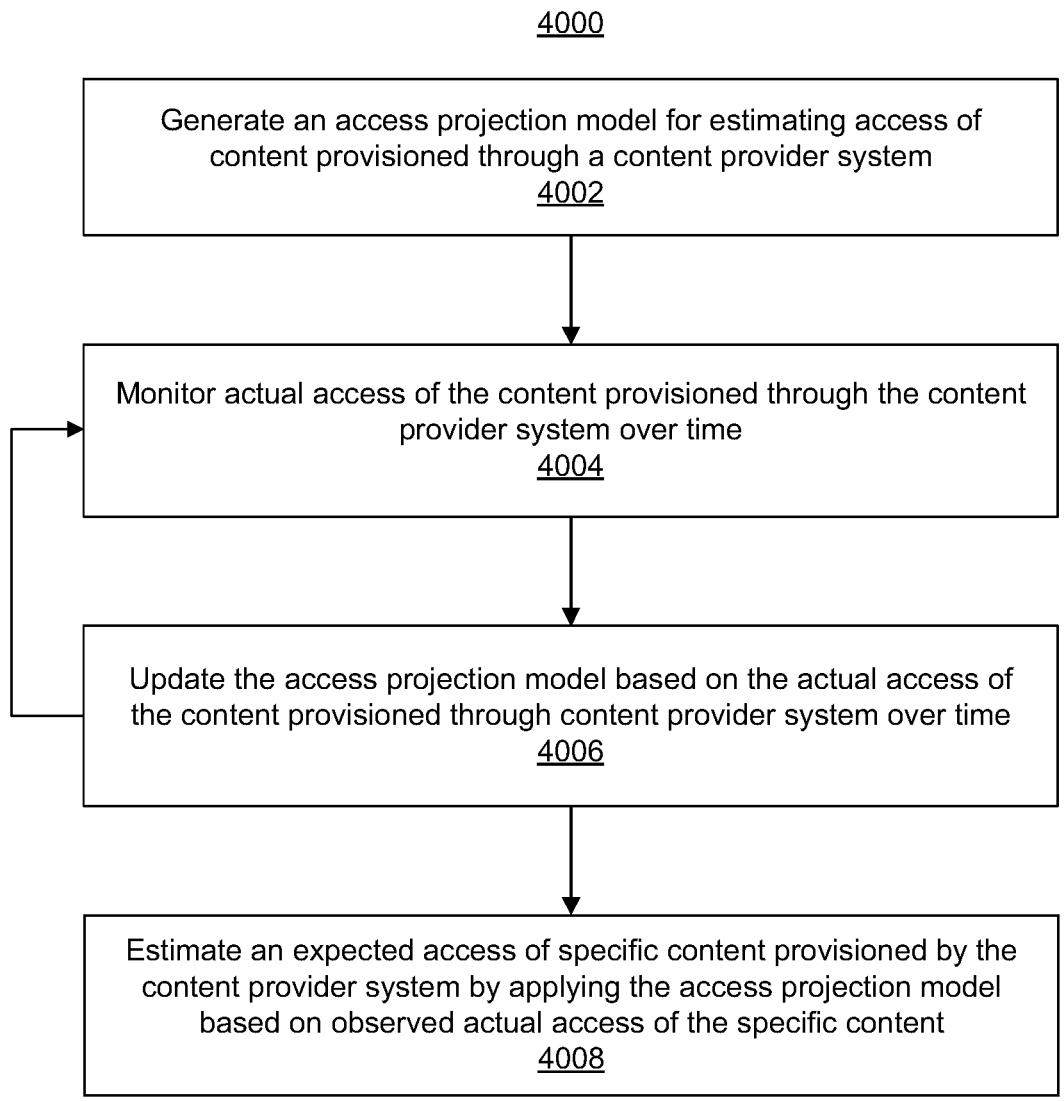
FIG. 40 illustrates an example process for estimating expected access of content through a content provider system using an access projection model, in accordance with various embodiments of the subject technology.

FIG. 40 illustrates an example process 4000 for estimating access of content through a content provider system using an access projection model, in accordance with various embodiments of the subject technology. An access projection model can be maintained according to the operations described with respect to the example process 4000 shown in FIG. 40. In maintaining an access projection model according to the operations described with respect to the example process 4000 shown in FIG. 40, the access projection model can be generated and/or updated over time.

At operation 4002, an access projection model for estimating access of content provisioned through a content provider system is generated. The access projection model can be generated based on observed actual access of the content offered through the content provider system. Specifically, the access projection model can be generated based on observed actual access of the content provisioned over time through the content provider system. For example, if viewership increased for a television series over three months, then an access projection model can be created by modeling the increased viewership over the three months. Further in the example, the access projection model can be used to predict access of the same or a different television series over a three month time period. Additionally, the access projection model can be used to predict access of the same or a different television series over a time period that is less than or greater than a three month time period.

The access projection model for estimating access of content provisioned through a content provider system can be generated using one or more applicable modeling techniques. Specifically, one or more applicable machine learning techniques can be applied to actual access of the content provisioned through the content provider system to recognize patterns in the actual access of the content. Subsequently, the recognized patterns can be used to create the access projection model for forecasting access of the content or different content provisioned through the content provider system. Specifically, the recognized patterns can be used to create the access projection model for forecasting access of the content or different content provisioned through the content provider system based on observed access of the content or the different content through the content provider system.

Access projection models can be associated with characteristics of the content itself used to create the access projection models. Characteristics of content associated with access projection models can include applicable information related to the content itself, such as a content type of the content, a distributor/producer of the content, and persons in or involved with production of the content. Further, access projection models can be applied to forecast access for specific content based on characteristics of the specific content and characteristics of the content used to create the access projection models or otherwise associated with the access projection models. For example, if a movie produced by a specific studio is used to create an access projection model, then the access projection model can be associated with movies produced by the studio. Subsequently, the access projection model can be applied to estimate access for movies produced by the studio or similar studios. Further, content used to create access projection models can be grouped together and used to create a specific access projection model based on characteristics of the content itself. For example, comedy television series produced by a studio can be grouped together to create an access projection model for comedy television series produced by the studio. Subsequently, the access projection model can be used to estimate access for comedy television series that are produced by the studio or related studios. At operation 4004, actual access of the content provisioned through the content provider system is monitored over time. Specifically, the actual access of the content used to create the access projection model can be monitored over time. For example, a total number of users who accessed the content in both a first month and a second month can be identified.

Next, at operation 4006, the access projection model is updated based on the actual access of the content provisioned through the content provider system over time. Specifically, the actual access of the content used to create the access projection model can be utilized to update the access projection model. Applicable modeling techniques, such as applicable machine learning techniques, can be used to update the access projection model based on observed actual access of the content used to create the access projection model. Specifically, patterns in actual access of the content can be recognized and used to update the access projection model. For example, if a movie used to generate the access projection model begins to experience a decline in viewership over a two month period after the access projection model is created, then the access projection model can be updated to reflect the decline in viewership over the two month period.

The process of monitoring actual access of the content and updating the access projection model based on the actual access of the content at operations 4004 and 4006 can be repeated an applicable number of times as part of maintaining the access projection model. This process can be carried out for a set amount of time. For example, this process can be carried out over a three month period of time to further refine the access projection model. Alternatively, this process can be carried out over the entire time the content is offered through the content provider system.

At operation 4008, an expected access of specific content provisioned by the content provider system is estimated by applying the access projection model based on observed actual access of the specific content. The specific content provisioned by the content provider system can be the content that is used to create the access projection model. For example, if actual access of a movie is used to create the access projection model, then the access projection model can be applied to estimate expected access of the movie through the content provider system. Alternatively, the specific content provisioned by the content provider system can be content that is different from the content used to create the access projection model. For example, access of a television series can be used to create the access projection model and the access projection model can be applied to a different television session to estimate expected access for the different television series. In the case where the specific content is different from the content used to create the access projection model, the access projection model can be selected and applied for the specific content based on characteristics of the specific content and characteristics of the content used to create the access projection model.

Figure 41:
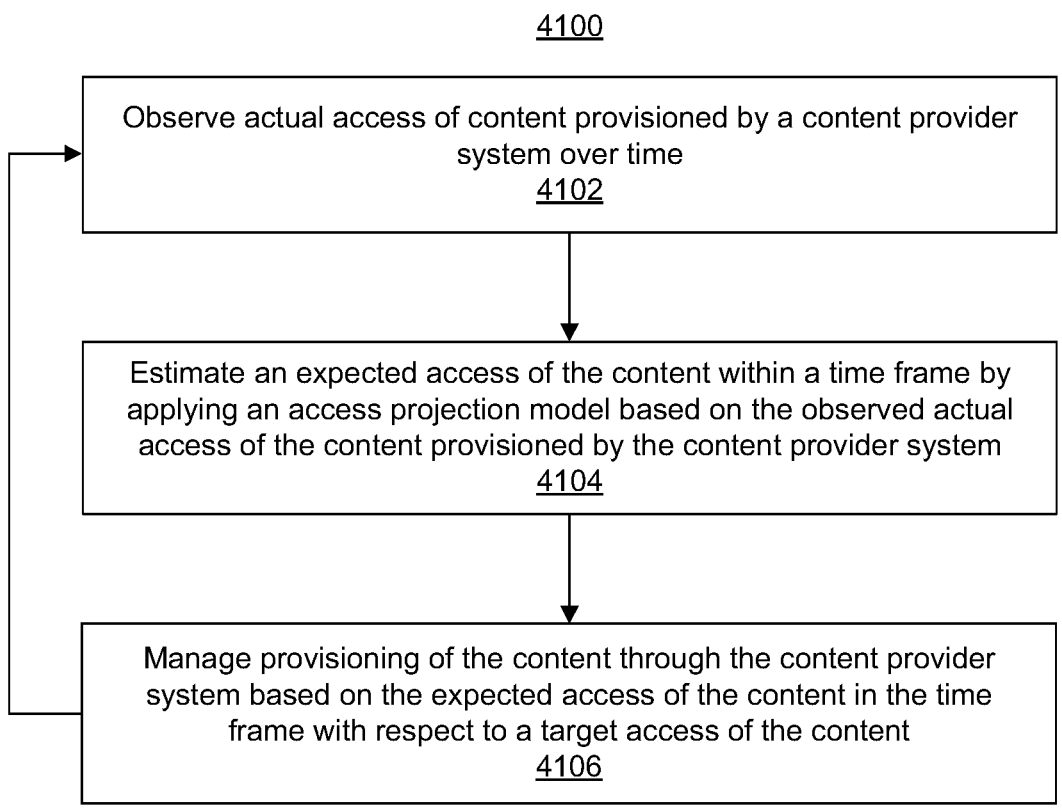
FIG. 41 illustrates an example process for managing provisioning of content through a content provider system over time based on estimated access of the content, in accordance with various embodiments of the subject technology.

FIG. 41 illustrates an example process 4100 for managing provisioning of content through a content provider system over time based on estimated access of the content, in accordance with various embodiments of the subject technology.

At operation 4102, actual access of content provisioned by a content provider system is observed over time. For example, during a first a month a total number of viewers who viewed a movie provisioned through a video provider system can be observed. Further in the example, during a second month a total number of viewers who viewed the movie provisioned the video provider system can be observed.

At operation 4104, an expected access of the content within a time frame is estimated based on the observed actual access of the content provisioned by the content provider system. Specifically, the expected access of the content can be identified by applying an access projection model based on the observed actual access of the content provisioned by the content provider system. For example, if 100,000 viewers watched a movie provisioned through a video provider system in a month, then an access projection model can be applied to estimate that 150,000 viewers will watch the movie through the video provider system over the next two months.

At operation 4106, provisioning of the content through the content provider system is managed based on the expected access of the content in the time frame with respect to a target access of the content. Specifically, if the expected access of the content is less than the target access of the content, then the manners in which the content is provisioned through the content provider system can be changed. Alternatively, if the expected access of the content is greater than or equal to the target access of the content, then the manners in which the content is provisioned through the provider system can remain unchanged.

After operation 4106, the process 4100 returns back to operation 4102, where the actual access of the content is observed again based on how the provisioning of the content is managed at operation 4106. For example, if a description of the content is modified to target a different user group, then a total number of users who perceived the content after the description was modified can be observed. Subsequently, a new expected access of the content can be estimated at operation 4104. As follows, the provisioning of the content can then be changed or kept the same based on the new expected access of the content. This process can continue to repeat itself for a set amount of time or through the entire amount of time the content is offered through the content provider system. For example, this process can continue for the entire time an operator of the content provider system has access rights to the content.

Figure 42:
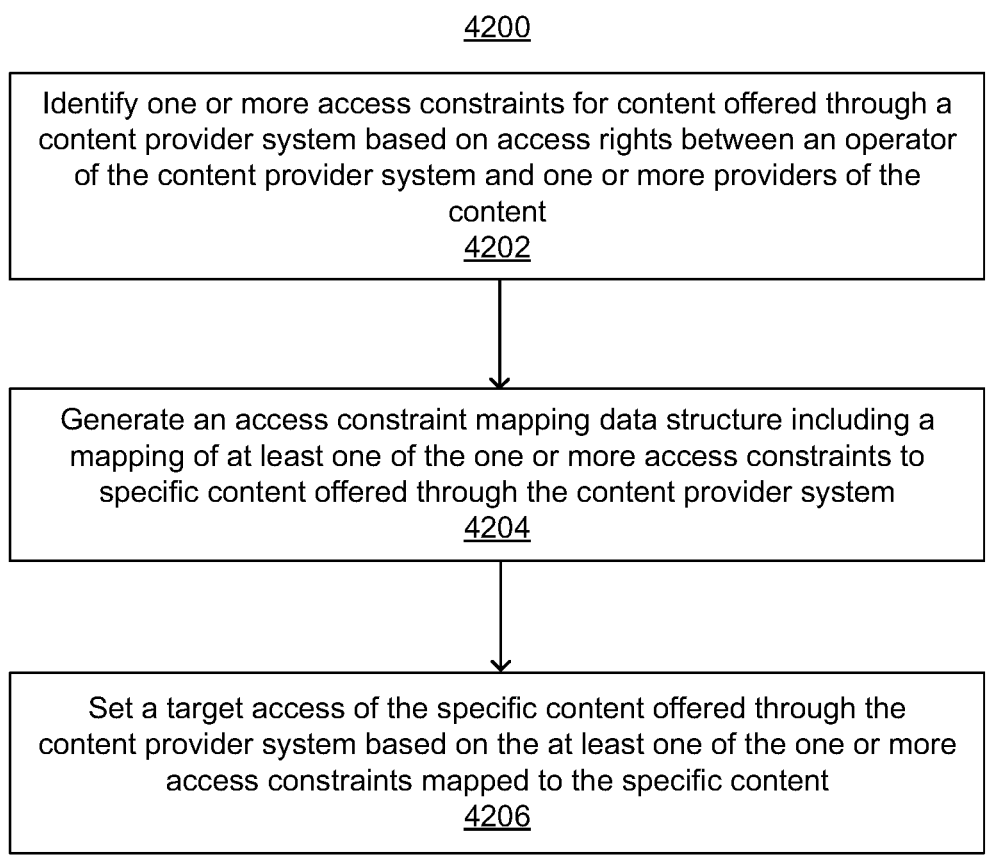
FIG. 42 illustrates an example process for setting a target access of content provisioned through a content provider system based on access rights, in accordance with various embodiments of the subject technology.

FIG. 42 illustrates an example process 4200 for setting a target access of content provisioned through a content provider system based on access rights, in accordance with various embodiments of the subject technology.

At operation 4202, one or more access constraints for content offered through a content provider system are identified based on access rights between an operator of the content provider system and one or more providers of the content. Access constraints can include applicable limitations of an operator of the content provider system in provisioning the content through the content provider system. For example, access constraints can include a fee paid by an operator of the content provider system to a producer of the content for the right to provision the content through the content provider system. In another example, access constraints can include an amount of time that an operator of the content provider system can provision the content through the content provider system. Access rights between an operator of the content provider system and one or more providers of the content can be agreed upon (e.g., contractually agreed upon) between the operation of the content provider system and the one or more providers of the content. For example, an operator of the content provider system can contractually agree to distribution rights for a movie with a studio that produced the movie.

The access rights between the operator and the one or more providers of the content can be agreed upon based on the methods for managing content reproduction, as described herein. Specifically, an operator can use a projection model for content or other content to agree to access rights to the content. For example, an operator can use a projection model for content or other content to determine a minimum fee or an appropriate fee for distributing the content provided by a content provider. Subsequently, the operator can obtain access rights based on the identified minimum fee or appropriate fee. Further as the model is updated based on performance of the content, one or more operators can better determine minimum or appropriate fees for distributing the content.

At operation 4204, an access constraint mapping data structure, including a mapping of at least one of the one or more access constrains to specific content, is generated for the specific content. Specifically, one or more access constraints of the access constraints generated from the access rights that are applicable to the specific content can be identified. Subsequently, a mapping of the one or more access constraints applicable to the specific content can be mapped to the content through creation of an access constraint mapping data structure for the content. The specific content can be a subset of the total content that the one or more access constraints are identified for at operation 4202. For example, the specific content can be a television show of a plurality of television shows and movies that the access constraints are identified for at operation 4202 (e.g., based on access rights between an operator of the content provider system and a studio that produced the shows and movies).

A constraint mapping data structure is useful when access rights or aspects of access rights agreed on between an operator of the content provider system and a provider of the content are inapplicable to the content. For example, an operator of the content provider system can agree to pay different fees for distribution rights to movies and television series produced by a studio. Subsequently, if the operator is only concerned with provisioning the movies produced by the studio, then only fees paid for the rights to the movies can be mapped to the movies instead of all fees paid to the studio.

Further, a constraint mapping data structure is useful when access rights of different providers of the content are applicable to provisioning the content through the content provider system. For example, an operator of the content provider system can agree to pay different fees to different studios for distribution rights to a television series produced by the studios. Subsequently, the different fees can be mapped to the television series to identify a total amount of fees owed by an operator of a video provider system to provision the television series through the video provider system.

A constraint mapping data structure can be updated overtime as access rights of an operator of a content provider system with a content provider change over time. For example, if an operator agrees to modify a contract with a content provider, then a constraint mapping data structure can be change to reflect the modifications to the contract.

At operation 4206, a target access of the specific content offered through the content provider system is set based on one or more access constraints mapped to the specific content. Specifically, a target access of the specific content can be set based on one or more access constraints that are mapped to the specific content and not access constraints that are unrelated (e.g., not mapped) to the specific content. In setting a target access of the specific content based on one or more access constraints mapped to the specific content, a per-user cost to access the specific content through the content provider system can be set. Further, in setting a target access of the specific content based on one or more access constrains mapped to the specific content, target returns of the specific content provisioned through the content provider system can be set.

Figure 43:
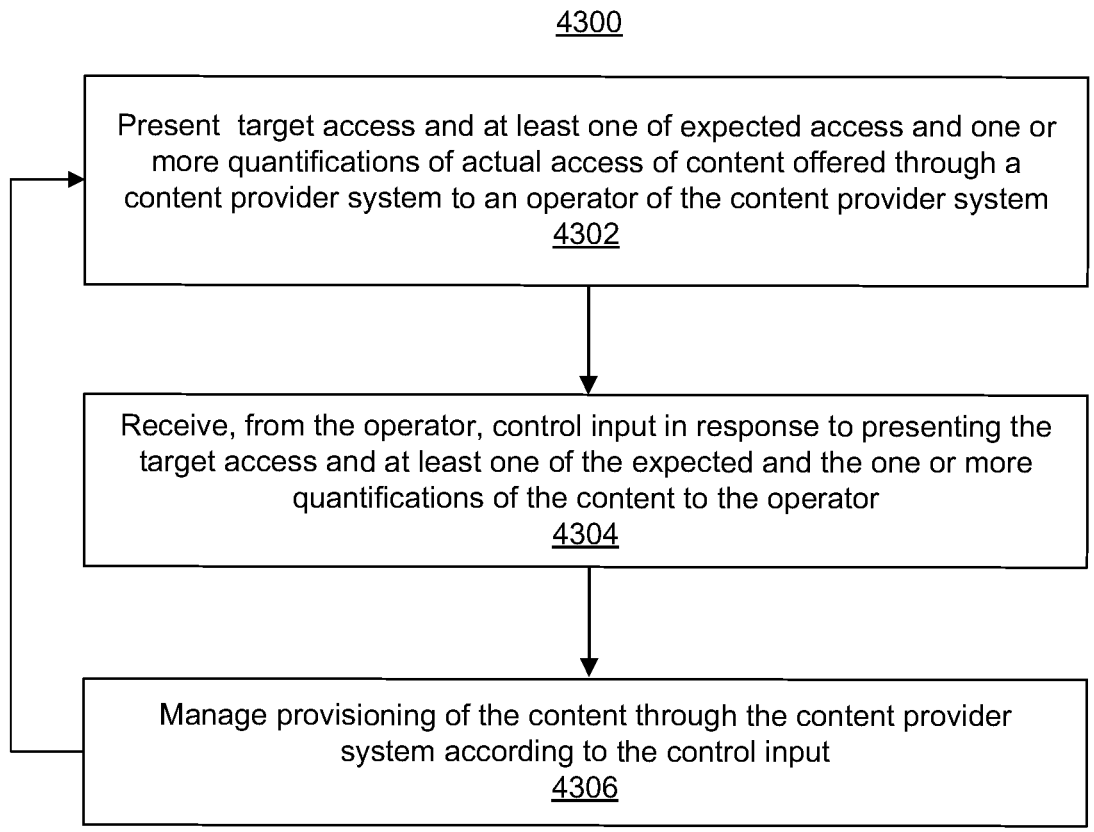
FIG. 43 illustrates an example process for managing provisioning of content through a content provider system based on control input received from an operator of the content provider system, in accordance with various embodiments of the subject technology.

FIG. 43 illustrates an example process 4300 for managing provisioning of content through a content provider system based on control input received from an operator of the content provider system, in accordance with various embodiments of the subject technology. The overall process 4300 can be repeated multiple times in order to control provisioning of content through a content provider system for all or a portion of the amount time content is offered through the content provider system.

At operation 4302, target access of content provisioned through a content provider system is presented to an operator of the content provider system. Further, at operation 4302, at least one of expected access of the content and one or more qualifications of actual access of the content offered through the content provider system is presented to the operator of the content provider system. For example, a target viewership and an actual viewership of a television show provisioned through a video provider system can be presented to an operator of the video provider system. The target access, the expected access, and/or qualifications of actual access of the content can be presented to an operator of the content provider system for a plurality of different time periods. For example, target access and actual access of a movie can be presented in a month-by-month representation to an operator of a video provider system.

At operation 4304, control input is received from the operator in response to presenting the target access and at least one of the expected access and the one or more qualifications of the content to the operator. Control input received from the operator at operation 4304 can include instructions for controlling provisioning of the content through the content provider system. For example, an operator can be notified that viewership on a television show provisioned through a video provider system is not meeting a target viewership level for the television show. Subsequently, the operator can provide control input to change how the television show is provisioned through the video provider system. Instructions for controlling provisioning of the content through the content provider system can include instructions for controlling applicable aspects of provisioning content through a content provider system. For example, instructions for controlling provisioning of the content through the content provider system can specify a new narrative to use in advertising the content through the content provider system.

At operation 4306, provisioning of the content through the content provider system is managed according to the control input. Specifically, manners in which the content is provisioned through the content provider system can either be changed or kept the same according to the control input. For example, keywords associated with the content that are utilized to retrieve the content during content searches through the content provider system can be modified according to the received control input.

Figure 44:
FIG. 44 illustrates a screenshot of an example graphical user interface for managing provisioning of content through a content provider system.

FIG. 44 shows a screenshot 4400 of an example graphical user interface for managing provisioning of content through a content provider system. Specifically, an operator of the content provider system can view access statistics for content of different content providers that is provisioned through the content provider system. Each content provider includes an aggregated usage profile 4402. The aggregated usage profile 4402 for each content provider shows a total number of different content for each content provider that is offered through the content provider system. For example, Studio I has 15 content items available through the content provider system.

Each aggregated usage profile 4402 also shows an indication 4404 of actual access of all content for a content provider. Further, each aggregated usage profile 4402 includes an indication 4406 of an expected access of all content for a content provider at a given time. Both the actual access and the expected access of the different content items can be aggregated on a per-content provider basis to identify both expected access of all content for a content provider and actual access of all content for a content provider. The indication 4404 of the actual access is presented in relation to the indication of 4406 of the expected access for the content provider. In turn, this can allow an operator to quickly determine whether changes should be made to provisioning of content (e.g., based on whether content is accessed as expected).

FIG. 45 shows another screenshot 4500 of an example graphical user interface for managing provisioning of content through a content provider system. Specifically, an operator of the content provider system can view access statistics for different content that is provisioned through the content provider system. More specifically, information in a usage profile of content can be displayed in a content profile 4502 for each content item. The content profiles can be selectively displayed in the graphical user interface. Specifically, content profiles of content items can be selectively displayed based on filters including content type of the content, product types used to access the content (e.g., whether it is offered through pay-per-view or a subscription), and a content provider who produced and/or distributed the content to the content provider system.

The content profile 4502 for the content item can include a visual representation or advertisement of the content item. For example, if the content item is a movie, then the content profile 4502 can include a visual representation of a movie poster for the movie. The content profile 4502 can also include the title of the content and the name of the content provider who produced or distributed the content. Further, each content profile includes an indication of expected access of the content, actual access of the content in relation to a target access of the content. For example, the content profile 4502 for content A shows that the actual access of content A is 56% of its target access. In another example, the content profile for content E shows that the actual access of content E is below the expected access and is 61% of its target access over time. Further, the content profile 4502 can display the number of times the content has been perceived through the content provider system, the returns the content has generated, the returns the content is expected to generate, the different between the generated returns and the expected returns. Additionally, the content profile 4502 can display the prices for user access to the content. For example, the content profile 4502 for content A shows that the entire of the season of the content can be accessed for $19.99 while a single episode of the content can be access for $1.99.

Figure 46:
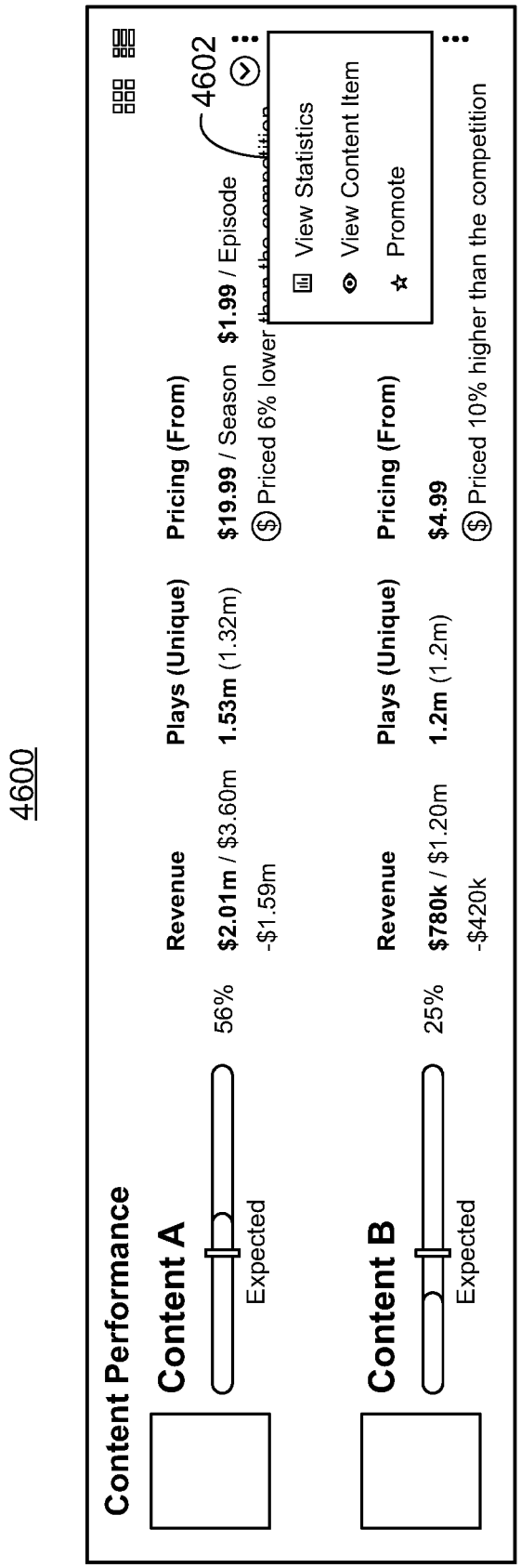
FIG. 46 illustrates another screenshot of an example graphical user interface for managing provisioning of content through a content provider system.

The content profiles can be sorted in display through the graphical user interface according to preferences of an operator of the content provider system. Specifically, the content profiles can be displayed in descending order of value (e.g., access value) to the operator. For example, the content profiles can be displayed in descending order based on the amount of returns generated by corresponding content of the content profiles. In this way, relevant information of the access rights and constraints, actual usage, computed target and expected usage are available in one place, allowing an operator to quickly determine whether changes should be made to provisioning of content FIG. 46 shows another screenshot 4600 of an example graphical user interface for managing provisioning of content through a content provider system. Specifically, an operator of the content provider system can manage provisioning of a specific content item through a content provider system using the graphical user interface. More specifically a content profile of a content item includes a drop down menu 4602. The drop down menu 4602 includes a link that can be activated to view more detailed access statics of a content item, as will be shown in greater detail later. Further, the drop down menu 4602 includes an icon that can be activated to actually perceive the content item (e.g., view the content item).

Additionally, the drop down menu 4602 includes an icon that can be activated to promote the content item. Specifically, an operator can active the promote icon if the operator wants to change the manner in which the content item is promoted in the content provider system. Subsequently, the manner in which the content item is promoted/advertised in the content provider system can be changed in response to activation of the promote icon. For example, an advertisement of the content item can be placed in a home page of users in the content provider system in response to an operator activating the promote icon.

Figure 47:
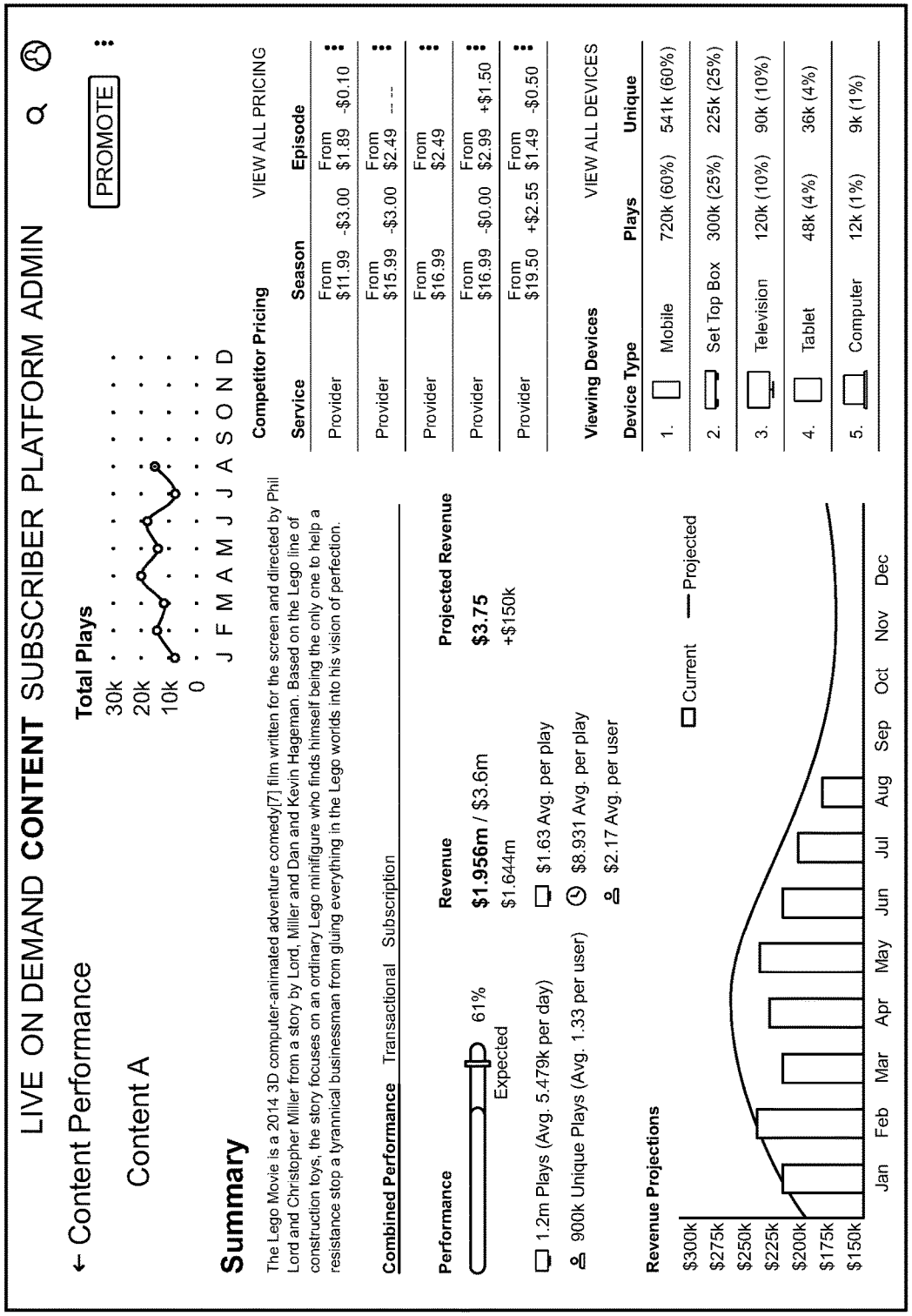
FIG. 47 illustrates another screenshot of an example graphical user interface for managing provisioning of content through a content provider system.

FIG. 47 shows another screenshot 4700 of an example graphical user interface for managing provisioning of content through a content provider system. Specifically, an operator of the content provider system can manage provisioning of a specific content item through a content provider system using the graphical user interface. More specifically an operator of the content provider system can view detailed access statistics of a content item for purposes of managing provisioning of the content item through the content provider system.

The detailed access statistics of the content item can include a summary of the content item. Further, the detailed access statistics of the content item can include the previously described expected access and actual access of the content item. Specifically, the detailed access statistics can also include the expected access and actual access of the content item in relation to a target access.

Additionally, the detailed access statistics can include expected access projections of the content item over different time periods. Specifically, the detailed access statistics can include expected access projections of the content item over different months. For the example content item represented in FIG. 47, the detailed access statistics show that the expected access peaks in February, drops down, then increases back up again in May, and then begins to decrease again.

The detailed access statistics can also include access statistics of the content item on a day granularity level. For example, the detailed access statistics can include the average number of plays of the content item per day and the average returns generated by the content item per day. Additionally, the detailed access statistics can also include the number of plays and unique plays of the content item per device type used to access the content item. For the example content item represented in FIG. 47, the detailed access statistics show that the content item was viewed 720,000 ties with 547,000 unique views on mobile devices.

Figure 48:
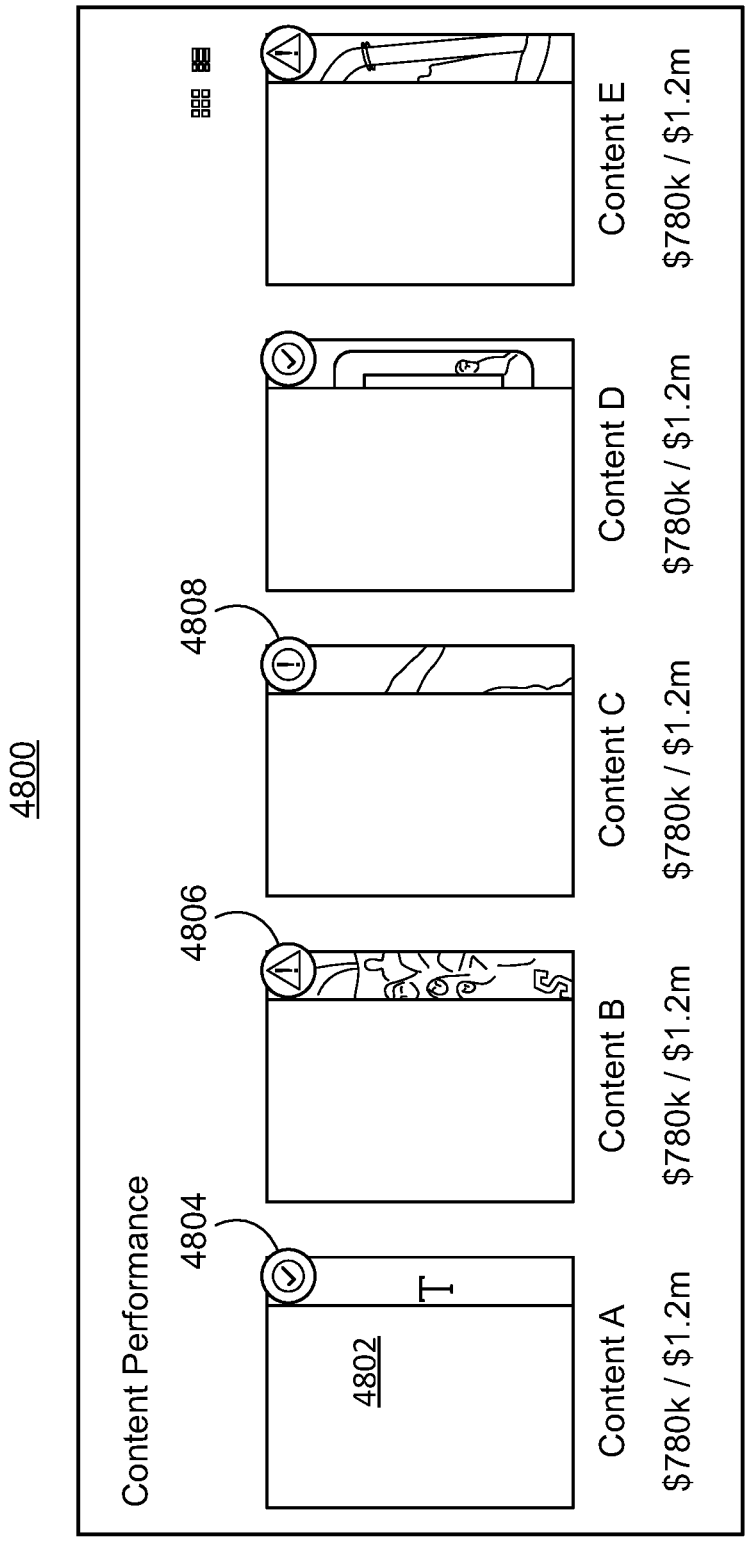
FIG. 48 illustrates another screenshot of an example graphical user interface for managing provisioning of content through a content provider system.

Further, the detailed access statistics can include pricing of competitors offering access to the content item. Specifically, the detailed access statistics can include price differences between competitors offering access to the content item in relation to the content provider system. For the example content item represented in FIG. 47, the detailed access statistics show that the content item is offered at a cheaper price per episode and cheaper price per season by another provider. Further in the example, the detailed access statistics show that the content item is offered at a cheaper price per season by another provider and at a cheaper price per episode by another provider. Relevant information of the access rights and constraints, actual usage, computed target and expected usage by different providers are available in one place, allowing an operator to quickly determine whether changes should be made to provisioning of content FIG. 48 shows another screenshot 4800 of an example graphical user interface for managing provisioning of content through a content provider system. Specifically, an operator of the content provider system can manage provisioning of multiple content items through a content provider system using the graphical user interface. The graphical user interface includes usage profiles of content items. Each usage profile can include a visual representation of the content item and access statistics of the content item. Further each usage profile can include an alert icon 4804, 4806, and 4808. Each alert icon can correspond to a varying warning level for the content items based on actual access of the content items compared to target access of the content items with respect to expected access items of the content items. For example, content A can be on pace to meet its target access and therefore have a checkbox alert icon 4804. Content B, however can be off pace to meet its target access but still within a possible range of achieving its target access, and therefore have a yellow exclamation point alert icon 4808. Content C can be off pace to meet its target access and out of a possible range of achieving its target access, and therefore have a red exclamation point alert icon 4806. The alert icons 4804, 4806, and 4808 can allow an operator to quickly understand progress of content items in meeting target access levels and subsequently control provisioning of the content items through a content provider system.

Figure 62:
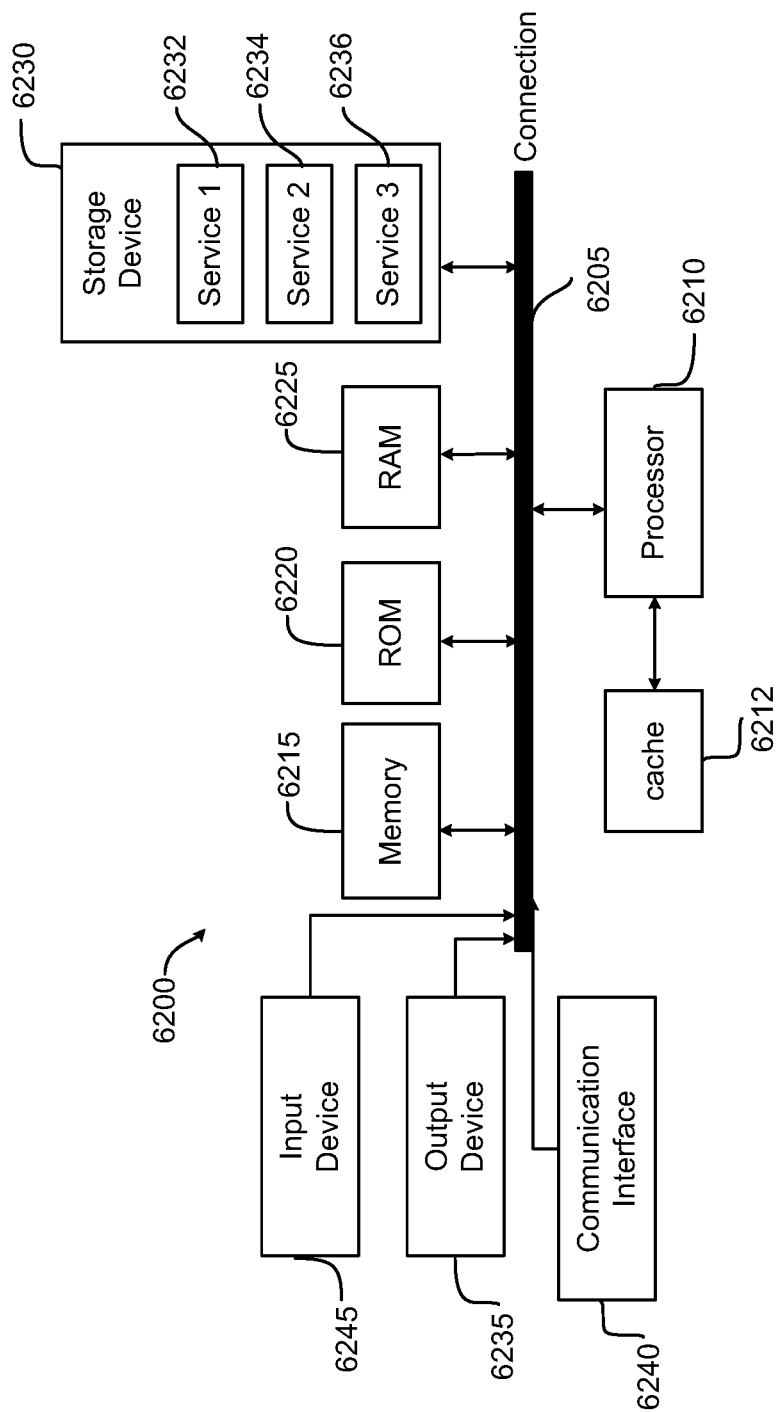
FIG. 62 illustrates a computing system architecture, in accordance with various embodiments of the subject technology.

FIG. 62 illustrates a computing system architecture 6200 wherein the components of the system are in electrical communication with each other using a connection 6205, such as a bus. Exemplary system 6200 includes a processing unit (CPU or processor) 6210 and a system connection 6205 that couples various system components including the system memory 6215, such as read only memory (ROM) 6220 and random access memory (RAM) 6225, to the processor 6210. The system 6200 can include a cache of high-speed memory connected directly with, in close proximity to, or integrated as part of the processor 6210. The system 6200 can copy data from the memory 6215 and/or the storage device 6230 to the cache 6212 for quick access by the processor 6210. In this way, the cache can provide a performance boost that avoids processor 6210 delays while waiting for data. These and other modules can control or be configured to control the processor 6210 to perform various actions. Other system memory 6215 may be available for use as well. The memory 6215 can include multiple different types of memory with different performance characteristics. The processor 6210 can include any general purpose processor and a hardware or software service, such as service 1 6232, service 2 6234, and service 3 6236 stored in storage device 6230, configured to control the processor 6210 as well as a special-purpose processor where software instructions are incorporated into the actual processor design. The processor 6210 may be a completely self-contained computing system, containing multiple cores or processors, a bus, memory controller, cache, etc. A multi-core processor may be symmetric or asymmetric.

To enable user interaction with the computing device 6200, an input device 6245 can represent any number of input mechanisms, such as a microphone for speech, a touch-sensitive screen for gesture or graphical input, keyboard, mouse, motion input, speech and so forth. An output device 6235 can also be one or more of a number of output mechanisms known to those of skill in the art. In some instances, multimodal systems can enable a user to provide multiple types of input to communicate with the computing device 6200. The communications interface 6240 can generally govern and manage the user input and system output. There is no restriction on operating on any particular hardware arrangement and therefore the basic features here may easily be substituted for improved hardware or firmware arrangements as they are developed.

Storage device 6230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 6225, read only memory (ROM) 6220, and hybrids thereof.

The storage device 6230 can include services 6232, 6234, 6236 for controlling the processor 6210. Other hardware or software modules are contemplated. The storage device 6230 can be connected to the system connection 6205. In one aspect, a hardware module that performs a particular function can include the software component stored in a computer-readable medium in connection with the necessary hardware components, such as the processor 6210, connection 6205, output device 6235, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" means A, B, or A and B, but items not listed in the set of A, B, and C can also be included in the set.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method for generating a media content guide, the method comprising:
    generating, by a server computer, a plurality of templates of the media content guide, each template of the plurality of templates including at least one view;
    saving, by the server computer, the plurality of templates in at least one memory;
    obtaining, by the server computer, input defining a first view of a first saved template from the saved plurality of templates of the media content guide, the first view for displaying content accessible using the media content guide;
    generating, based on first device display attributes of a first type of device, a first layout of the first view of the first saved template;
    generating, based on second device display attributes of a second type of device, a second layout of the first view, the second type of device being different than the first type of device and the second layout being different than the first layout;
    displaying, by the server computer, a preview of the first view having the first layout and a preview of the first view having the second layout;
    obtaining, by the server computer, input defining a first scheduled time for activating the first saved template including the first view;
    activating the first saved template including the first view in response to detecting the first scheduled time;
    providing, by the server computer, in response to activating the first saved template, the previously-generated first layout to a first device of the first type, and the previously-generated second layout to a second device of the second type;
    obtaining, by the server computer, input defining a second view the first saved template or a second saved template from the saved plurality of templates of the media content guide, the second view being different than the first view;
    generating, based on the second device display attributes, a third layout of the second view;
    obtaining, by the server computer, input defining a second scheduled time for activating the second saved template including the second view, the second scheduled time being different than the first scheduled time;
    activating the second saved template including the second view in response to detecting the second scheduled time; and
    providing, by the server computer, in response to activating the second saved template, the previously-generated third layout to the second device of the second type.

2. The method of claim 1, further comprising:
    obtaining additional input to modify the first layout of the first view;
    modifying, based on the additional input, the first layout of the first view to a first modified layout; and
    providing the first modified layout of the first view to the device of the first type to replace the first layout.

3. The method of claim 1, further comprising:
    obtaining additional input defining at least one parameter of an additional view of the media content guide;
    generating, based on the at least one parameter and the first device display attributes, a first layout of the additional view of the media content guide for the first type of device; and
    providing the first layout of the additional view to the first device of the first type.

4. The method of claim 3, wherein a second layout of the additional view is not generated for the second type of device based on the second device display attributes of the second type of device.

5. The method of claim 1, further comprising:
    obtaining additional input to modify a parameter of the first view of the media content guide;
    modifying, based on the modified parameter and the first device display attributes, the first layout of the first view to a first modified layout;
    modifying, based on the modified parameter and the second device display attributes, the second layout of the first view to a second modified layout;
    providing the first modified layout of the first view to the first device of the first type; and
    providing the second modified layout of the first view to the first device of the first type.

6. The method of claim 1, wherein the first view includes at least one of a content source for the content accessible using the media content guide and metadata associated with the content accessible using the media content guide.

7. The method of claim 6, wherein the metadata associated with the content includes at least one of a font, a font color, and a background.

8. The method of claim 1, wherein the first device display attributes of the first type of device further include at least one of a device type, a screen size, a display resolution, an aspect ratio, and a user profile.

9. The method of claim 1, further comprising:
obtaining scheduling information for the first view of the media content guide; and
scheduling, using the scheduling information, activation of a modification to the first view of the media content guide.

10. The method of claim 9, further comprising:
generating, in response to the scheduled activation, a modification of the first view of the media content guide.

11. The method of claim 9, further comprising:
scheduling the activation of the modification to the first view of the media content guide based on a scheduled event.

12. The method of claim 1, wherein the media content guide is a user interface to allow a user to access the content from a content management system.

13. The method of claim 1, wherein at least a portion of the content accessible using the media content guide is based on expected access of the content, the expected access being determined based on actual access of the content through a content provider system.

14. The method of claim 13, further comprising modifying the first layout of the first view of the media content guide for the first type of device based on the expected access of the content.

15. A server computer for generating a media content guide, comprising:
one or more processors; and
a memory accessible to the one or more processors and storing instructions which, upon execution by the one or more processors, causes the one or more processors to perform operations comprising:
generating a plurality of templates of the media content guide, each template of the plurality of templates including at least one view;
saving the plurality of templates in the memory;
obtaining input defining a first view of a first saved template from the saved plurality of templates of the media content guide, the first view for displaying content accessible using the media content guide;
generating, based on first device display attributes of a first type of device, a first layout of the first view of the first saved template;
generating, based on second device display attributes of a second type of device, a second layout of the first view, the second type of device being different than the first type of device and the second layout being different than the first layout;
displaying a preview of the first view having the first layout and a preview of the first view having the second layout;
obtaining input defining a first scheduled time for activating the first saved template including the first view;
activating the first saved template including the first view in response to detecting the first scheduled time;
providing, in response to activating the first saved template, the previously-generated first layout to a first device of the first type, and the previously generated second layout to a second device of the second type;
obtaining input defining a second view the first saved template or a second saved template from the saved plurality of templates of the media content guide, the second view being different than the first view;
generating, based on the second device display attributes, a third layout of the second view;
obtaining input defining a second scheduled time for activating the second saved template including the second view, the second scheduled time being different than the first scheduled time;
activating the second saved template including the second view in response to detecting the second scheduled time; and
providing, in response to activating the second saved template, the previously-generated third layout to the second device of the second type.

16. The server computer of claim 15, the memory storing instructions which, upon execution by the one or more processors, causes the one or more processors to perform operations comprising:
obtaining additional input to modify the first layout of the first view;
modifying, based on the additional input, the first layout of the first view to a first modified layout; and
providing the first modified layout of the first view to the first device of the first type to replace the first layout.

17. The server computer of claim 15, the memory storing instructions which, upon execution by the one or more processors, causes the one or more processors to perform operations comprising:
obtaining additional input defining at least one parameter of an additional view of the media content guide;
generating, based on the first device display attributes, a first layout of the additional view of the media content guide for the first type of device, wherein a second layout of the additional view is not generated for the second type of device based on the second device display attributes of the second type of device; and
providing the first layout of the additional view to the first device of the first type.

18. The server computer of claim 15, the memory storing instructions which, upon execution by the one or more processors, causes the one or more processors to perform operations comprising:
obtaining scheduling information for the first view of the media content guide; and
scheduling, using the scheduling information, activation of a modification to the first view of the media content guide.

19. A non-transitory computer-readable medium for generating a media content guide, the computer-readable medium having stored thereon instructions that, when executed by one or more processors, cause the one or more processors to:
generate a plurality of templates of the media content guide, each template of the plurality of templates including at least one view;
save the plurality of templates in the memory;
obtain input defining a first view of a first saved template from the saved plurality of templates of the media content guide, the first view for displaying content accessible using the media content guide;

generate, based on first device display attributes of a first type of device, a first layout of the first view of the first saved template;

generate, based on second device display attributes of a second type of device, a second layout of the first view, the second type of device being different than the first type of device and the second layout being different than the first layout;

display a preview of the first view having the first layout and a preview of the first view having the second layout;

obtain input defining a first scheduled time for activating the first saved template including the first view;

activate the first saved template including the first view in response to detecting the first scheduled time;

provide, in response to activating the first saved template, the previously-generated first layout to a first device of the first type, and the previously-generated second layout to a second device of the second type;

obtain input defining a second view the first saved template or a second saved template from the saved plurality of templates of the media content guide, the second view being different than the first view;

generate, based on the second device display attributes, a third layout of the second view;

obtain input defining a second scheduled time for activating the second saved template including the second view, the second scheduled time being different than the first scheduled time;

activate the second saved template including the second view in response to detecting the second scheduled time; and provide, in response to activating the second saved template, the previously-generated third layout to the second device of the second type.

* * * * *

UNITED STATES PATENT AND TRADEMARK OFFICE
CERTIFICATE OF CORRECTION

| | | |
|---|---|---|
| PATENT NO. | : 12,096,087 B2 | Page 1 of 1 |
| APPLICATION NO. | : 17/273921 | |
| DATED | : September 17, 2024 | |
| INVENTOR(S) | : Alex Fishman et al. | |

It is certified that error appears in the above-identified patent and that said Letters Patent is hereby corrected as shown below:

On the Title Page

In the Inventors Section, Item (72), please delete:
"Jain Ruchira Sunnyvale, CA (US)"

And insert:
--Ruchira Jain, Sunnyvale, CA (US)--

Signed and Sealed this
Seventeenth Day of December, 2024

Derrick Brent
*Acting Director of the United States Patent and Trademark Office*